United States Patent
Ourada

(10) Patent No.: US 11,091,358 B1
(45) Date of Patent: *Aug. 17, 2021

(54) METHOD AND SYSTEM FOR PROVIDING AN IMPROVED ALL-TERRAIN TELEHANDLER

(71) Applicant: Teletrax Equipment, LLC, Cedar Rapids, IA (US)

(72) Inventor: Tim Ourada, Mascotte, FL (US)

(73) Assignee: Teletrax Equipment, LLC, Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/025,428

(22) Filed: Sep. 18, 2020

(51) Int. Cl.
*B66F 9/065* (2006.01)
*B62D 55/08* (2006.01)
*B66F 9/075* (2006.01)
*B62D 33/063* (2006.01)

(52) U.S. Cl.
CPC .......... *B66F 9/0655* (2013.01); *B62D 33/063* (2013.01); *B62D 55/08* (2013.01); *B66F 9/0759* (2013.01); *B66F 9/07577* (2013.01)

(58) Field of Classification Search
CPC .......... B66F 9/06; B66F 9/061; B66F 9/0655; B66F 9/075; B66F 9/07572; B66F 9/07577; B66F 9/0759; B66F 9/082; B66F 9/10; B66F 9/105; B62D 55/08; B62D 33/063
See application file for complete search history.

(56) References Cited

U.S. PATENT DOCUMENTS

| | | | |
|---|---|---|---|
| 3,789,942 A * | 2/1974 | Kowalik | B62D 55/0655 180/9.44 |
| 3,957,165 A | 5/1976 | Smith | |
| 4,194,584 A | 3/1980 | Kress et al. | |
| 4,632,630 A | 12/1986 | Maki et al. | |
| 4,823,852 A | 4/1989 | Langford | |
| 5,113,958 A | 5/1992 | Holden | |
| 5,180,028 A | 1/1993 | Perrenoud, Jr. | |
| 5,632,350 A | 5/1997 | Gauvin | |
| 5,890,557 A | 4/1999 | Glass et al. | |
| 6,024,232 A | 2/2000 | Helgesson | |
| 6,044,921 A * | 4/2000 | Lansberry | B60G 11/02 180/9.36 |

(Continued)

*Primary Examiner* — Tyrone V Hall, Jr.
*Assistant Examiner* — Makena S Markman
(74) *Attorney, Agent, or Firm* — Smith Tempel Blaha, LLC; Matthew T. Hoots

(57) ABSTRACT

An all-terrain telehandler includes a pair of front tracks. Each front track may be coupled to a front bracket by an arm that telescopes relative to the front bracket. A superstructure may be coupled to the front bracket where the superstructure supports a first telescoping boom. A pair of rear tracks may be coupled to a rear body. The rear body may be coupled to the front superstructure. A maximum extension position for the first telescoping boom and a length generally corresponding to a length of the superstructure may define a ratio of approximately 4.00:1.00, whereby the all-terrain telehandler is substantially stable when moving loads supported by the first telescoping boom. A second telescoping boom may support a cab. With the second boom, the cab may be lowered beneath a top section of one of the front tracks for facilitating an operator loading sequence.

16 Claims, 41 Drawing Sheets

(56) References Cited

U.S. PATENT DOCUMENTS

| | | | |
|---|---|---|---|
| 6,176,334 B1* | 1/2001 | Lorenzen | B62D 21/14 |
| | | | 180/9.46 |
| 6,374,933 B1* | 4/2002 | Ruppert, Jr. | B62D 21/14 |
| | | | 180/9.44 |
| 7,195,126 B2 | 3/2007 | Maruyama | |
| 7,419,023 B2* | 9/2008 | Mieger | E02F 9/166 |
| | | | 180/89.13 |
| 7,690,738 B2 | 4/2010 | Wilt | |
| 7,780,197 B2 | 8/2010 | White | |
| 7,963,361 B2 | 6/2011 | Coers et al. | |
| 7,997,369 B2* | 8/2011 | Bacon | E02F 9/166 |
| | | | 180/89.13 |
| 8,103,418 B2* | 1/2012 | Osswald | B62D 49/085 |
| | | | 701/50 |
| 8,504,251 B2 | 8/2013 | Murota | |
| 8,888,122 B2 | 11/2014 | Berry | |
| 9,522,708 B2 | 12/2016 | He et al. | |
| 9,630,664 B2* | 4/2017 | Hellholm | B62D 55/0655 |
| 9,682,736 B1 | 6/2017 | Prickel et al. | |
| 9,828,049 B2* | 11/2017 | Lyle | E02F 9/2062 |
| 2010/0044124 A1 | 2/2010 | Radke et al. | |
| 2015/0096955 A1 | 4/2015 | Risen | |
| 2017/0217745 A1 | 8/2017 | Artoni et al. | |
| 2017/0291802 A1 | 10/2017 | Hao et al. | |
| 2018/0037278 A1 | 2/2018 | Cox | |

* cited by examiner

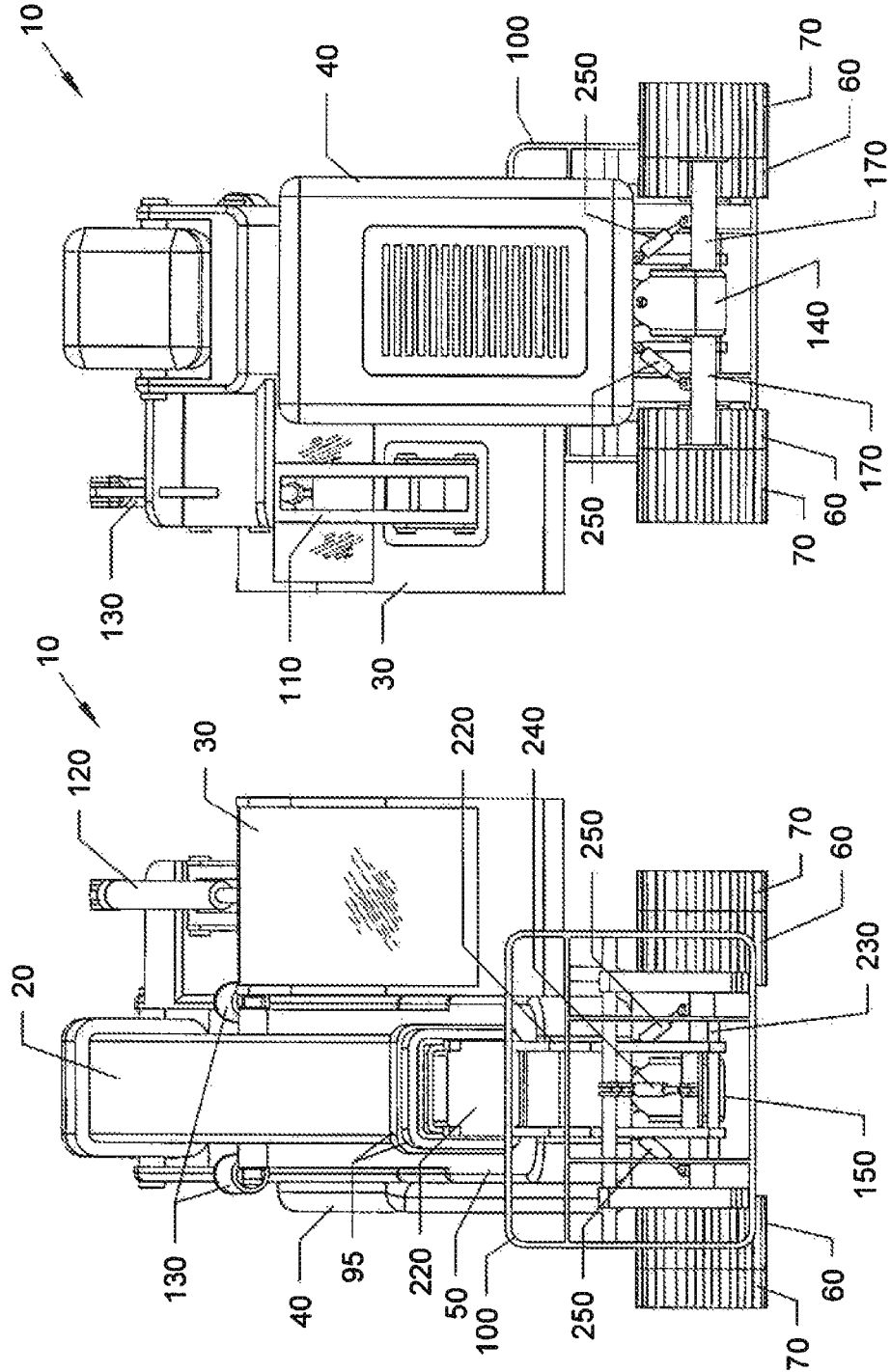

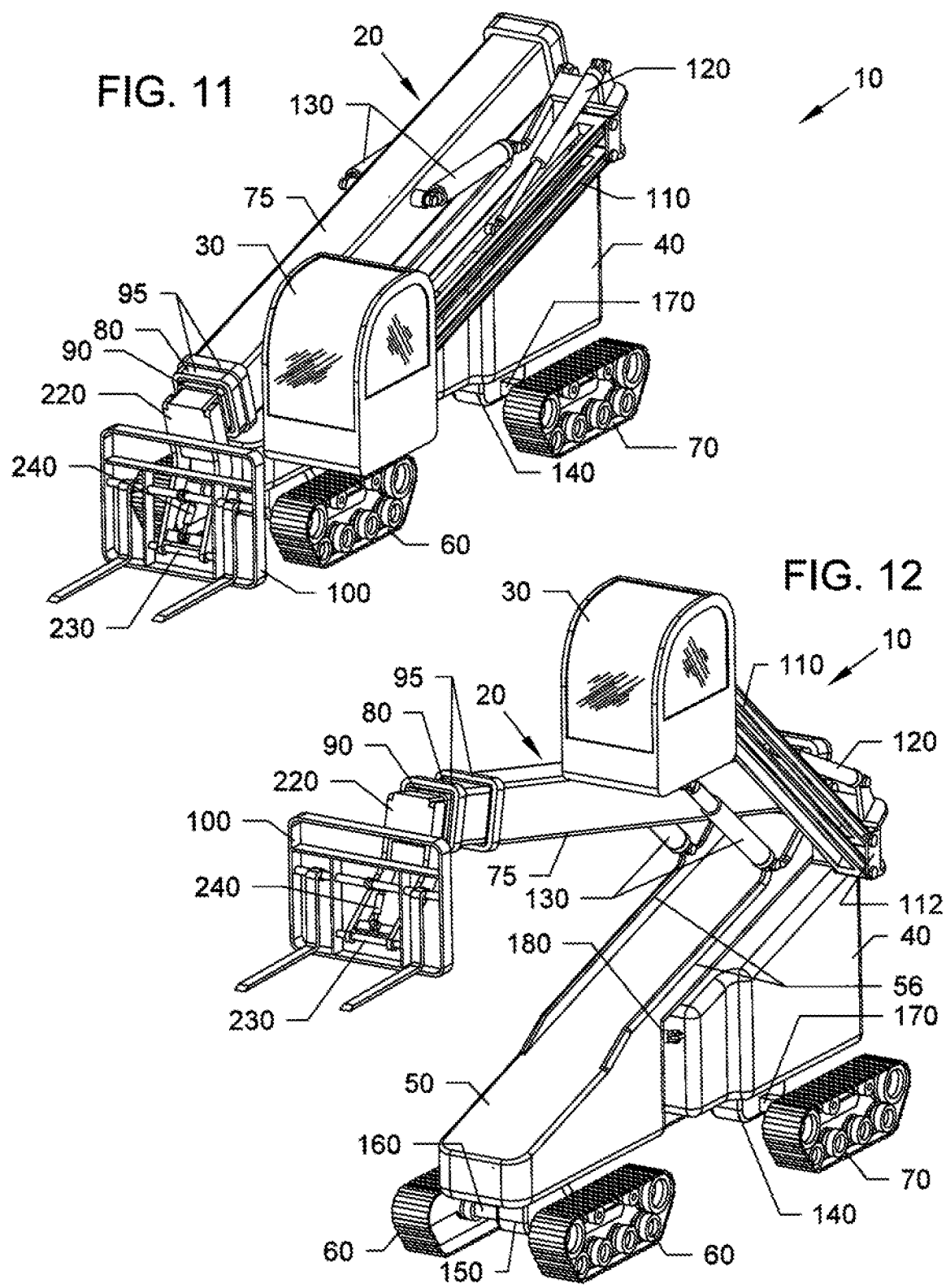

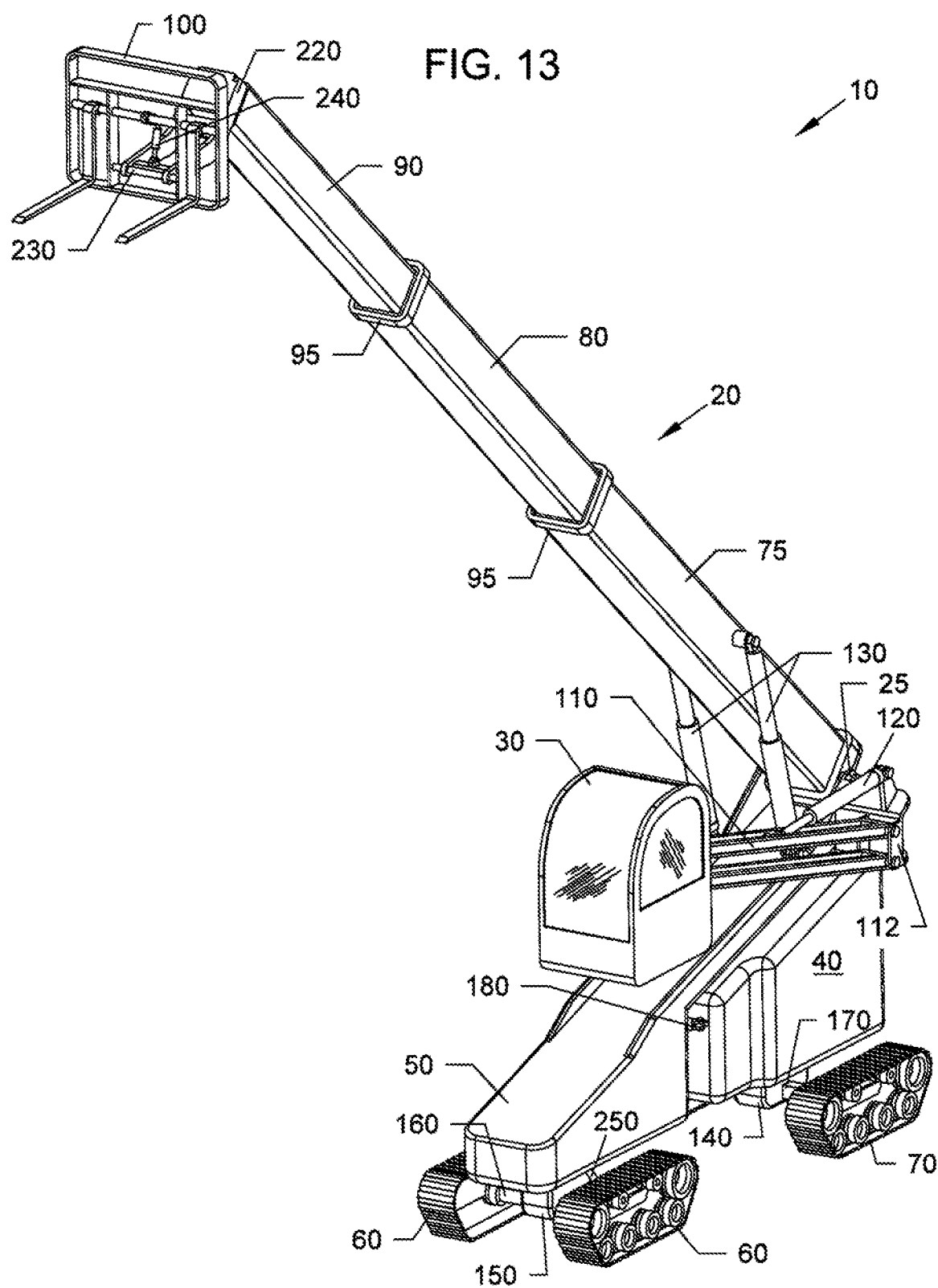

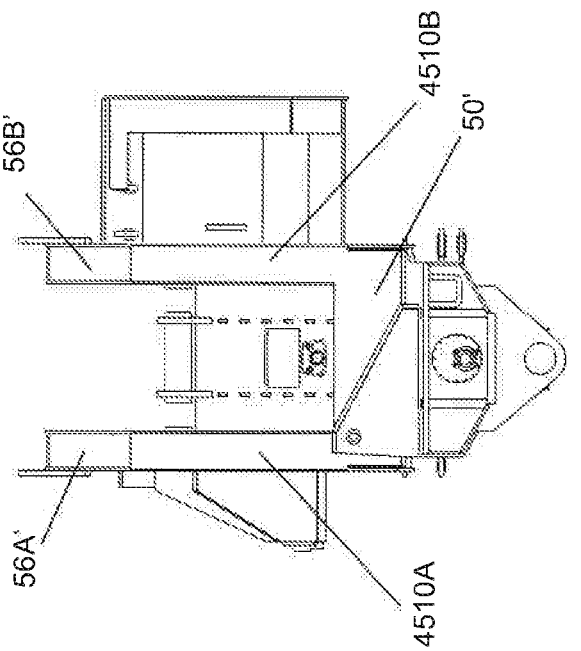
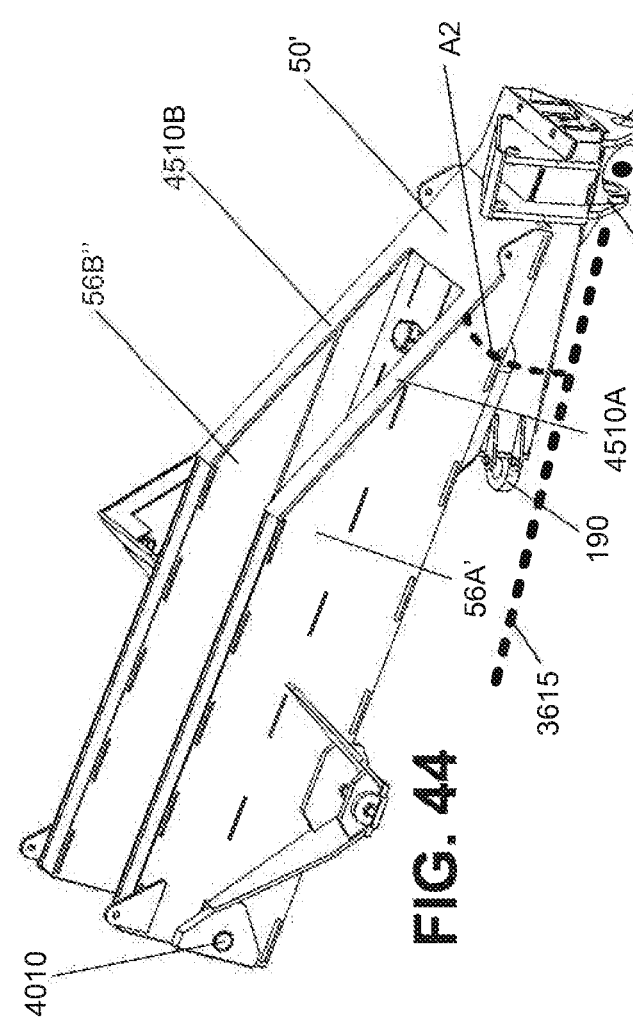
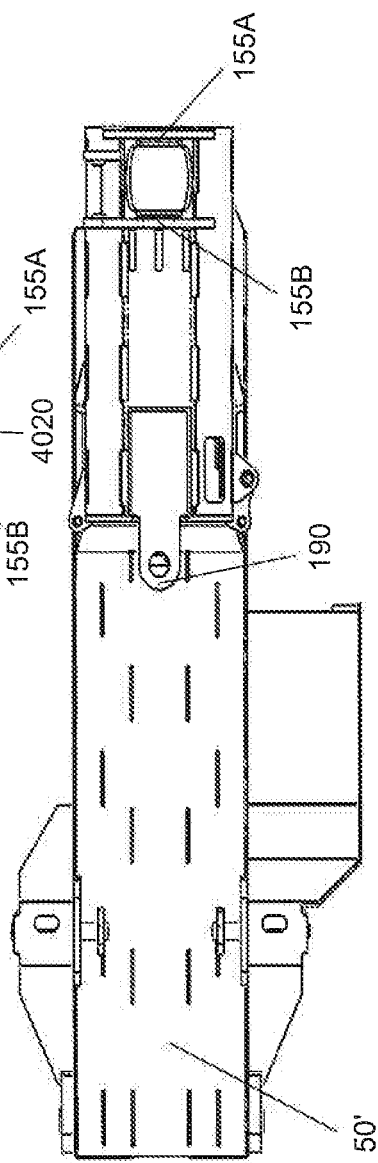
FIG. 45
FIG. 44
FIG. 46

METHOD AND SYSTEM FOR PROVIDING AN IMPROVED ALL-TERRAIN TELEHANDLER

CROSS-REFERENCE TO RELATED APPLICATIONS

This application is related to the U.S. non-provisional application entitled "OSCILLATING TRACK SYSTEM," filed on Jun. 4, 2020 and assigned application Ser. No. 16/893,337, the entire contents of which are hereby incorporated by reference.

BACKGROUND

Heavy construction equipment, such as a telehandler, is frequently used on outdoor construction sites. Such heavy construction equipment may benefit from oscillating track systems in lieu of wheels/tires. Oscillating track systems may provide benefits to equipment operators over wheels such as improved traction, improved stability, and smoother rides over undulating terrain.

However, telehandlers usually require very stable structural supports since their telescoping booms may reach very tall heights while carrying heavy loads at the end of the boom. One problem with conventional telehandlers is that their front wheels are usually permitted to turn relative to a longitudinal axis of the telehandler. This turning of the front wheels for the conventional telehandler can substantially reduce the stability of telescoping booms, when the booms are extended and lifting heavy loads.

Another problem with conventional telehandlers is that they can be difficult for an operator to enter into the cab. If an operator has a leg injury and/or cannot climb certain heights, then the operator may not be able to enter the cab with ease.

What is needed in the art is a telehandler that permits turning while increasing stability of the telehandler when a telescoping boom is extended and carrying heavy loads. Another need in the art exists for a telehandler which may increase the ease at which the cab may be entered by the operator.

SUMMARY

Various embodiments, aspects and features of the present invention comprise an all-terrain telehandler that includes a pair of front tracks. Each front track may be coupled to a front bracket by an arm that telescopes relative to the front bracket. A superstructure may be coupled to the front bracket where the superstructure supports a telescoping boom. The superstructure may define a first axis while the front bracket defines a second axis. The first axis may be maintained at a fixed, predetermined angle relative to the second axis. This predetermined angle may comprise a magnitude of about, or substantially ninety degrees.

A pair of rear tracks may be coupled to a rear body. The rear body may be coupled to the front superstructure at an articulation point. The articulation point may facilitate steering of the vehicle.

And a first length may be defined by a maximum extension position for the telescoping boom while a second length may be defined by a first end of the superstructure to a second end of the superstructure. A ratio of the first length to the second length is less than or equal to approximately 4.00:1.00, whereby the all-terrain telehandler is substantially stable when moving loads supported by the telescoping boom.

According to another exemplary embodiment, the ratio may comprise a magnitude of less than or equal to 4.50:1.00. According to yet another exemplary embodiment, the ratio may comprise a magnitude of less than or equal to 3.0:1.00. According to yet another exemplary embodiment, the ratio may comprise a magnitude of between about 3.00:1.00 to 4.50:1:00. Meanwhile, the telescoping boom may include at least two sections. In another exemplary embodiment, the telescoping boom may comprise at least three sections.

The front bracket and each arm for each front track may maintain each front track at a ninety degree angle relative to a longitudinal axis for the superstructure. The front tracks and rear tracks when moving in predetermined directions may allow the all-terrain telehandler to complete a zero-turn.

The telescoping boom may be a first telescoping boom, and the all-terrain telehandler may further have a second telescoping boom and a cab. The cab may be coupled to the second telescoping boom. The cab may be adjustable between a first position and a second position. The first position may include a location where a geometrical midpoint of the cab is below a top section of one of the front tracks. The first position may further include a location which is in front of one of the front tracks.

This summary is provided to introduce a selection of concepts that are further described below in the detailed description. This summary is not intended to identify key or essential features of the claimed subject matter, nor is it intended to be used as an aid in limiting the scope of the claimed subject matter

BRIEF DESCRIPTION OF THE SEVERAL VIEWS OF THE DRAWINGS

In the Figures, like reference numerals refer to like parts throughout the various views unless otherwise indicated. For reference numerals with letter character designations such as "110A" or "110B", the letter character designations may differentiate two like parts or elements present in the same Figure. Letter character designations for reference numerals may be omitted when it is intended that a reference numeral to encompass all parts having the same reference numeral in all Figures.

FIG. 9 is a front view of the vehicle of FIG. 5;

FIG. 10 is a rear view of the vehicle of FIG. 5;

FIG. 11 is a front right perspective view of the vehicle of FIG. 1 with boom and articulating cab fully down;

FIG. 12 is a front right perspective view of the vehicle of FIG. 12 with boom raised slightly and cab raised above boom for operator visibility;

FIG. 13 is a front right perspective view of the vehicle of FIG. 12 with boom full raised and extended;

FIG. 44 illustrates a side perspective view of the superstructure for the all-terrain vehicle illustrated in FIGS. 35-58;

FIG. 45 illustrates a front view of the superstructure shown in FIG. 44;

FIG. 46 illustrates a bottom view of the superstructure illustrated in FIG. 44;

DESCRIPTION

Figure 1:
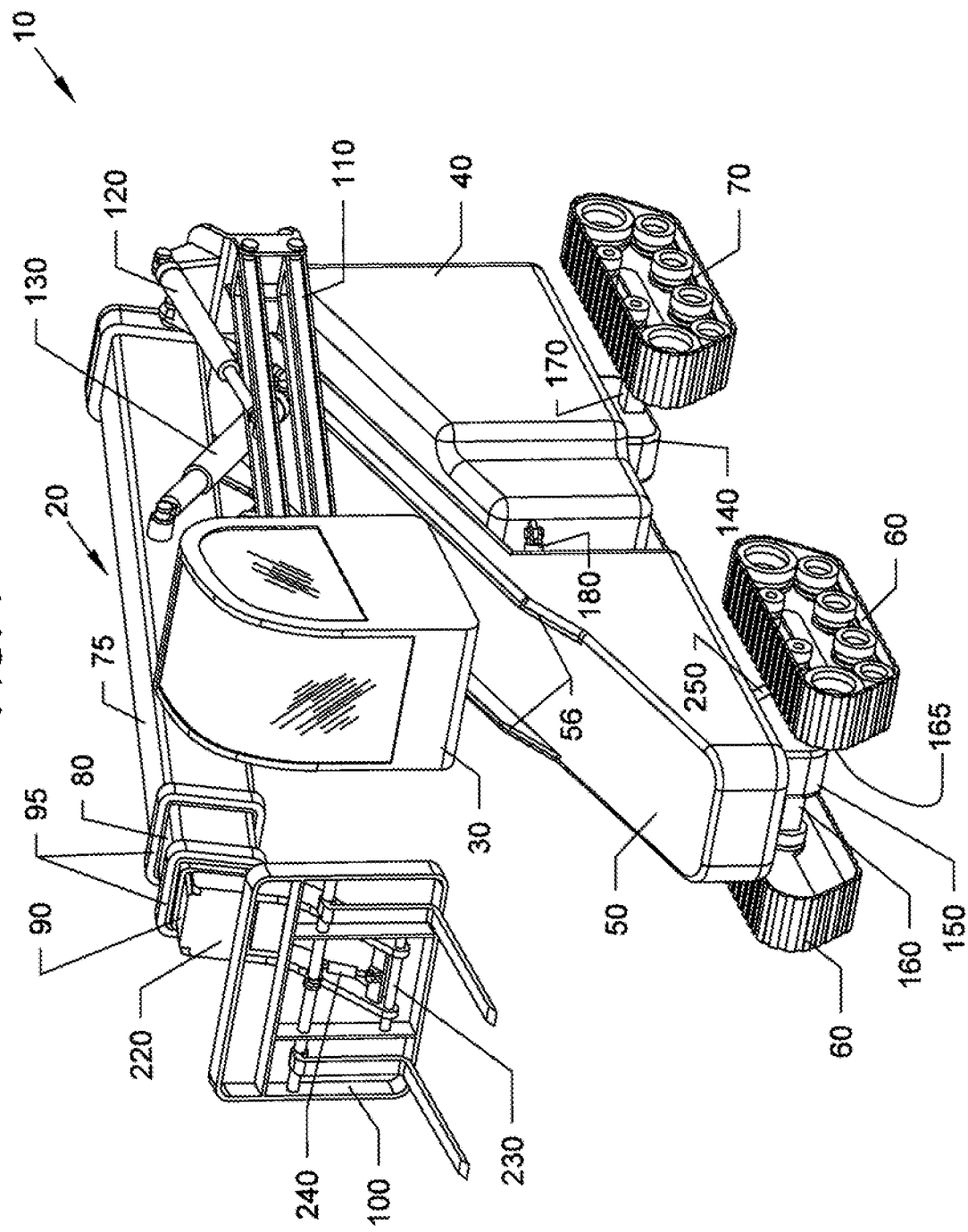
FIG. 1 is a front right perspective view of the all terrain versatile telescopic forklift vehicle with articulating cab and boom slightly raised with boom retracted.

The Figures and the related description are offered for illustrative purposes and collectively depict aspects and features of an exemplary embodiment of a unique and novel all-terrain telehandler particularly suited for payload handling on construction sites. Among other features, embodiments of the telehandler depicted and described herein may include one or more oscillating track systems comprising oscillating track lock subsystems advantageously configured to switch the oscillating track system from a free oscillating state to a locked position state, and vice versa. Details and advantages of the solution for an oscillating track system will become apparent upon review of the figures and description that follows. Notably, although an exemplary embodiment of the solution for an oscillating track system is shown and described herein within the context of a novel telehandler, it will be understood that the disclosed solution for an oscillating track system, and its variants, are not limited in application for use with telehandlers and, as such, it is envisioned that embodiments of the solution may be leveraged on any equipment that may benefit from a drivetrain that includes an oscillating track system.

In this description, label 10 refers to an all-terrain vehicle with articulating tracks, bodies, boom, and cab. Label 20 refers to a telescoping boom, label 30 refers to a cab that raises and lowers on hydraulic power, and label 40 refers to a rear body/engine compartment. 50 refers to a front body/ superstructure that provides the foundation of the front tracks, the articulating boom, and the articulating cab, with the superstructure connected to the engine compartment with a hinge bracket. Label 54 is an upper portion bracket, label 56 are raised sides, and label 58 refers to the upper end brackets of the superstructure.

In this description, label 60 refers to a front oscillating track assembly. As will become more apparent from the disclosure, front oscillating track assemblies may be configured to rotate about an axle center-line and lock in a given position such that the assembly is unable to oscillate. Similarly, label 70 refers to a rear oscillating track assembly. Rear oscillating track assemblies may be configured to rotate about an axle center-line but inoperable to lock into a non-oscillating state.

In this description, label 75 refers to a large boom section, label 80 a middle boom section, and label 90 a small boom section. Label 95 refers to boom stops, label 100 a fork assembly, and label 110 a cab linkage that raises and lowers the cab while keeping it level relative to the superstructure by means of a hydraulic cylinder. Label 112 refers to a lower hinged bracket, label 118 an upper hinged bracket, and label 120 a hydraulic cylinder operable to articulate the cab. Label 130 refers to hydraulic cylinders for raising and lowering the boom.

Label 140 refers to a rear track bracket that is attached to the bottom of the engine compartment via a hinge pin. Advantageously, the rear track bracket 140 enables the rear oscillating track subassemblies and transmission to rotate in a plane perpendicular to the bottom of the engine compartment, thereby keeping the telehandler level on uneven ground. This rotation is free to follow the angle of the superstructure as it adjusts to ground level conditions. Similarly, label 150 refers to the front track bracket that is attached to the bottom of the superstructure in the same why as the rear transmission. Additionally, there may be two hydraulic cylinders linking the transmission to the superstructure. These cylinders may be controlled by the operator to keep the superstructure relatively level regardless of ground conditions. As previously mentioned, the engine compartment may be free to self-adjust and follow the orientation of the superstructure.

In this description, label 155 refers to a bracket hinge pin. Label 160 refers to a front left axle housing. The front oscillating track subassembly transmission may house two outer axle housings. Each housing may contain one extendable inner axle, one for the left axle and one for the right axle. These individual axles may telescope, thereby enabling the oscillating track subassemblies to move away from the superstructure giving them a wider footprint and adding stability to the superstructure. Label 163 refers to a front left extendable inner axle that telescopes out of an axle housing to place the oscillating track subassembly further away from the superstructure for increased stability.

In this description, label 165 refers to a front right axle housing and label 167 refers to a front right extendable inner axle. Label 170 refers to a rear axle. The rear track bracket may house one non-extendable axle for each oscillating track subassembly.

In this description, label 180 refers to a hydraulic cylinder that connects the superstructure and the engine compartment allowing the operator to control the angle orientation of one relative to the other. Label 190 refers to the superstructure hinge bracket that connects to engine compartment hinge bracket with a pivot pin so that the two can articulate about the pin. Label 200 refers to the engine compartment hinge bracket and label 210 refers to a hinge bracket pivot pin. Label 220 refers to a fork bracket that is attached to the end of the small boom section. This fork bracket 220 also attaches to the fork assembly via a hinge pin so that the fork bracket may articulate forward and backward by way of a hydraulic cylinder controlled by the operator.

In this description, label 230 refers to a fork assembly hinge pin and label 240 refers to a fork assembly hydraulic cylinder. Label 250 refers to front track transmission hydraulic cylinders operable to orient the front transmission to the superstructure by about the transmission pivot pin. They may be controlled by the operator.

In this description, label 260 refers to ground that is relatively uneven or not level while label 270 refers to ground that is relatively level. Label 280 refers to ground obstacles such as, but not limited to, a log or rock.

Figure 2:
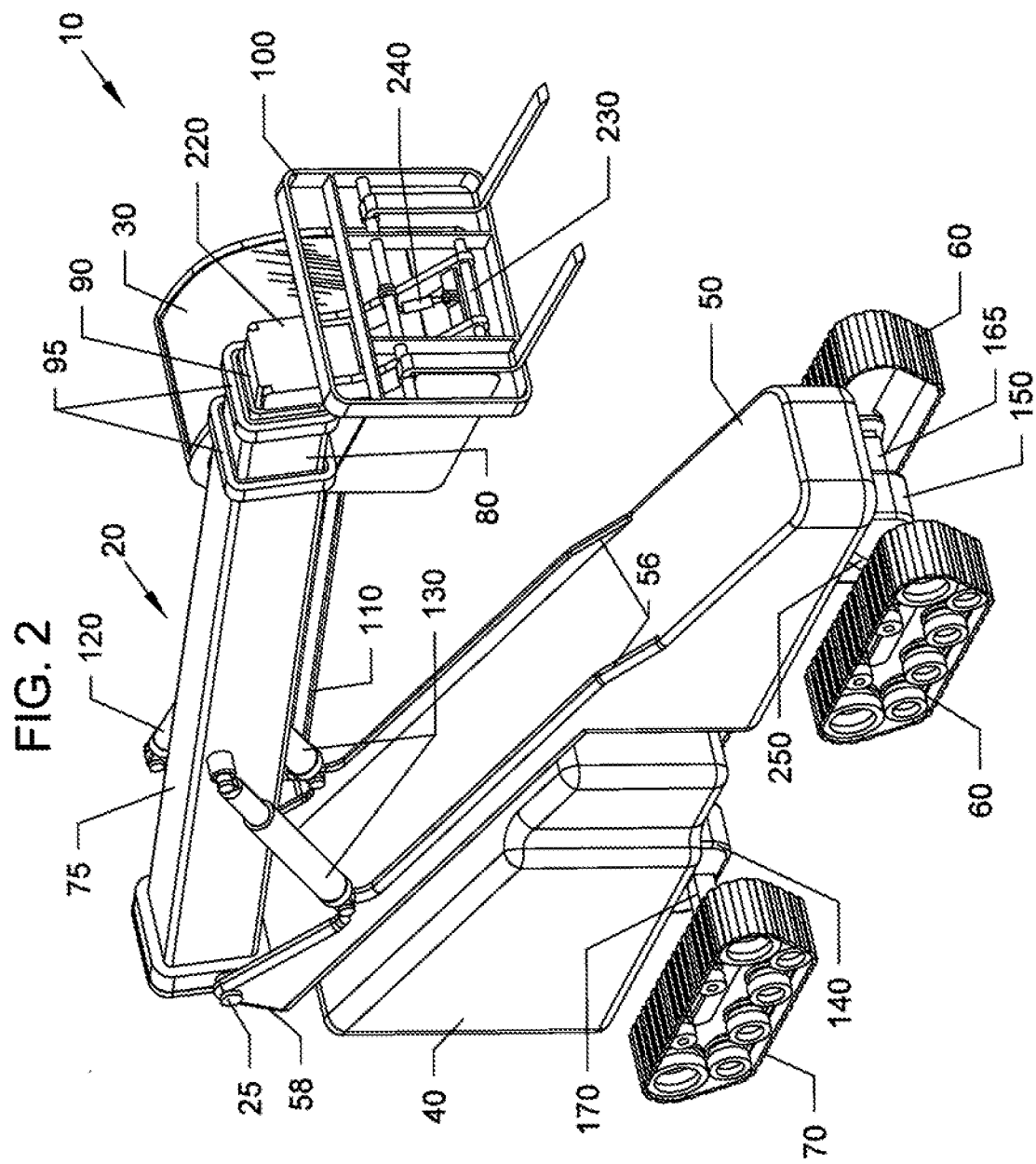
FIG. 2 is a front left perspective view of the vehicle of FIG. 1.
Figure 3:
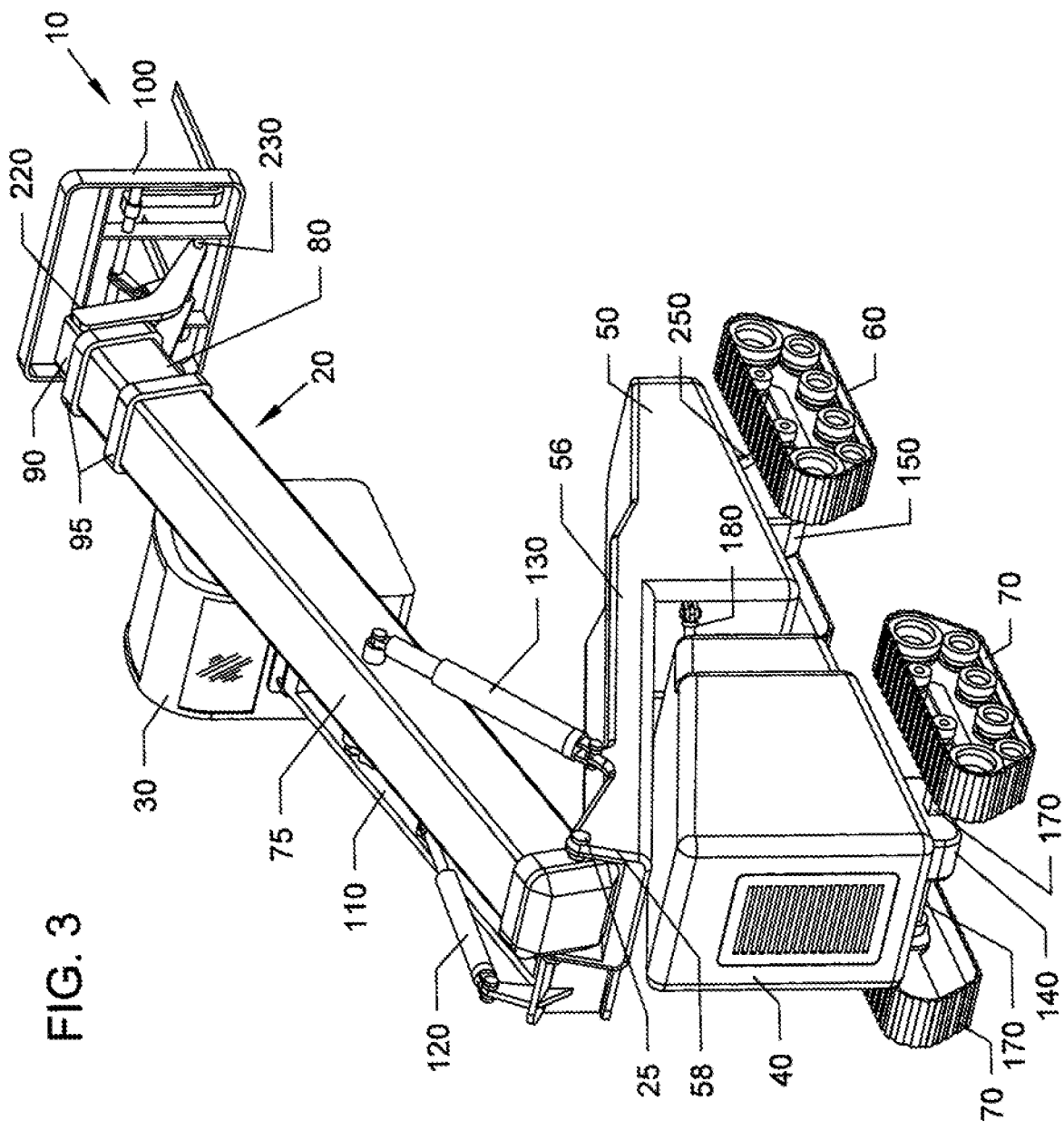
FIG. 3 is a rear right perspective view of the vehicle of FIG. 1.
Figure 4:
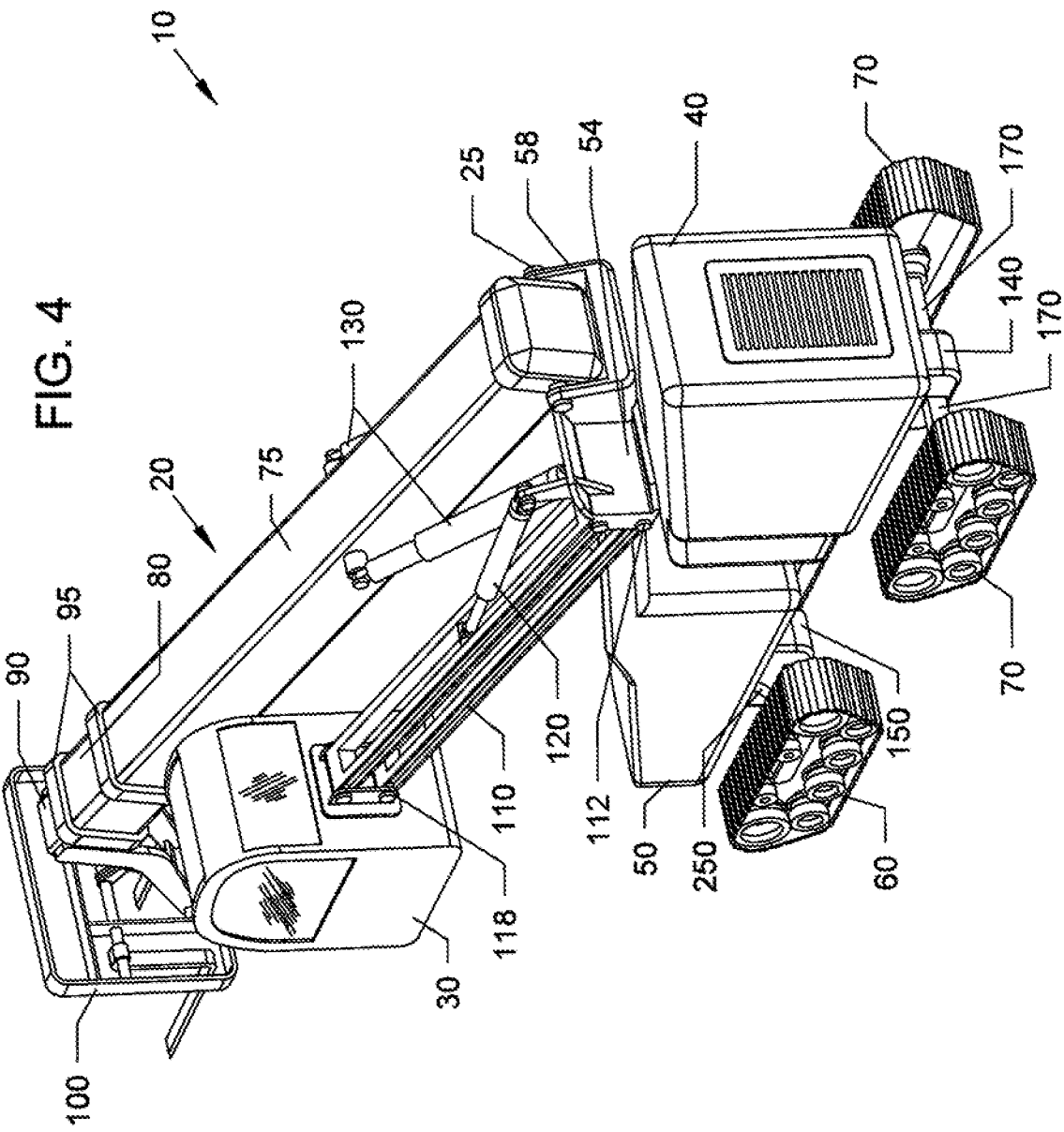
FIG. 4 is a rear left perspective view of the vehicle of FIG. 1.
Figure 5:
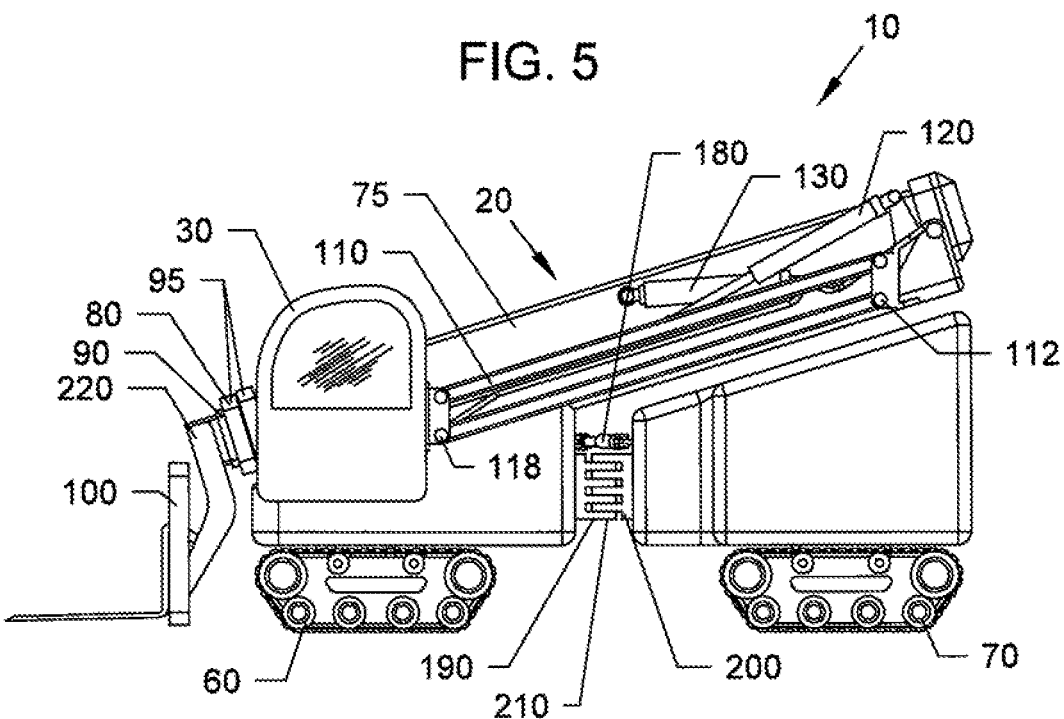
FIG. 5 is a right side view of the vehicle of FIG. 1 with cab and boom in down position.
Figure 6:
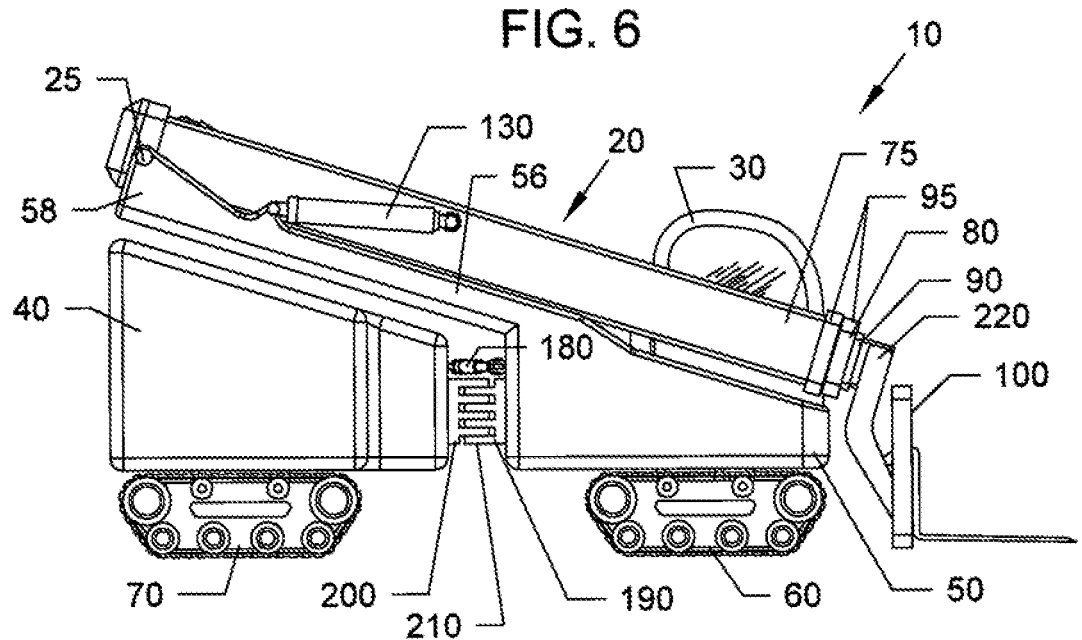
FIG. 6 is a left side view of the vehicle of FIG. 5.
Figure 7:
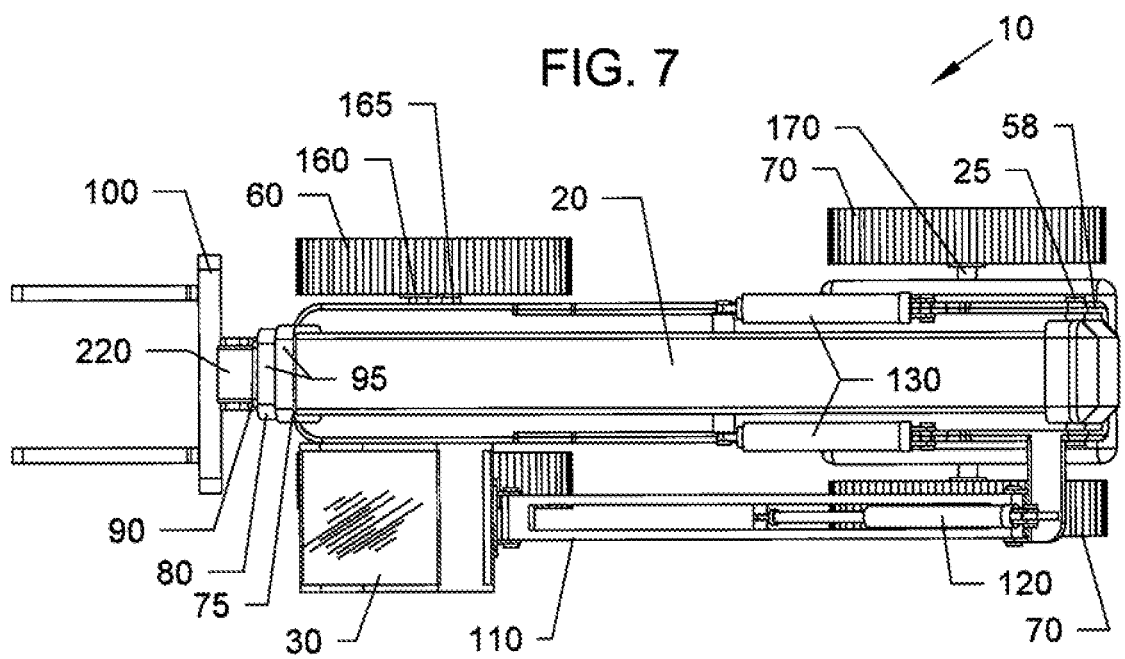
FIG. 7 is a top view of the vehicle of FIG. 5.
Figure 8:
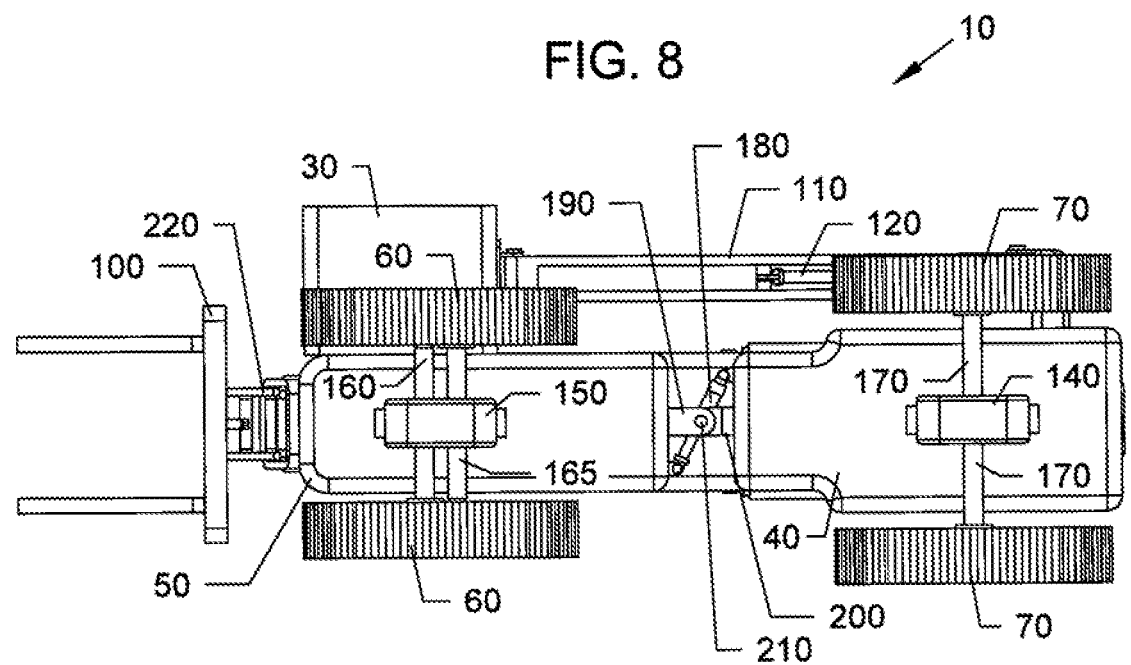
FIG. 8 is a bottom view of the vehicle of FIG. 5.

Referring now to the figures, FIG. 1 is a front right perspective view of the novel all terrain versatile telescopic forklift vehicle 10 with articulating cab 30 and telescoping boom 20 slightly raised with telescopic boom 20 in a retracted position. FIG. 2 is a front left perspective view of the vehicle 10 of FIG. 1. FIG. 3 is a rear right perspective view of the vehicle 10 of FIG. 1. FIG. 4 is a rear left perspective view of the vehicle 10 of FIG. 1. FIG. 5 is a right side view of the vehicle 10 of FIG. 1 with cab 30 and telescoping boom 20 in a down position. FIG. 6 is a left side view of the vehicle 10 of FIG. 5. FIG. 7 is a top view of the vehicle 10 of FIG. 5. FIG. 8 is a bottom view of the vehicle 10 of FIG. 5. FIG. 9 is a front view of the vehicle 10 of FIG. 5.

Figure 14:
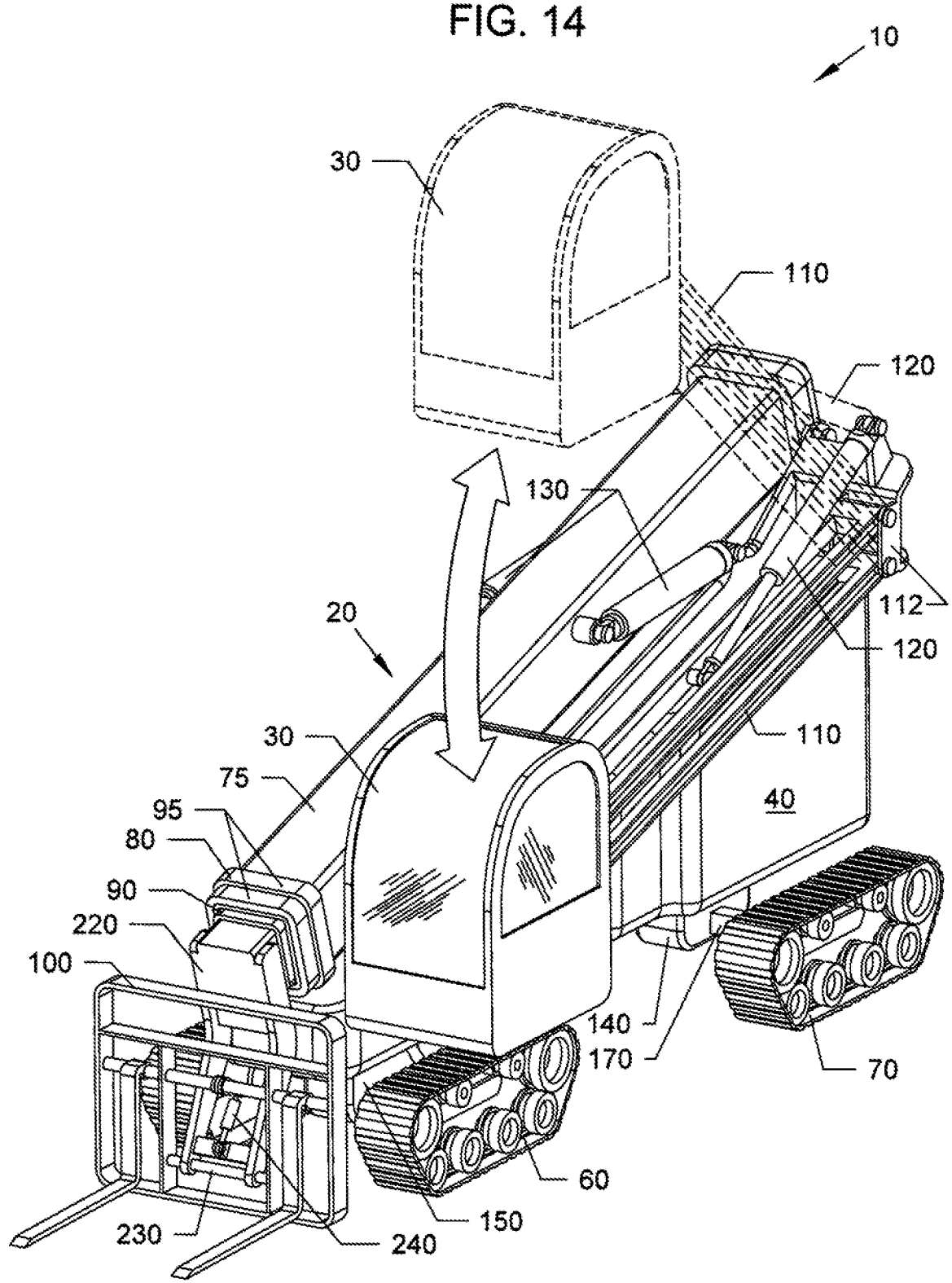
FIG. 14 is a front right perspective view of the vehicle of FIG. 11 showing range of motion of articulating cab.

FIG. 10 is a rear view of the vehicle 10 of FIG. 5. FIG. 11 is a front right perspective view of the vehicle 10 of FIG. 1 with the telescoping boom 20 and articulating cab 30 fully down. FIG. 12 is a front right perspective view of the vehicle 10 of FIG. 12 with the telescoping boom 20 raised slightly and the cab 30 raised above the telescoping boom 20 for operator visibility. FIG. 13 is a front right perspective view of the vehicle 10 of FIG. 12 with the telescoping boom 20 full raised and extended. And, FIG. 14 is a front right perspective view of the vehicle 10 of FIG. 11 showing range of motion of the articulating raiseable and lowerable cab 30.

Referring to FIGS. 1-14, the all-terrain versatile vehicle 10, shown in the form of a telehandler, may be comprised of two body parts, which includes a rear body 40 and front body 40. The rear body 40 may include an engine compartment 40, which houses the vehicle engine and is the foundation of a rear oscillating track assembly 70. The rear oscillating track assembly 70 may include a right track attached on a lower rear right side of the rear body 40 and a left track attached on a lower rear left side of the rear body 40. Similarly, the front oscillating track assembly 60 may include a right front track attached on a lower front right side of the front body 50 and a left front track attached on a lower front left side of the front body 50. More detail regarding the oscillating track assemblies 60, 70 will be provided in FIGS. 29-35 and the related description.

The front body 50 with the superstructure may be attached to the rear body 40 with engine compartment, by superstructure hinge bracket 190 which is attached to an engine compartment engine bracket 200 by a hinge bracket pivot pin 210.

Referring to FIGS. 1-13, the telescoping boom 20 may include a large boom section 75 with a middle boom section 80 that can telescope in and out of, and a small boom section 90 that can telescope in and out of the middle boom section 80. Stops 95 may limit the fully retracted positions of the middle boom section 80 within the large boom section 75, and the small boom section within the middle boom section 80. Similar internal stops, not shown, may also limit the fully extended positions of the middle boom section 80 relative to the large boom section 75, and the small boom section 90 relative to middle boom section 80.

The bottom of the large boom section 75 can include a boom hinge pin 25 which rotatably attaches the telescoping boom 20 to an upper end superstructure brackets 58, which together function as a boom hinge for allowing the telescoping boom 20 to pivot up and down relative to the upper end brackets 58 of the superstructure 50. A pair of hydraulic cylinders 130 (such as but not limited to those used in U.S. Pat. No. 6,024,232 to Helgesson and U.S. Pat. No. 4,632,630 to Maki et al., which are both incorporated by reference in their entirety) can be used. Each of the hydraulic cylinders 130 may have outer pivotal ends that can be attached to both the large boom section 75 and the upper end superstructure brackets 58, where the telescoping hydraulic cylinders 130 can raise and lower the telescoping boom 20.

The superstructure 50 can have a side view that appears to have a generally triangular configuration, and the superstructure 50 can include an upper ramped top with raised sides 56 for capturing the telescoping boom 20 when in its most lowered position.

The outer end of small boom section 90 of the telescoping boom 20 can include a fork assembly 100 with a fork bracket 220 attached thereon, by a fork assembly hinge pin 230, where a fork assembly hydraulic cylinder 240 (such as but not limited to those described in U.S. Pat. No. 4,632,630 to Maki et al., which is incorporated by reference in its entirety) can adjust the angle of the fork bracket 220 relative to the telescoping boom 20.

Referring to FIGS. 1-14, the vehicle 10 can include a cab 30 that can be raised and lowered from an upper hinged bracket 118 attached to an upper end of parallel cab linkage arms 110 which are attached to a lower hinged bracket 112 which is attached to an upper portion bracket 54 of the superstructure 50. A hydraulic cylinder 120, such as those described in U.S. Pat. No. 5,890,557 to Glass et al., which is incorporated by reference in its entirety, can be used to control the raising and lowering of the cab 30.

Figure 15:
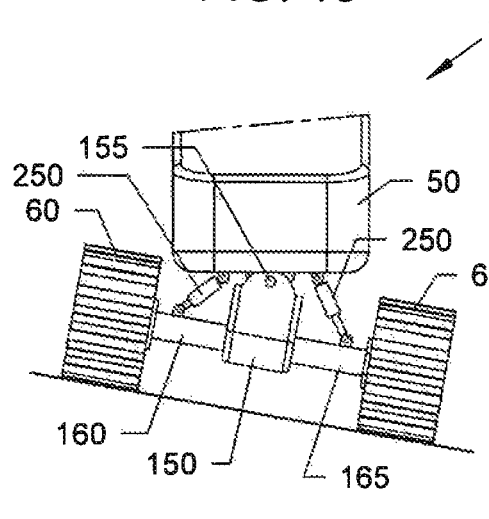
FIG. 15 is a lower front view of the front tracks, and front axle of the vehicle of the preceding figures showing how the axle is able to adjust, via pivot pin and hydraulic cylinders controlled by the operator, to ground level changes and keep the vehicle front and rear body and superstructure level.
Figure 16:
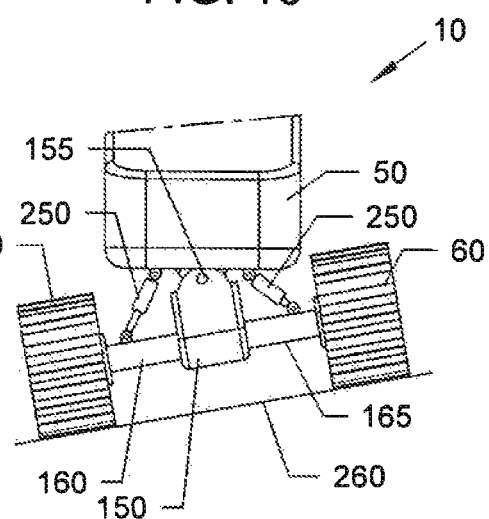
FIG. 16 is another view of FIG. 15 with the axle tilted in an opposite orientation.

FIG. 15 is a lower front view of the front track assembly 60 of the vehicle 10 which includes a front left track attached to a middle front track bracket 150 by a front left axle housing 160, and a front right track attached to the middle front track bracket by a front right axle 165, with the front track assembly tilted down to the right. FIG. 16 is another view of FIG. 15 with the front track assembly 60 tilted in an opposite orientation.

The axle housings 160, 165 are able to adjust, via bracket pivot pin 155 which attaches the bottom of the front body 50 to the middle front bracket 50. The front track assembly 60 is able to be tiltable up and down based on hydraulic cylinders 250 (such as those described in U.S. Pat. No. 5,180,028 to Perrenoud, Jr., which is incorporated by reference in its' entirety), controlled by an operator in the cab 30, to ground level changes and keep the vehicle front body 50 and rear body 40 and superstructure level. Alternatively, it is envisioned that hydraulic cylinders 250 may be automatically actuated in response to directions received from a controller. The controller may generate and transmit such actuation directions to the hydraulic cylinders 250 in view of electronic signals generated by level sensors (such as, for example, gyroscopic sensors). In such embodiments, it is an advantage that the front body 50 and/or rear body 40 may be kept level without need for manual operator input.

Figure 17:
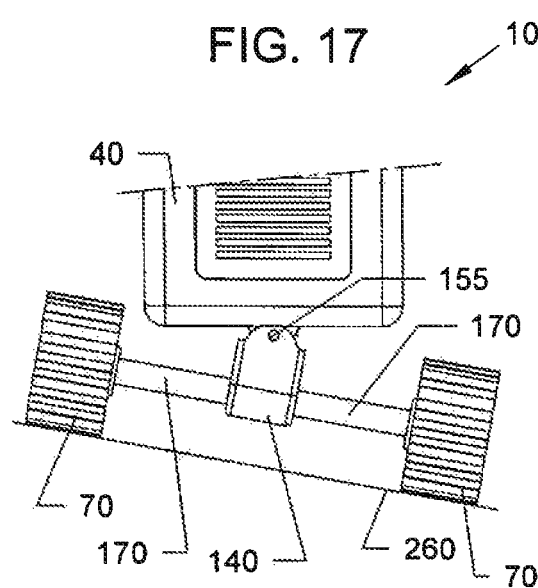
FIG. 17 is a lower rear view of the vehicle of the preceding figures of engine compartment, rear tracks, and rear axle showing how the axle is able to adjust to ground level changes via pivot pin. The engine compartment leveling feature does not have to be hydraulically powered and is free-pivoting and follows the lead of the superstructure.
Figure 18:
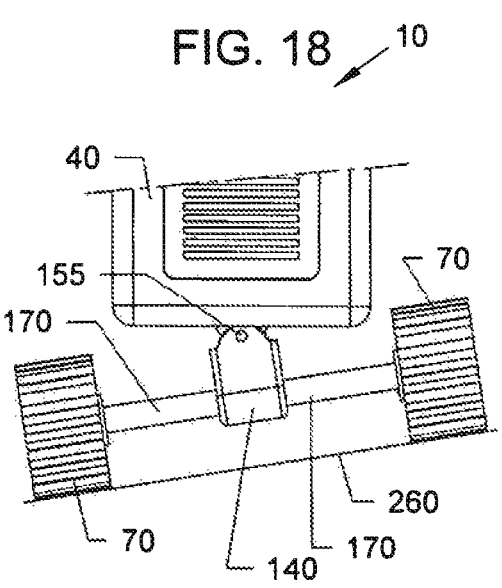
FIG. 18 is another view of FIG. 17 with the axle tilted an opposite orientation.

FIG. 17 is a lower rear view of the vehicle 10 of the preceding figures of engine compartment (rear body) 40, rear track assembly 70, and rear axle 170 showing how the axle 170 is able to adjust to ground level changes via pivot pin 155 that attached a bottom of the rear body 40 to a middle rear bracket 140. The engine compartment (rear body 40) leveling feature is not hydraulically powered and is free-pivoting and follows the lead of the superstructure (front body 50. FIG. 18 is another view of FIG. 17 with the axle 170 tilted an opposite orientation.

Figure 19:
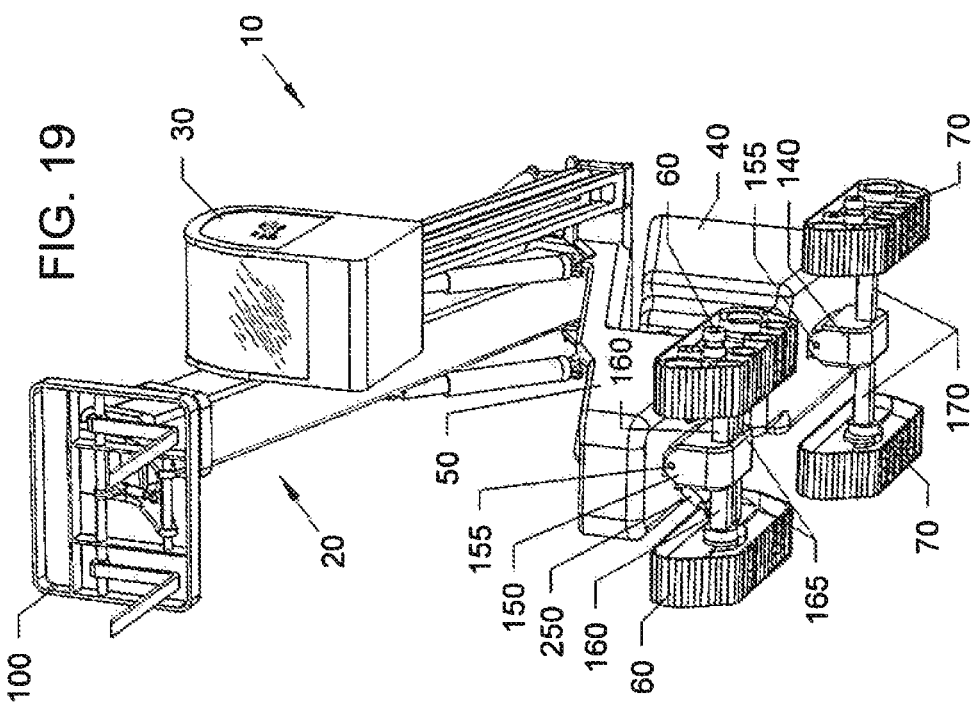
FIG. 19 is a bottom right perspective view of the vehicle of the preceding figures showing the axle's and tracks parallel to one another and parallel to the superstructure.

FIG. 19 is a bottom right perspective view of the vehicle 10 of the preceding figures showing the axle's 160, 165 and 170 and track assemblies 60, 70 parallel to one another and parallel to the superstructure (front body) 50.

Figure 20:
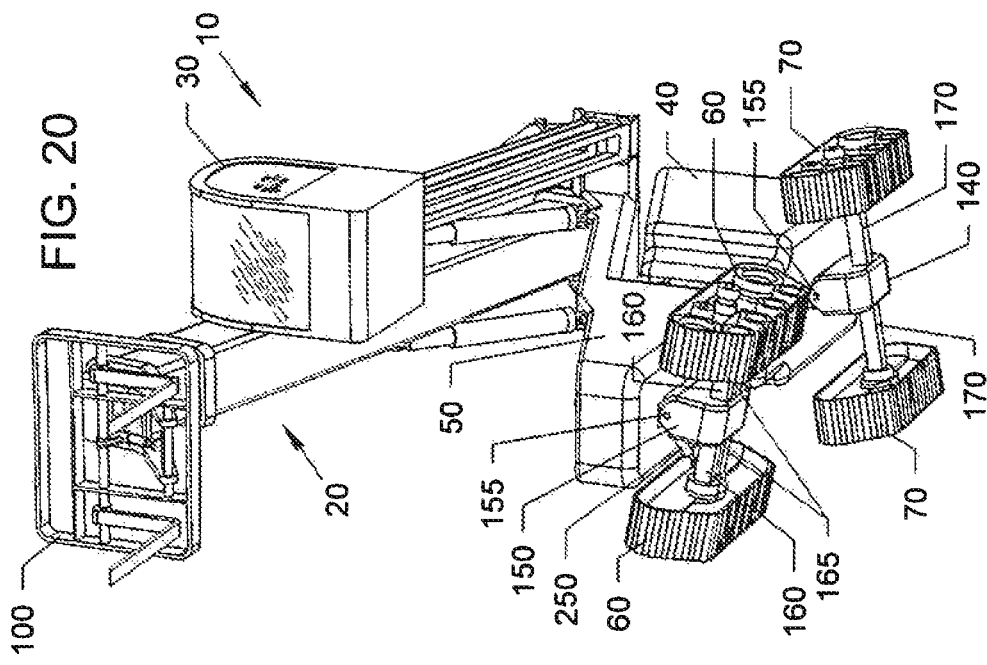
FIG. 20 is another perspective view of FIG. 19, showing how the axles and tracks rotate about the axle hinge pins.

FIG. 20 is another perspective view of FIG. 19 showing how the front track assembly 60 with axles 160, 165 and pivoting bracket 150 and rear track assembly 70 with rear axle 170 and pivoting bracket 140 rotate about the axle hinge pins 155.

Figure 21:
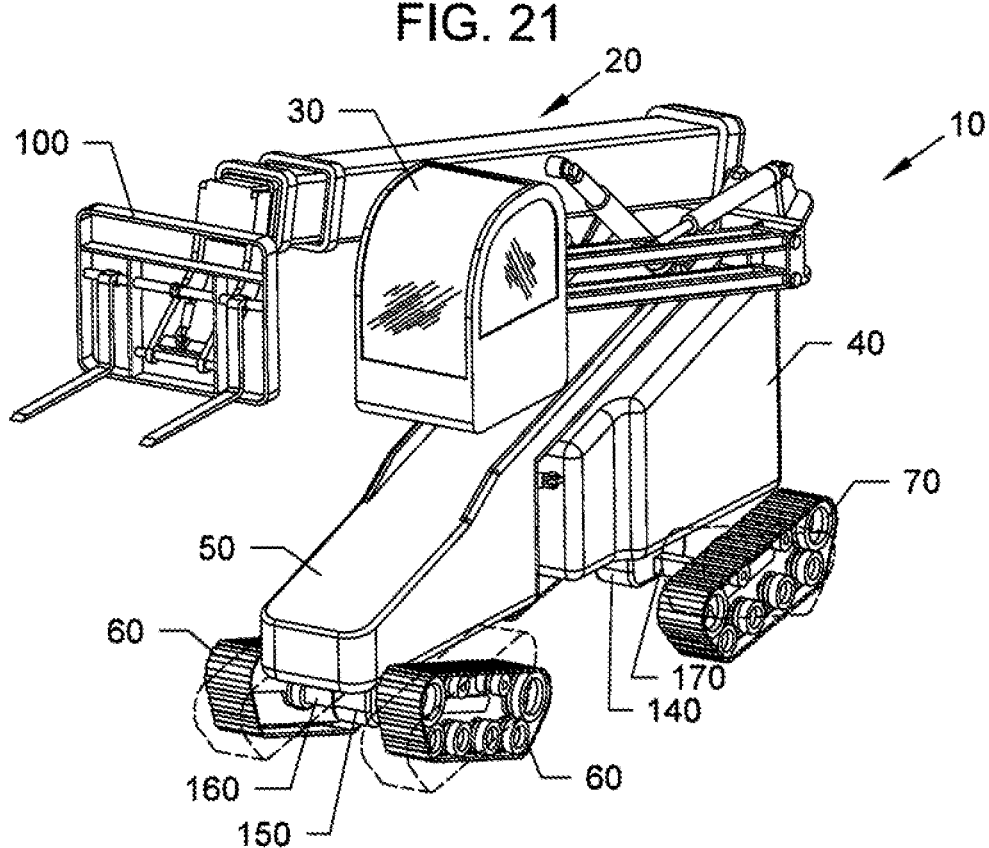
FIG. 21 is a top right perspective view of the vehicle of the preceding figures showing how the tracks articulate by rotating about and relative to their axles. The front tracks can also be locked in any position.
Figure 22:
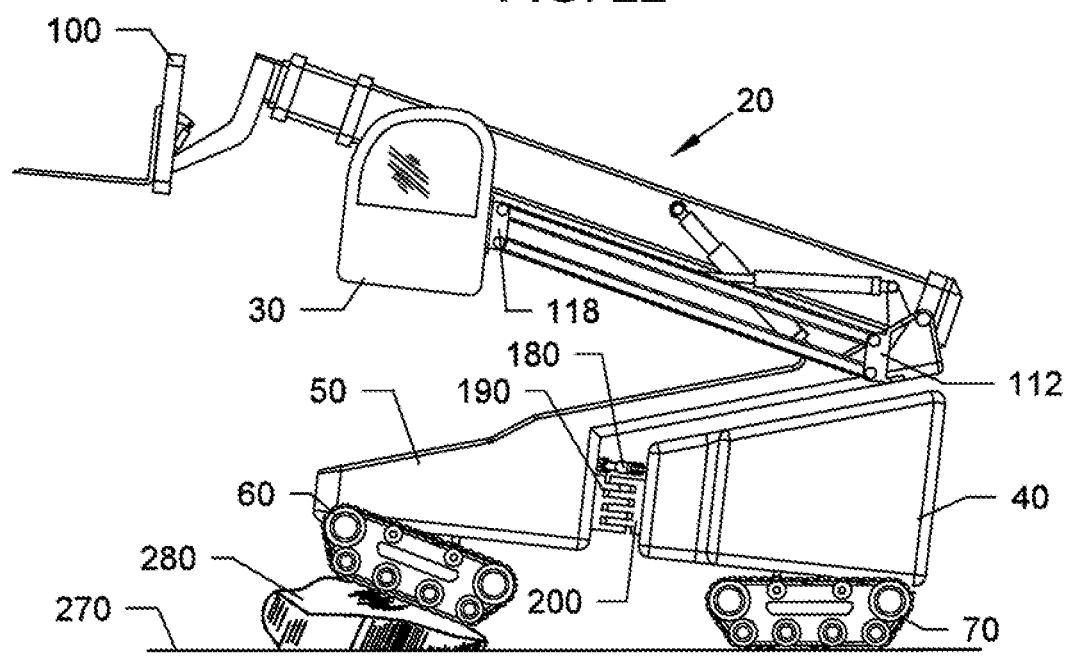
FIG. 22 is a right side view of vehicle of FIG. 21 showing the utility of the articulating tracks in overcoming an obstacle.

FIG. 21 is a top right perspective view of the vehicle 10 of the preceding figures showing how the track assemblies 60 and 70 can oscillate by rotating about and relative to their axles 160, 165, and 170, respectively. The track assemblies 60, 70 may also be locked in any oscillated position. FIG. 22 is a right side view of vehicle 10 of FIG. 21 showing the utility of the oscillating tracks of the front track assembly 60 in overcoming an obstacle 280, such as but not limited to a rock, log, or other obstacle, and the like. The oscillating track assemblies 60, 70 provide an advantage of maintaining optimum traction and stability when the vehicle traverses ground surfaces with obstacle(s) 280, and/or a relatively level ground surface 270 and/or ground surfaces that are not level such as those shown in FIGS. 15-18.

Figure 23:
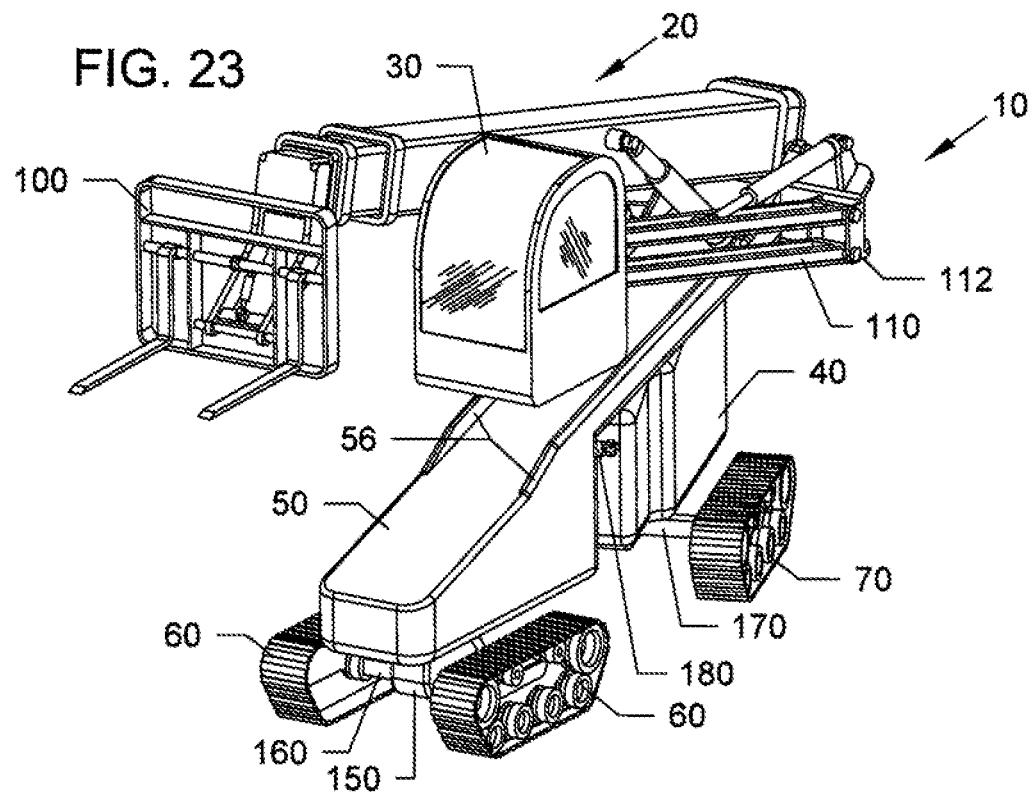
FIG. 23 is a front right perspective view of the vehicle of the preceding figures showing the rear engine compartment angled to the left relative to the superstructure on the front body.
Figure 24:
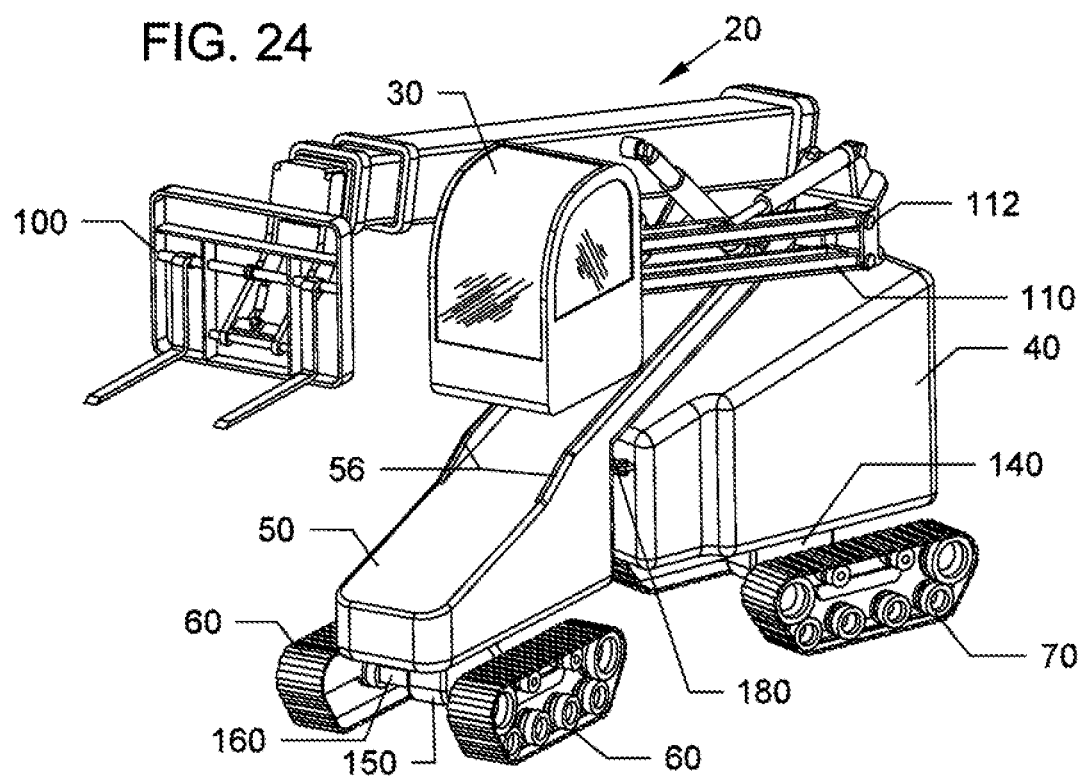
FIG. 24 is another view of FIG. 23 with the engine compartment angled to the right relative to the superstructure on the front body.

FIG. 23 is a front right perspective view of the vehicle 10 of the preceding figures showing the rear engine compartment (rear body) 40 articulated to the left relative to the superstructure on the front body 50. FIG. 24 is another view of FIG. 23 with the engine compartment (rear body) 40 articulated to the right relative to the superstructure on the front body 50.

Figure 25:
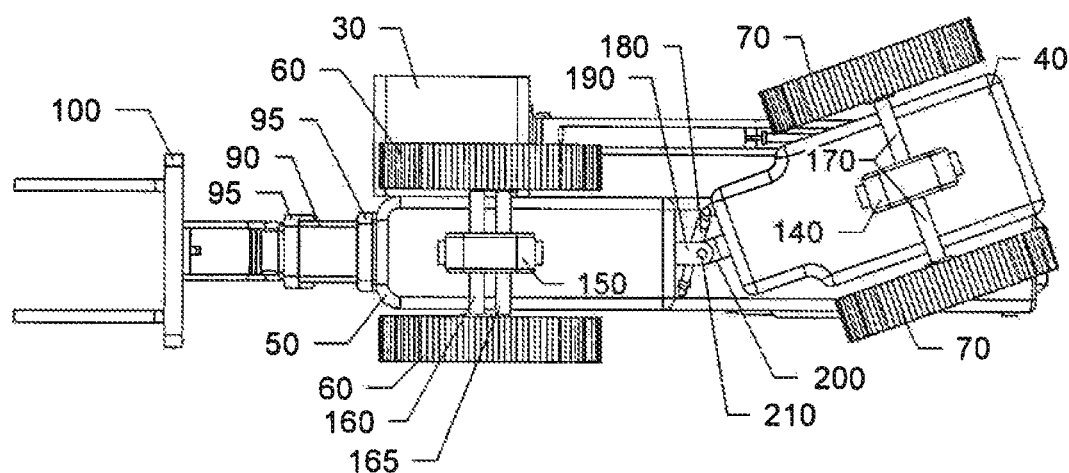
FIG. 25 is a bottom view of the vehicle of FIG. 24.
Figure 26:
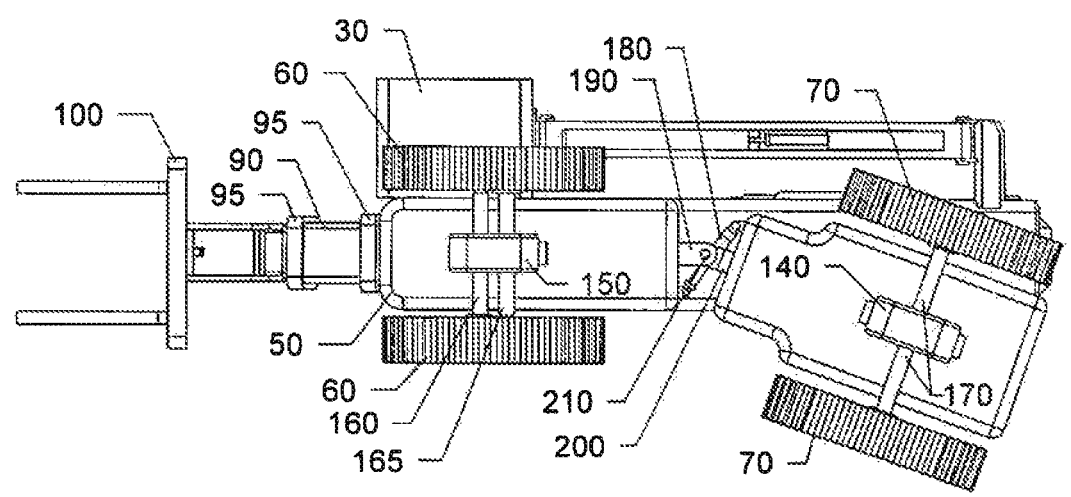
FIG. 26 is a bottom view of the vehicle of FIG. 23.

FIG. 25 is a bottom view of the vehicle 10 of FIG. 24. FIG. 26 is a bottom view of the vehicle 10 of FIG. 23.

Referring to FIGS. 5, 6, 8 and 22-26, the hinge components 190, 200, 210 allow for the front body 50 to articulate to the right or left relative to the rear body 40. A hydraulic cylinder(s), such as those previously described can be used to allow an operator in the cab 30 to manually control the angle orientation of the front body 50 to the rear body 40.

Figure 27:
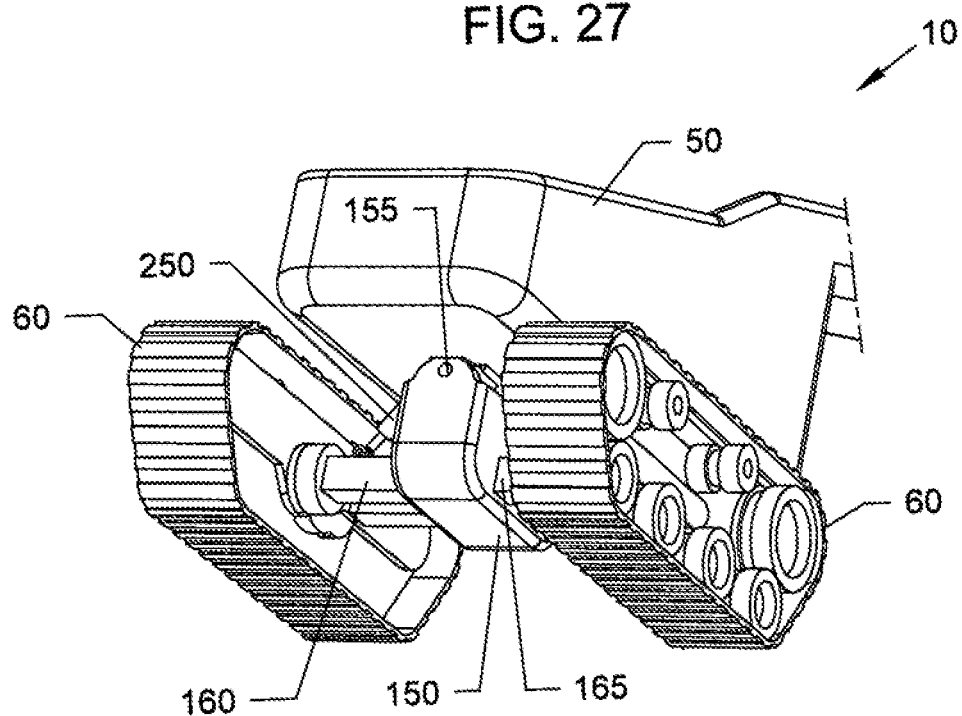
FIG. 27 is a front bottom perspective view of the front body with superstructure showing the axles and tracks, with the inner axles are retracted into the axle housings in this view.

FIG. 27 is a front bottom perspective view of the front body 50 with superstructure showing the axle housings 160, 165 and oscillating track assemblies 60 comprising the left track and the right track, with the inner telescoping axles 163, 167 (shown in FIG. 28) being retracted into the respective axle housings 160, 165 in this view.

Figure 28:
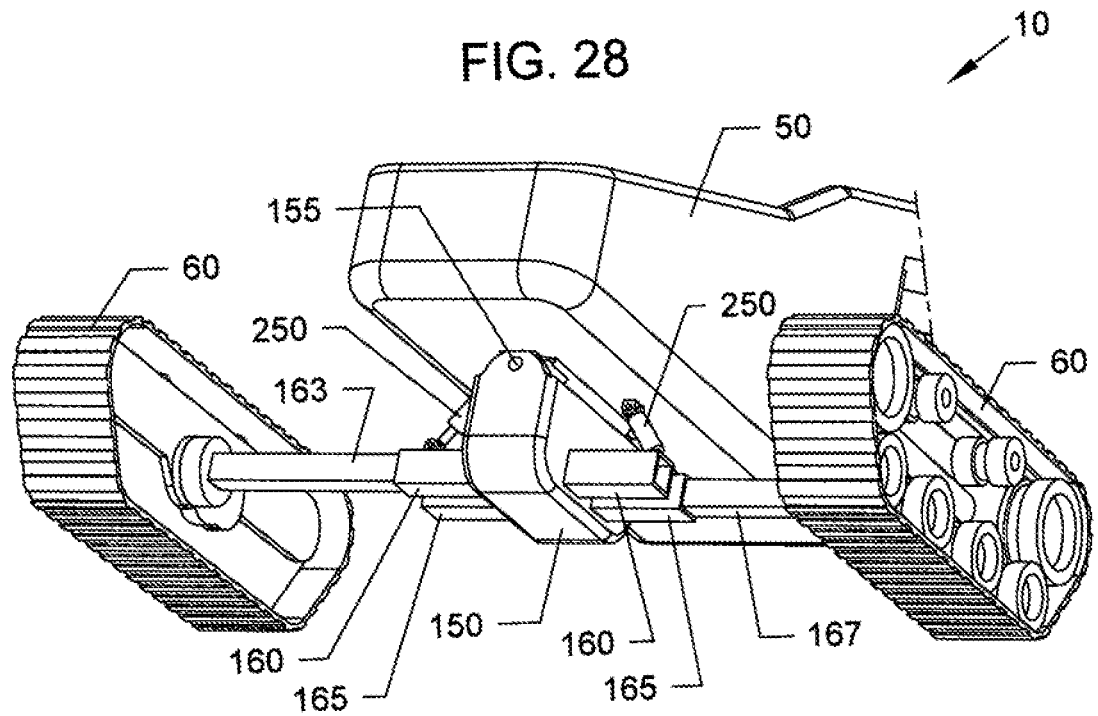
FIG. 28 is another view of FIG. 27 with the inner extendable axles fully extended. This places the tracks further away from the superstructure for increased stability.

FIG. 28 is another view of FIG. 27 with the inner extendable axles 163, 167 fully extended from their respective axle housings 160, 165, which places the right and left tracks further away from the superstructure (front body) 50 for increased stability over different ground surfaces. It is an advantage of certain embodiments that the extendable axles 163, 167 preclude any need for outrigging as used on prior art heavy equipment and machinery. By extending the extendable axles 163, 167 to maximize the distance between the tracks 60, the stability of the machinery against tipping is optimized.

Referring to FIGS. 27-28, a pair of hydraulic cylinders 250, such as those previously described can separately control each of the extendable inner axles 163, 167 as needed by the operator in the cab 30. While the levelling features shown in the preferred embodiment to not include the rear body (engine compartment) 40, the invention can also be used where both the front body (super structure) 50 and the rear body 50 both include hydraulic cylinder leveling controls.

Oscillating Track System with Oscillating Track Lock Subsystem

Turning now to FIGS. 29-34, details of an exemplary embodiment for an oscillating track system comprising an oscillating track lock subsystem solution are shown and described. As can be seen in the previous illustrations of FIGS. 1-28, the exemplary and novel telehandler comprises four oscillating track systems—two front oscillating track systems and two rear oscillating track systems. Each one or more of the oscillating track systems may further comprise an oscillating track lock subsystem, as will be shown and described in more detail below.

It is envisioned that embodiments of the novel telehandler may comprise less than four oscillating track systems such as, for example, two front oscillating track systems and two rear wheels, or vice versa. In this way, embodiments of the novel telehandler are not limited to comprising the use of four oscillating track systems. Moreover, it is envisioned that heavy equipment other than a telehandler may comprise oscillating track systems according to the solution in lieu of wheels or skids. For example, it is envisioned that heavy equipment such as, but not limited to, backhoes, crawler dozers, front end loaders, articulating loaders, excavators, skidsteers, feller bunchers, scissor lifts, boom lifts, etc. may benefit from incorporation of oscillating track systems according to the solution.

Figure 29:
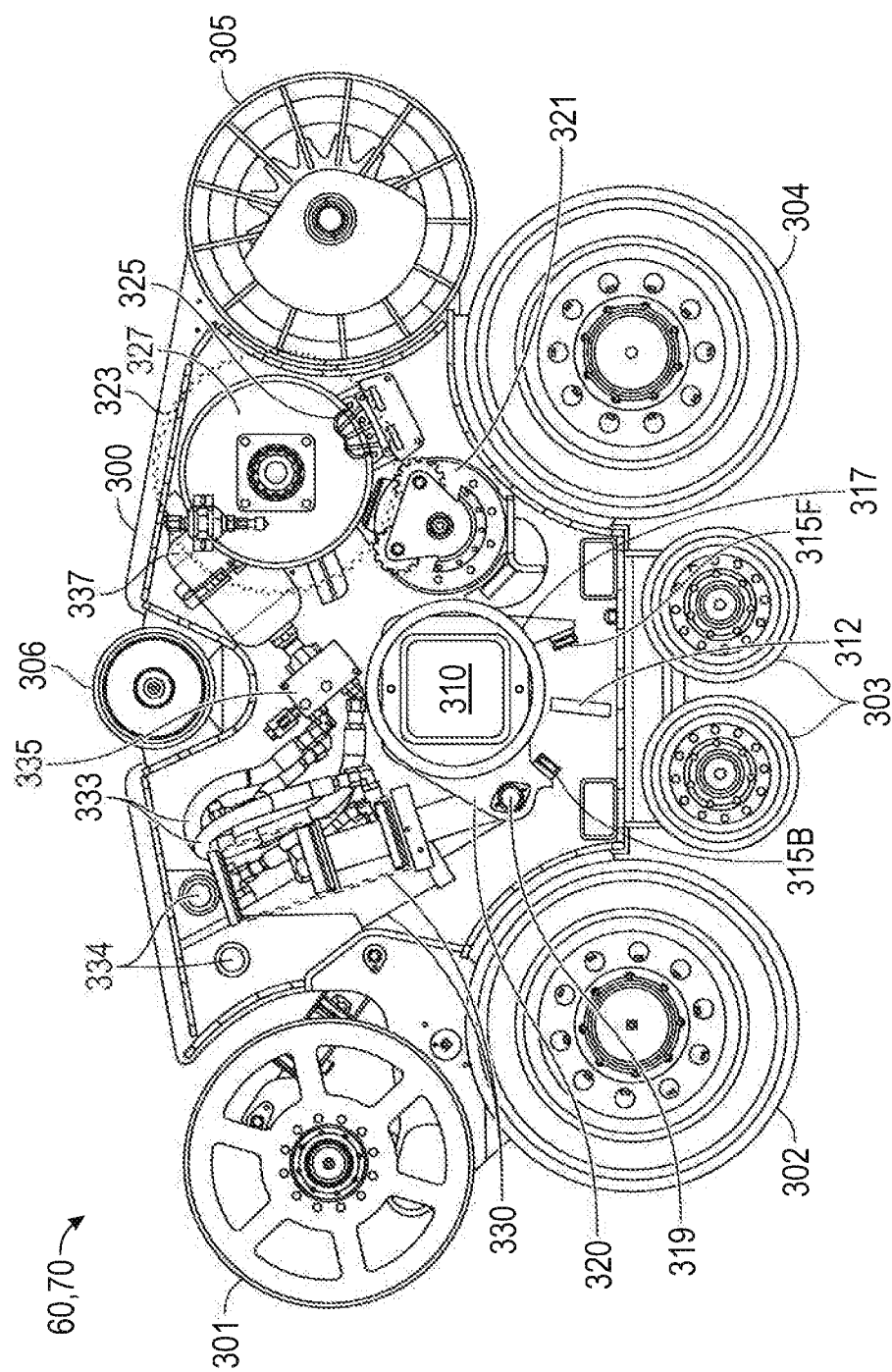
FIG. 29 is a cutaway, front-side view of an exemplary oscillating track system according to the solution, shown in a level position.

FIG. 29 is a cutaway, front-side view of an exemplary oscillating track system 60, 70 according to the solution, shown in a level position. The exemplary oscillating track system 60, 70 includes a housing 300 that defines an internal space as well as a general structure upon which various components of the system 60, 70 may be operationally mounted. Some components of the exemplary oscillating track system 60, 70 may be operationally mounted external to the housing 300 while other components may be operationally mounted within the internal space defined by the housing 300, as would be understood by one of ordinary skill in the art reviewing the figures and this disclosure. Notably, however, the particular oscillating track system 60, 70 illustrated in the figures is only exemplary in nature and, as such, it is envisioned that alternative embodiments of an oscillating track system 60, 70 may include different combinations of components operationally mounted externally versus internally to the housing 300 without departing from the scope of the solution.

Figure 30:
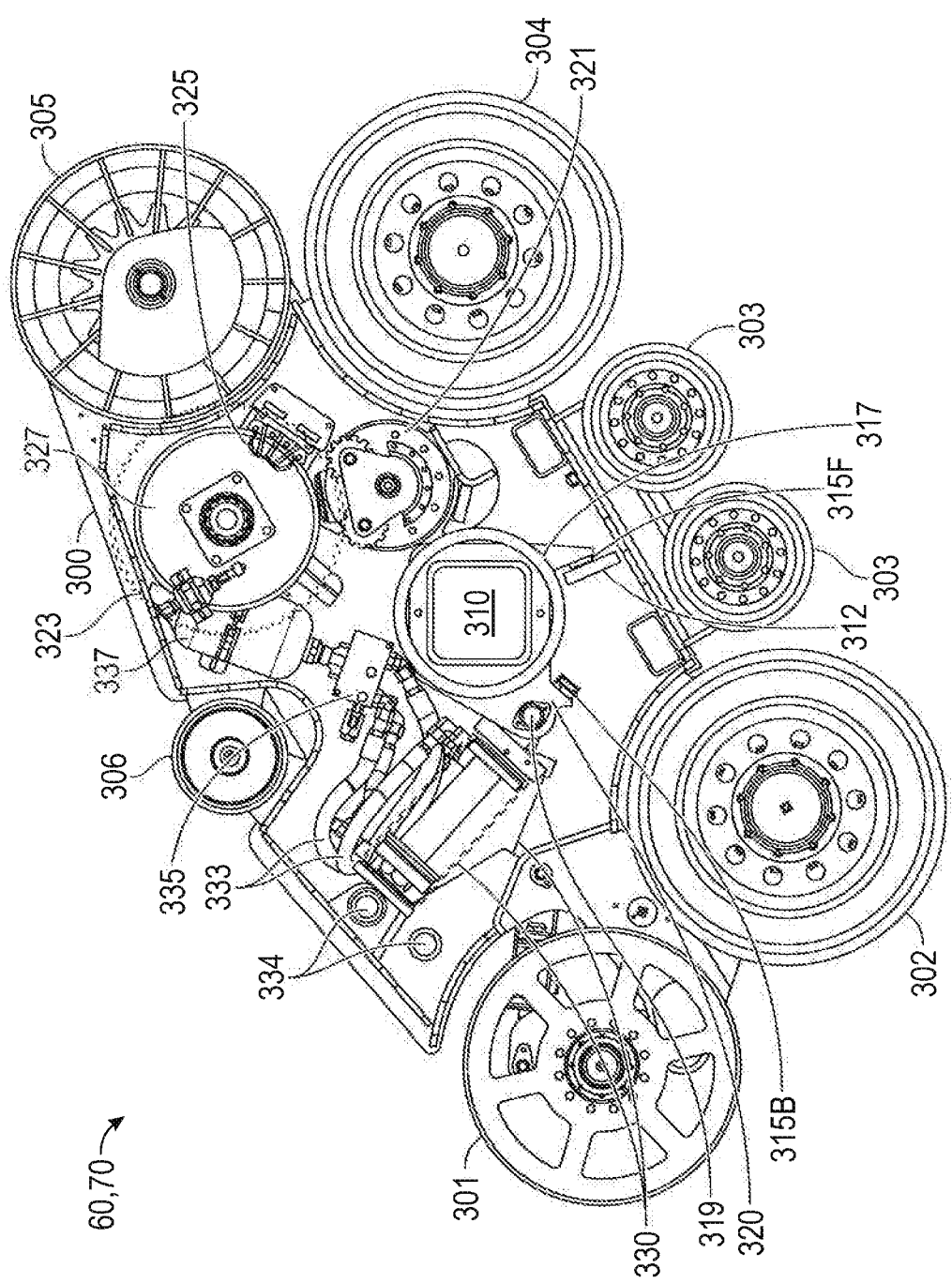
FIG. 30 is a cutaway, front-side view of the exemplary oscillating track system of FIG. 29, shown in a forward-tilt position.
Figure 31:
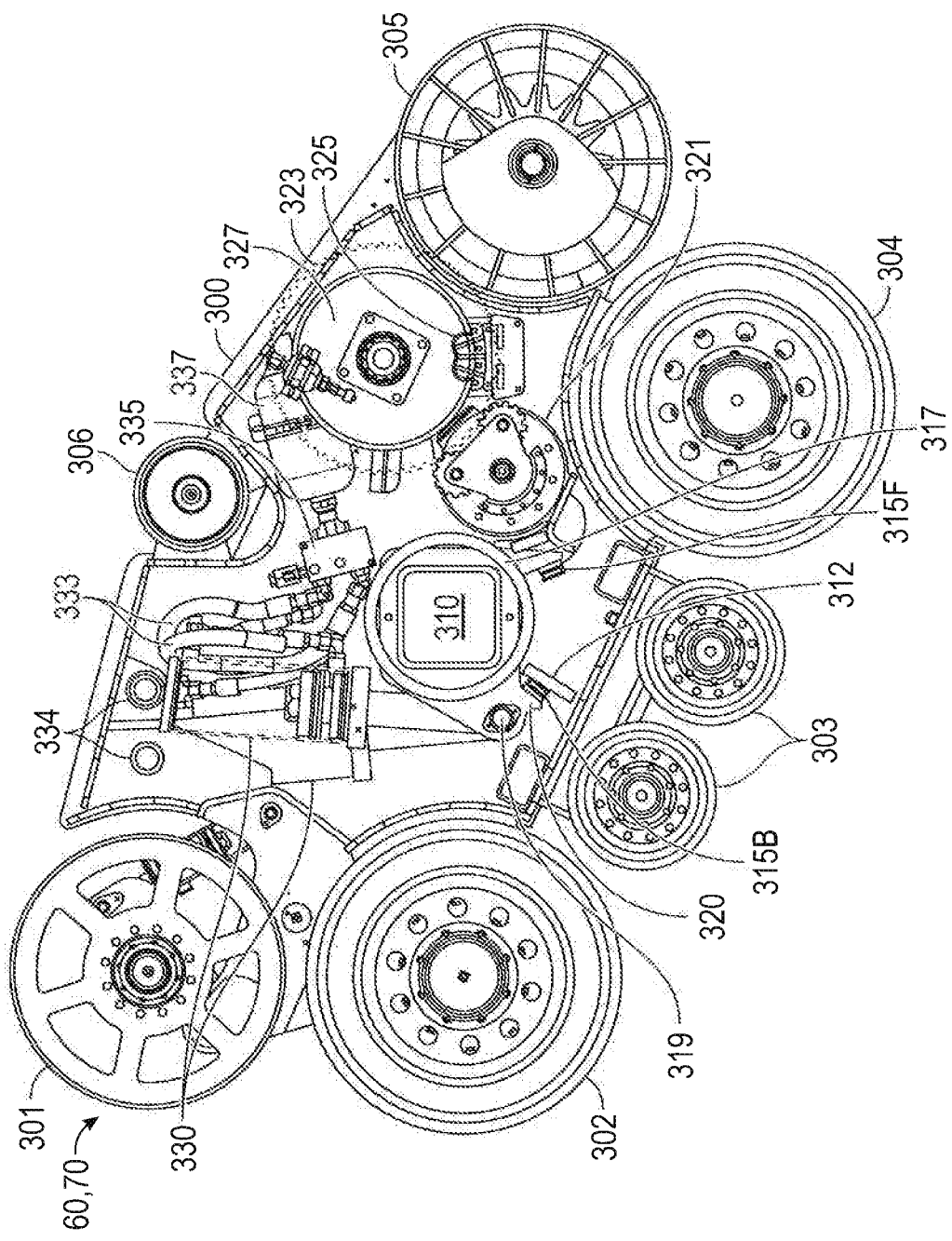
FIG. 31 is a cutaway, front-side view of the exemplary oscillating track system of FIG. 29, shown in a backward-tilt position.

As can be seen in the FIG. 29 illustration (as well as the FIGS. 30 and 31 illustrations that follow), a series of wheels 301, 302, 303, 304, 305 and 306 are mounted external to the housing 300. A track (shown in the FIGS. 1-28 illustrations, but not shown in the FIGS. 29-31 illustrations) may be simultaneously engaged with the wheels 301, 302, 303, 304, 305 and 306 such that the track is operable to rotate around and along a path defined by the outermost edges of the circumferences of the various wheels 301, 302, 303, 304, 305 and 306. In the exemplary oscillating track system 60, 70, the track (again, not shown in the FIGS. 29-31 illustrations) is driven by wheel 305. An electric motor 321 equipped with a gear drive engages a spur gear 323. As would be understood by one of ordinary skill in the art of gears and sprockets, the spur gear 323 may be sized relative to the gear drive of electric motor 321 at a ratio that optimally leverages rotational speed in view of torque.

The spur gear 323 simultaneously engages wheel 305 which may be equipped with teeth configured to transfer torque to the track and, in doing so, provide a motive force to advance the track around the oscillating track system 60, 70. Additionally, the spur gear 323 may be mechanically associated with a braking disc 327 coupled with one or more brake calipers 325. As would be understood by one of ordinary skill in the art, the speed of rotation of spur gear 323 may be slowed via application of the brake calipers 325 to braking disc 327, thereby applying a frictional force to the braking disc 327 that, in turn, slows the speed of rotation of the spur gear 323. When the spur gear rotation speed slows, so slows the rotation of the track.

The brake calipers 325 may be actuated by an operator of the particular heavy equipment (e.g., a telehandler) that is driven by the oscillating track system 60, 70 according to any number of electromechanical and/or mechanical arrangements understood in the art of braking. Moreover, although the particular braking arrangement depicted in the exemplary oscillating track system 60, 70 is of a disc/caliper type, it is envisioned that other braking arrangements may be leveraged by embodiments of the solution including, but not limited to, drum brakes, magnetic brakes, etc.

Moreover, in some embodiments of the solution, the primary braking force is associated with electric motor 321. An operator may cause the speed of rotation for the track to be decreased (or increased) by modifying or changing the rate of rotation of the shaft of motor 321. The rate of rotation of the electric motor 321 may be varied by varying the electrical power supplied to the motor 321, as would be understood by one of ordinary skill in the art of electric motors. In this way, when the electric motor 321 is powered down or up, the speed of rotation of spur gear 323 may be likewise decreased or increased. In such embodiments, the brake calipers 325 and disc 327 may function primarily as a parking brake.

Notably, although the exemplary embodiment of an oscillating track system 60, 70 shown in the figures includes an electric motor 321 equipped with a gear drive that drives a spur gear 323 that, in turn, drives a toothed wheel 305 that, in turn, provides a motive force to a track, other similar as well as not-so-similar arrangements are envisioned and will occur to those skilled in the art and, as such, embodiments of the solution for an oscillating track system will not be limited to the specific gear arrangement shown in the figures and described herein.

For example, the gear 323 and gear drive of motor 321 may, in other drivetrain arrangements, take the form of helical gears instead of the straight-toothed spur gears illustrated in the figures. As a further example, it is envisioned that any drivetrain arrangement including any combination in number and type of gears may be leveraged as deemed optimal by one of ordinary skill in the art of drivetrains for a given application and may, therefore, include any combination of spur gears, bevel gears, worm gears, planetary gears, internal/external gear combinations, etc. without departing from the scope of the solution.

Additionally, although the exemplary embodiment of an oscillating track system 60, 70 illustrated in the figures includes an electric motor 321, it is envisioned that other motor types may be leveraged in lieu of, or in addition to, an electric motor such as, but not limited to, a hydraulic motor and pump arrangement. As such, it will be understood that embodiments of the solution for an oscillating track system will not be limited to include an electric motor in the drivetrain.

The housing 300, and therefore by extension the entire oscillating track system 60, 70, is rotatably mounted around square axle 310 such that it can oscillate from a forward-tilt position to a backward-tilt position. In the FIG. 29 illustration, the exemplary oscillating track system 60, 70 is in a substantially level position relative to a plane defined by the bottom surface of square axle 310. The housing is rotatably mounted around square axle 310 via housing/axle coupling 317. Housing/axle coupling 317 may comprise bearings, grease fittings, or the like in order to deter mechanical wear as the housing/axle coupling 317 rotatably translates around axle 310.

Figure 33:
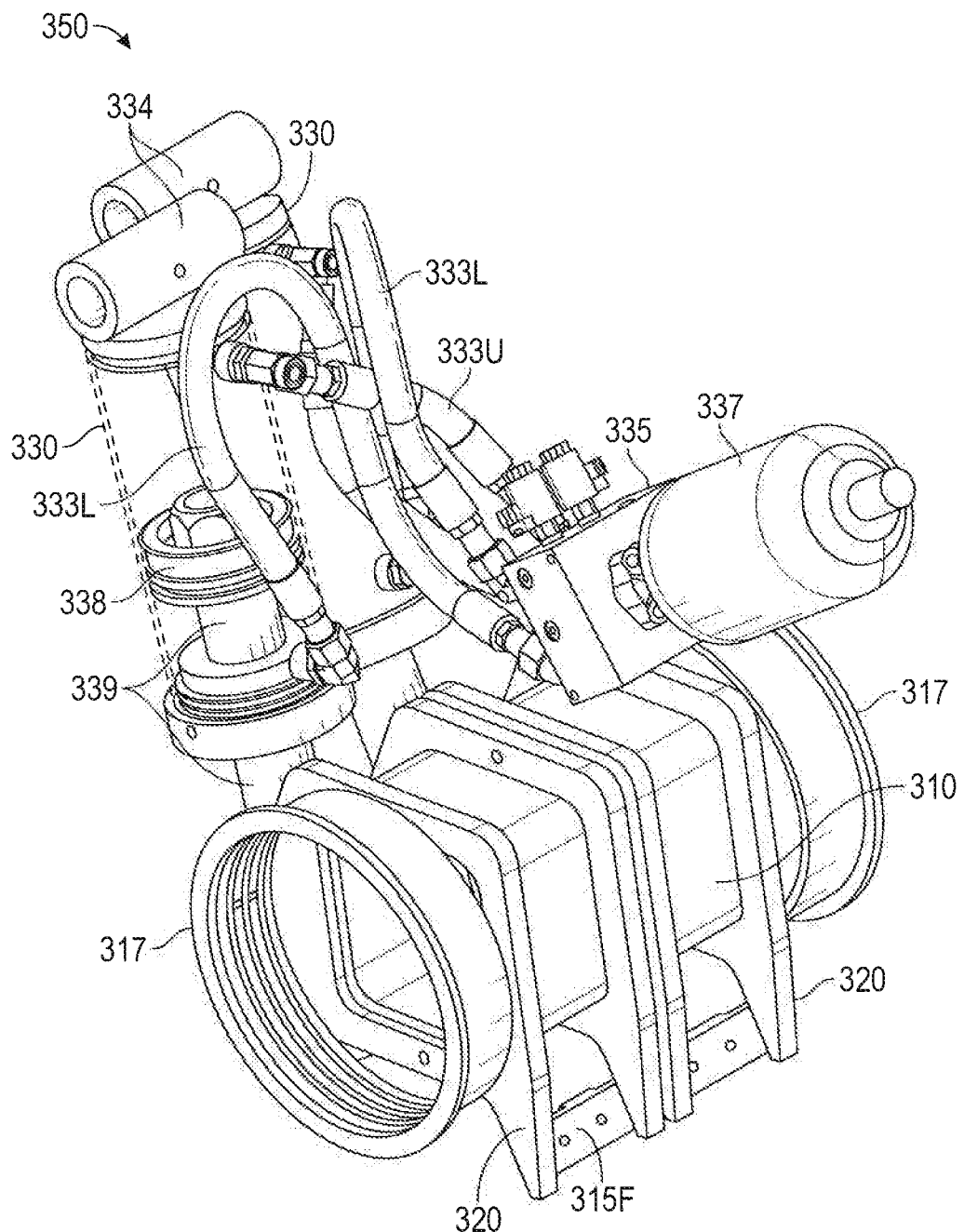
FIG. 33 illustrates the oscillating track lock subsystem comprised within the illustrations of FIGS. 29-32.

Advantageously, the exemplary oscillating track system 60, 70 includes an oscillating track lock subsystem 350 comprising an arrangement of one or more linear stroke cylinders 330, hydraulic hoses 333, one or more accumulators 337 and an isolation valve 335 (isolated in FIG. 33 illustration). The cylinders 330 are mechanically attached to the housing 300 at anchor points 334 and to the axle sleeve 320 at anchor point 319.

Notably, although the exemplary embodiment of an oscillating track lock subsystem shown in the figures comprises a pair of linear stroke cylinders 330, it is envisioned that alternative embodiments may leverage a single linear stroke cylinder or multiple cylinders and, as such, the scope of the solution is not limited to use of a pair of linear stroke cylinders 330. Advantageously, the exemplary embodiment of an oscillating track lock subsystem 350 shown in the figures leverages a pair of relatively smaller linear stroke cylinders 330 in lieu of a single, relatively larger cylinder and, in doing so, may be accommodated within the limited internal space defined by housing 300.

Returning to the FIG. 29 illustration, it can be seen that the linear stoke cylinders 330 each comprise a piston 338 and rod 339 (see FIG. 33 for more detail) with the piston 338 positioned substantially at a mid-stroke within its barrel. Correspondingly, the oscillating track system 60, 70 is in a relatively level position as described above. With the oscillating track system 60, 70 in a relatively level position, both a forward-tilt limit stop 315F and a backward-tilt limit stop 315B are substantially equidistant from a stop block aspect 312. The stop block aspect 312 is fixedly mounted internal to the housing 300.

As will be shown in more detail below relative to the FIG. 33 illustration, the oscillating track lock subsystem 350 freely accommodates an oscillating, up and down, movement of the oscillating track system 60, 70 as it follows undulating terrain. As one of ordinary skill in the art would recognize, as an oscillating track system 60, 70 is in operation and traversing uneven ground, the track system 60, 70 may follow the contours of the ground, thereby forward-tilting as the ground beneath the system 60, 70 declines and backward-tilting as the ground beneath inclines (see FIGS. 21-22). This oscillating movement of the track system 60, 70 works to rotatably move the track system 60, 70 about the axle 310 via housing/axle coupling 317, as previously described. Correspondingly, the piston(s) 338 translate linearly up and down, with the piston(s) 338 retracting rod(s) 339 within the barrel(s) as the track system 60, 70 moves toward a more forward-tilted position and extending rod(s) 339 from the barrel(s) as the track system 60, 70 moves toward a more backward-tilt position.

As the track system 60, 70 oscillates, and the piston(s) 338 correspondingly translate their positions linearly, hydraulic fluid flows in and out of the barrels of the linear stroke cylinders 330 in accordance with the movement of the piston(s) 338. The hydraulic fluid accordingly passes back and forth through valve 335 and, in concert, in and out of accumulator 337. Advantageously, an operator of heavy equipment that leverages an oscillating track system 60, 70 having an oscillating track lock subsystem 350 may cause the valve 335 to actuate to a closed position, thereby stopping the flow of hydraulic fluid through the subsystem 350 and effectively locking the oscillating track system 60, 70 in whatever position it may have taken.

In this way, the oscillating track lock subsystem 350 may prevent the entire oscillating track system 60, 70 from oscillating, as any rotational movement of the system 60, 70 relative to the axle 310 is prevented when hydraulic fluid is unable to flow in and out of the cylinders 330. Subsequently, the operator may actuate valve 335 to an open flow state, thereby allowing for hydraulic fluid flow through the oscillating track lock subsystem 350 to resume and, in turn, allow for the oscillating track system 60, 70 to oscillate about axle 310.

Notably, the exemplary embodiment of an oscillating track lock subsystem 350 shown in the figures is of a hydraulic arrangement and, advantageously, does not necessarily include a hydraulic pump—the motive force for the fluid flow is provided by the oscillating movement of the oscillating track system 60, 70 as it traverses uneven terrain. Even so, embodiments of the solution for an oscillating track lock subsystem do not necessarily preclude the use of hydraulic pump(s) to assist in hydraulic fluid circulation during normal operation or to provide an alternative motive force that may be leveraged to adjust the rotational position of the track system 60, 70 relative to the axle 310.

Additionally, although the exemplary embodiment of an oscillating track lock subsystem 350 illustrated in the figures is of a hydraulic arrangement, the scope of the solution is not so limited as it is envisioned that alternative embodiments may leverage pneumatic and/or electromechanical arrangements. For example, it is envisioned that an oscillating track lock subsystem may utilize electromagnets in lieu of valve 335 to prevent free movement of a mechanical linkage, thereby locking the subsystem in a position, or utilize a compressor and releasable air brake arrangement to prevent free oscillation.

Moreover, the valve 335 in the exemplary embodiment of an oscillating track lock subsystem 350 illustrated in the figures is of a solenoid type, however, the scope of the solution is not so limited as it is envisioned that alternative embodiments of valve 335 may be in the form of an electrically or pneumatically or hydraulically actuated ball valve or some other quarter-turn valve type. Further, valve 335 may be of a linearly actuated type, whether actuated with an electric actuator, pneumatic actuator or hydraulic actuator such as, but not limited to, a gate valve, a needle valve, or a pinch valve.

With regards to the accumulator 337, it is envisioned that the accumulator may preferably be of a bladder type, although it is envisioned that embodiments of the solution may instead leverage a piston-styled accumulator or other accumulator design particularly suited for a given application. As one of ordinary skill in the art of accumulators understands, a compressible gas may be contained within the accumulator tank such that it is on the "outside" of a bladder, for example, that is also within the accumulator tank. As hydraulic fluid, for example, is forced into the bladder the bladder expands and the compressible gas compresses to accommodate a reduced volume. The compressed gas provides a motive force to urge the hydraulic fluid out of the bladder when needed elsewhere in the system such as, for example, within linear cylinders 330 of the exemplary oscillating track lock subsystem. As one of ordinary skill in the art of accumulators would recognize, a piston-styled accumulator may leverage a compressible gas on the topside of a piston within a barrel, thereby facilitating flow of a hydraulic fluid (or some other fluid) in and out of the accumulator within a volume defined within the barrel beneath the piston.

Turning now to FIG. 30, illustrated is a cutaway, front-side view of the exemplary oscillating track system 60, 70 of FIG. 29, shown in a forward-tilt position. Referring to the description above regarding the oscillation of the oscillating track system 60, 70, it can be understood from the FIG. 30 illustration that the track system 60, 70 has oscillated to a forward-tilted position in response to a declining terrain. The oscillating track lock subsystem 350 may remain in an unlocked state with the valve 335 allowing for hydraulic fluid flow through the subsystem 350.

The piston(s) 338 have taken fully retracted positions into their respective barrels and, in doing so, operate to contract the distance between the housing anchor points 334 to the axle sleeve anchor points 319. To ensure that the piston(s) 338 are not stroked beyond their limits, forward-tilt limit stop 315F can be seen engaged to stop block aspect 312. Advantageously, actuation of valve 335 such that hydraulic fluid flow through oscillation track lock subsystem 350 is prevented will secure or "lock" the position of the oscillating track system and prevent oscillation away from the forward-tilted position.

FIG. 31 is a cutaway, front-side view of the exemplary oscillating track system 60, 70 of FIG. 29, shown in a backward-tilt position. Referring to the description above regarding the oscillation of the oscillating track system 60, 70, it can be understood from the FIG. 31 illustration that the track system 60, 70 has oscillated to a backward-tilted position in response to an inclined terrain. The oscillating track lock subsystem 350 may remain in an unlocked state with the valve 335 allowing for hydraulic fluid flow through the subsystem 350. The piston(s) 338 have taken fully extended positions toward the bottoms of their respective barrels and, in doing so, extend the rods 339 from the barrels to fully extend the distance between the housing anchor points 334 to the axle sleeve anchor points 319. To ensure that the piston(s) 338 are not stroked beyond their limits, backward-tilt limit stop 315B can be seen engaged to stop block aspect 312. Advantageously, actuation of valve 335 such that hydraulic fluid flow through oscillation track lock subsystem 350 is prevented will secure or "lock" the position of the oscillating track system and prevent oscillation away from the backward-tilted position.

Figure 32:
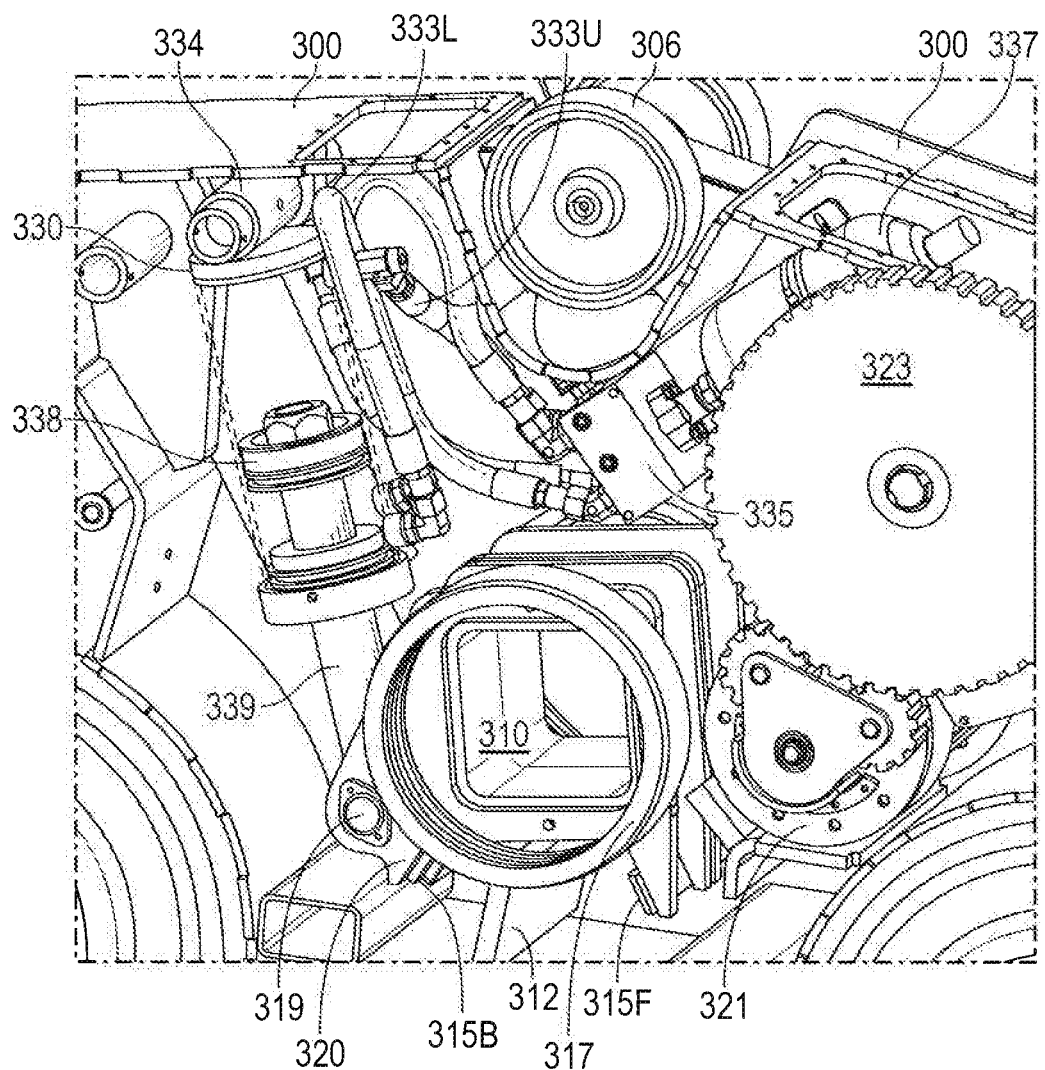
FIG. 32 is a close-up of the cutaway, front-side view of the exemplary oscillating track system of FIG. 29, illustrating various components of an oscillating track lock subsystem and gear drive.

FIG. 32 is a close-up of the cutaway, front-side view of the exemplary oscillating track system 60, 70 of FIG. 29, illustrating various components of an oscillating track lock subsystem 350 and gear drive. As can be better seen in the FIG. 32 illustration, the piston 338 is in a mid-stroke ranged position within its barrel such that the rod 339 is partially extended. As such, the distance between the housing anchor points 334 are at a mid-range distance from the axle sleeve anchor points 319. The axle sleeve 320 is mechanically fixed to the square axle 310 and does not rotate around axle 310. Consequently, extension or retraction of the rod 339 operates to modulate the distance between connection points 334 and 319 such that the housing 300 of the entire oscillating track system is rotated, or oscillated, about the axle 310.

During such modulation, hydraulic fluid flows in and out of a lower volume beneath piston 338 via hoses 333L and, similarly, flows in and out of an upper volume above piston 338 via hoses 333U. As described above, the hydraulic fluid transfers from the upper and lower volumes in the cylinders 330 via the valve 335 and accumulator 337. Open flow paths through valve 335 allow for oscillation of the oscillating track system 60, 70 while closed flow paths through valve 335 work to prevent oscillation of the system 60, 70.

FIG. 33 illustrates the oscillating track lock subsystem 350 comprised within the illustrations of FIGS. 29-32. Anchor points 334 fix the linear cylinders 330 to the housing 300 (not shown in FIG. 33). Hydraulic fluid flow through hoses 333 allow hydraulic fluid to pass through valve 335, with excess hydraulic fluid volume being accommodated by accumulator 337. As can be seen in the FIG. 33 illustration, the piston 338 is in a substantially mid-range position within its barrel such as that which was illustrated and described above relative to FIG. 29. The axle sleeve 320 is rigidly attached to the axle 310 and provides for connection points 319 as previously described (not seen in FIG. 33). Axle sleeve 320 also provides for limit stops 315. Housing/axle coupling 317 enables the housing 300 (not shown in FIG. 33) to rotate or oscillate about the axle 310 as the oscillation track lock subsystem 350 modulates.

Figure 34:
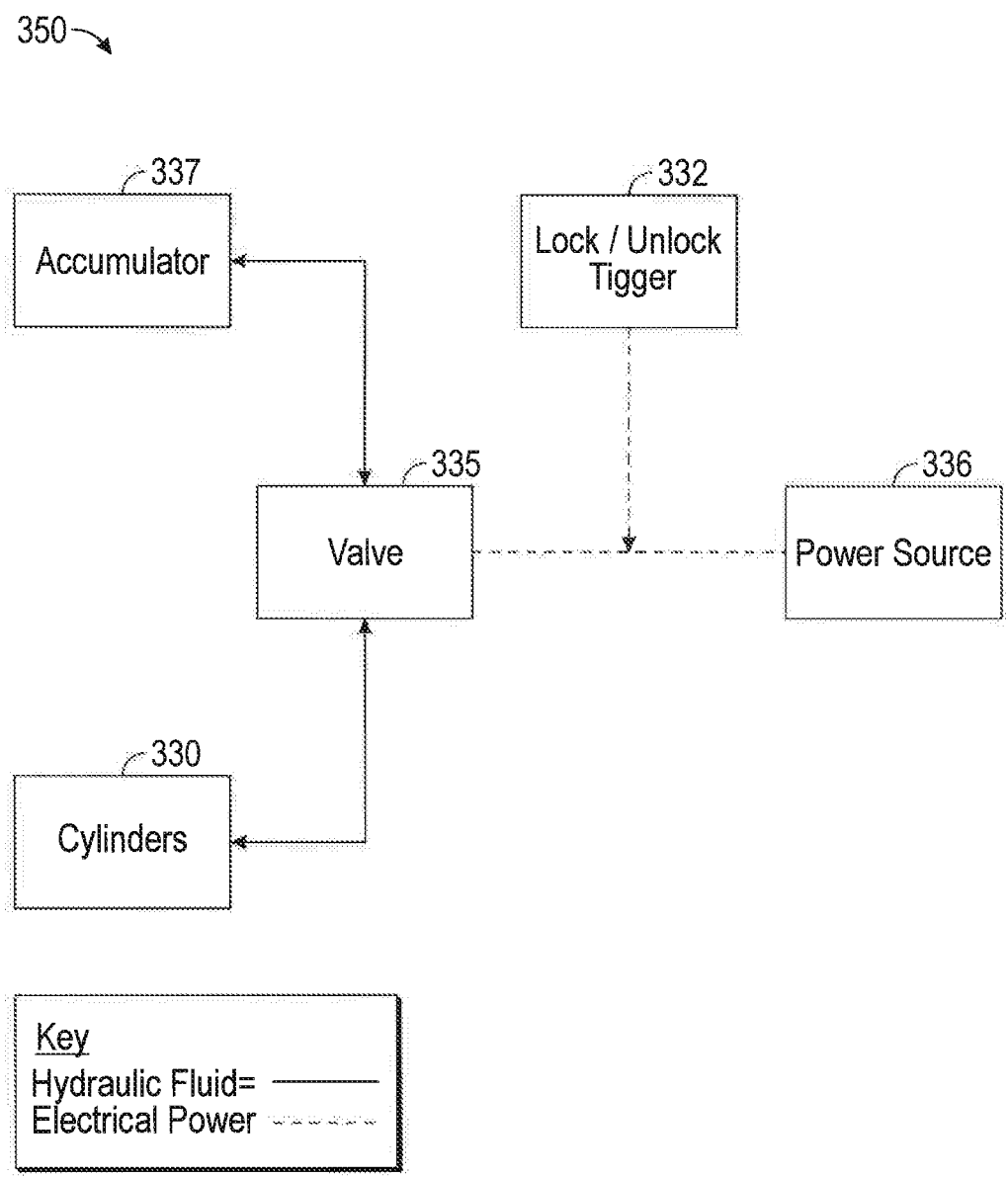
FIG. 34 is a functional block diagram of an exemplary oscillating track lock subsystem according to the solution.

FIG. 34 is a functional block diagram of an exemplary oscillating track lock subsystem 350 according to the solution. A power source 336, such as a 24 VDC or 120 Vac power source, may be in electrical communication with valve 335. As previously described, valve 335 may be a solenoid driven valve and, as such, application or removal of a power supply to the valve 335 may cause it to transition between open and closed states. The valve 335 may be a "normally open" valve in which the fluid flow through the valve body is open when power supply is removed from the solenoid.

Similarly, the valve 335 may be a "normally closed" valve in which the fluid flow through the valve body is closed when power supply is removed from the solenoid. An operator of the oscillating track lock subsystem may "make or break" the power supply circuit from the power source 336 to the valve 335 using a lock/unlock trigger 332. Simply stated, the lock/unlock trigger 332 may be a mechanical button or touchscreen radio button accessible by a user. Other forms of a lock/unlock trigger 332 are envisioned and will occur to those of skill in the art.

Actuating the lock/unlock trigger 332 may cause the valve to switch between states of open flow and closed flow. The valve 332, when in an open flow state, allows a hydraulic fluid to freely pass from the accumulator 337 to the upper and lower volumes defined within the cylinders 330, as previously shown and described. Similarly, the valve 332, when in a closed flow state, prevents flow of hydraulic fluid within the subsystem 350 and, in doing so, prevents the oscillating track system 60, 70 from oscillating, as previously shown and described.

Front Tracks Maintained at Predetermined Angle Relative to Superstructure

Figure 35:
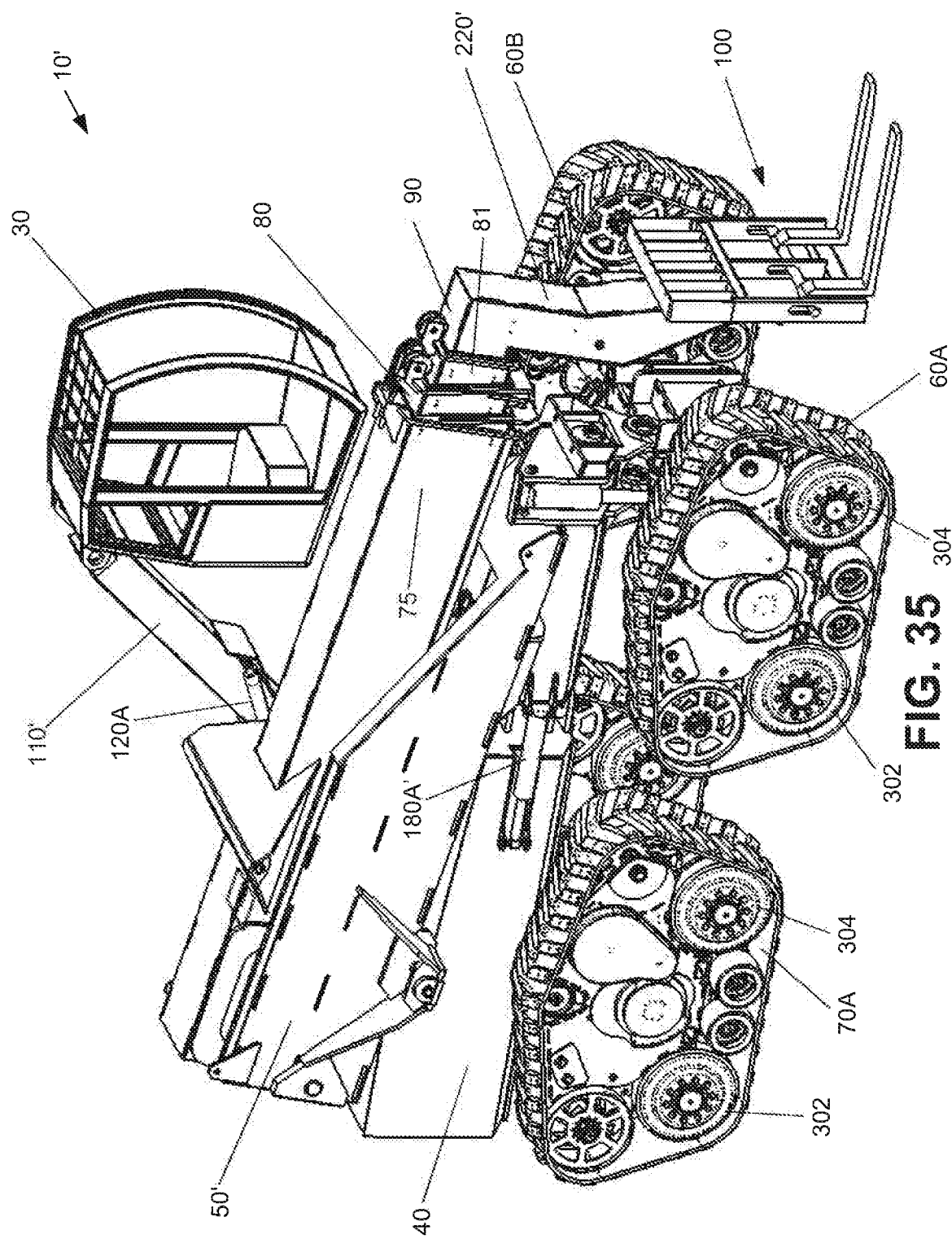
FIG. 35 illustrates a side perspective view of an all-terrain vehicle with articulating tracks according to an alternate exemplary embodiment.

Referring now to FIG. 35, this figure illustrates a side perspective view of an all-terrain vehicle 10' with articulating tracks 60, 70 according to an alternate exemplary embodiment. FIG. 35 generally corresponds to the prior exemplary embodiments disclosed above and illustrated in FIGS. 1-34. Only the differences between the FIG. 35 and subsequent FIGS. 35-60 will be described below.

In FIG. 35, the front telescoping tracks 60A, 60B are shown to be in their fully extended or fully telescoped position relative to the superstructure 50'. Both of the front tracks 60A, 60B and both of the rear tracks 70A, 70B have wheels 302, 304 which were described previously in connection with the exemplary embodiment illustrated in FIG. 29. That is, the front tracks 60A, 60B and rear tracks 70A, 70B are the same as described in connection with the exemplary oscillating track system shown and described above in connection with FIG. 29.

According to this exemplary embodiment shown in FIG. 35, the superstructure 50' has a unique shape/geometry compared to the superstructure 50 described above in connection with FIGS. 1-28 described above. Further details of superstructure 50' will be described below in connection with FIGS. 44-46.

According to this exemplary embodiment of FIG. 35, the large boom section 75 houses three other boom sections 80, 81, and 90, compared to only two boom sections 80, 90 shown in FIGS. 1-14. That is, the large boom section 75 coupled to the superstructure 50' has three telescoping boom sections 80, 81, and 90. Meanwhile, the large boom section 75 in FIGS. 1-14 houses only two boom sections 80, 90.

Further, the fork bracket 220' of FIG. 35 is a little different compared to the fork bracket 220 shown in FIG. 1. For example, the fork bracket 220' of FIG. 35 has a length which is a little longer compared to the bracket 220 shown in FIG. 1.

The front superstructure 50' may be articulated relative to the rear body/engine compartment 40 by an articulation point.

Another difference illustrated in FIG. 35 is the cab boom section 110'. Meanwhile, FIG. 1 shows a cab linkage 110 which has two beam like structures which articulate the cab 30 shown in FIG. 1.

Figure 36:
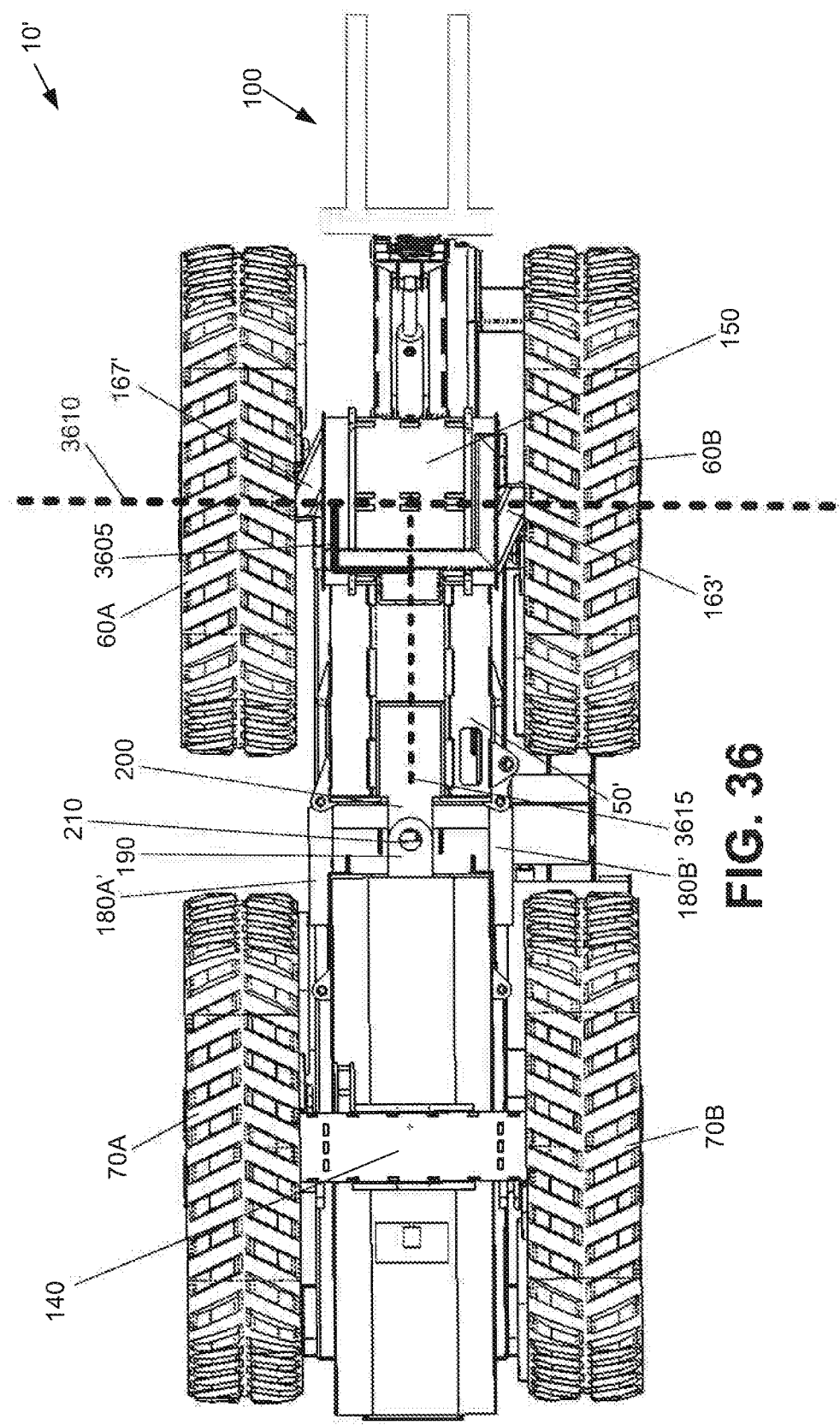
FIG. 36 illustrates a bottom view of the all-terrain vehicle shown in FIG. 35.

Referring now to FIG. 36, this figure illustrates a bottom view of the all-terrain vehicle 10' shown in FIG. 35. According to this exemplary embodiment, the front telescoping tracks 60A, 60B have been contracted to their most reduced or contracted position relative to the front superstructure 50'.

One inventive aspect of the all-terrain vehicle 10' is that the right telescoping axle 163' and the left telescoping axle 167' keep or maintain the two front tracks 60A, 60B at a predetermined angle relative to a longitudinal axis 3615 of the front superstructure 50'. Specifically, that predetermined angle is right angle or ninety degrees shown with label 3605. In other words, the telescoping axles 163', 167' as well as the front bracket 150 keep the front two telescoping tracks 60A, 60B at a ninety-degree angle 3605 relative to the longitudinal axis 3615 of the front superstructure 50'.

The telescoping axles 163', 167' and front bracket 150 define a driving axis 3610 which is at a ninety degree angle 3605 relative to the longitudinal axis 3615 of the front superstructure 50'. This fixed ninety degree angle 3605 of the tracks 60A, 60B keeps the front superstructure 50' very stable when the large boom section 75 and corresponding smaller, telescoping boom sections 80, 81, and 90 start extending, such as while lifting heavy loads with the front fork assembly 100.

According to the exemplary embodiment illustrated in FIG. 36, the telescoping axles 163', 167' may be formed by angled beams compared to the exemplary, straight/straight-line telescoping axles 163, 167 shown in FIG. 29. While the telescoping axles 163', 167' may comprise beams at an angle relative to the longitudinal axis 3615 of the front superstructure 50', these angled beams 163', 167' function identically to those axles 163, 167 of FIG. 29. That is, the angled beams forming axles 163', 167' still keep the front telescoping trax 60A, 60B at the fixed, ninety-degree angle 3605 relative to the longitudinal axis 3615 of the front superstructure 50'.

Also illustrated in FIG. 36 are hinge brackets 190, 200. Hinge bracket 200 is coupled to the front superstructure 10' while the hinge bracket 190 is coupled to the rear body/engine compartment 40. The hinge brackets 190, 200 may be coupled together by a hinge bracket pin 210.

The hinge bracket pin 210 may also be referred to as an articulation point. This articulation point 210 facilitates steering of the vehicle 10' in conjunction with the hydraulic cylinders 180A, 180B which apply forces to cause the superstructure 10' and rear body 40 to move relative to each other based on the articulation point 210.

It is noted that hydraulic cylinders are referenced throughout this detailed description as the main actuators for creating forces/movements between parts. However, each actuator may comprise other types of systems instead of hydraulic systems. For example, each actuator may comprise a pneumatic system, a servo-motor system, gear(s)/belt-drive(s), and electrical types of moving systems, or a combination thereof. As another non-limiting example, certain embodiments of the solution may employ a motor-screw-type/electromechanical actuators instead of hydraulic ones shown. Thus, other actuator types are possible for the illustrated embodiments and are within the scope of this disclosure as understood by one of ordinary skill in the art.

Figure 37:
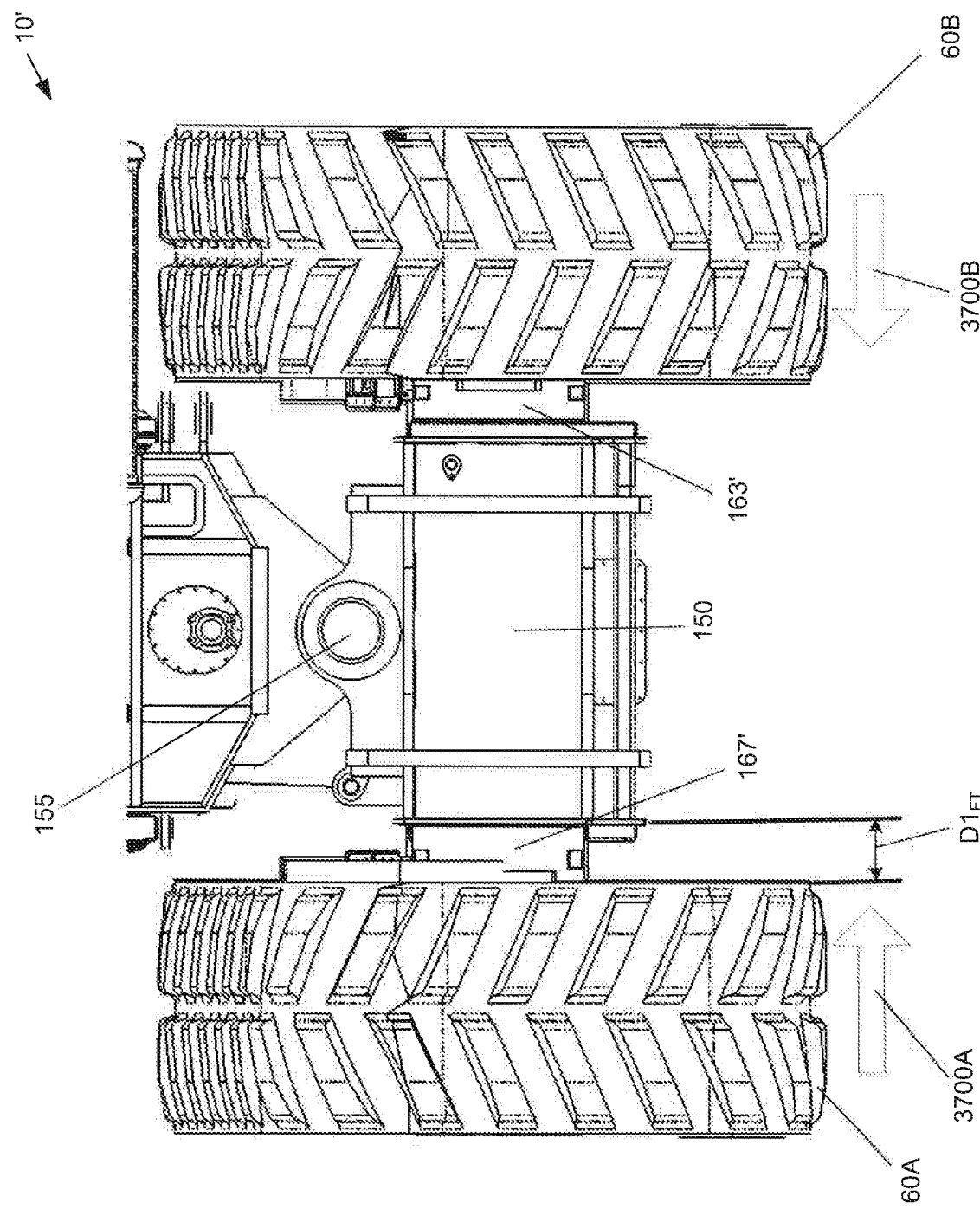
FIG. 37 illustrates an exemplary front view of the all-terrain vehicle shown in FIG. 35 with front tracks in a contracted position.

Referring now to FIG. 37, this figure illustrates an exemplary front view of the all-terrain vehicle 10' shown in FIG. 34 with the front tracks 60A, 60B in a contracted position. Specifically, in this front view of FIG. 37, the front telescoping tracks 60A, 60B are shown to be in their fully contracted position as indicated by directional arrows 3700A, 3700B. That is, the telescoping axles 163', 167' are fully contracted within the bracket 150.

In the contracted position shown in FIG. 37, the telescoping axles 163', 167' keep the front tracks 60A, 60B at a first distance $D1_{FT}$ from the front bracket 150 of about, or substantially 6.0 inches. Other magnitudes smaller or greater for the first distance $D1_{FT}$ are possible and are within the scope of this disclosure.

Also illustrated in FIG. 37 is a bracket hinge pin 155. Bracket hinge pin 155 functions in the same way as described above in connection with FIGS. 19-20. The bracket hinge pin 155 allows tracks 60A, 60B to oscillate around the longitudinal axis 3615 (FIG. 36), as shown in FIGS. 19-20. Meanwhile, the bracket 150 with the telescoping axles 163', 167' still maintain the tracks 60A, 60B at a ninety-degree angle relative to the longitudinal axis 3615 as shown in FIG. 36.

Figure 38A:
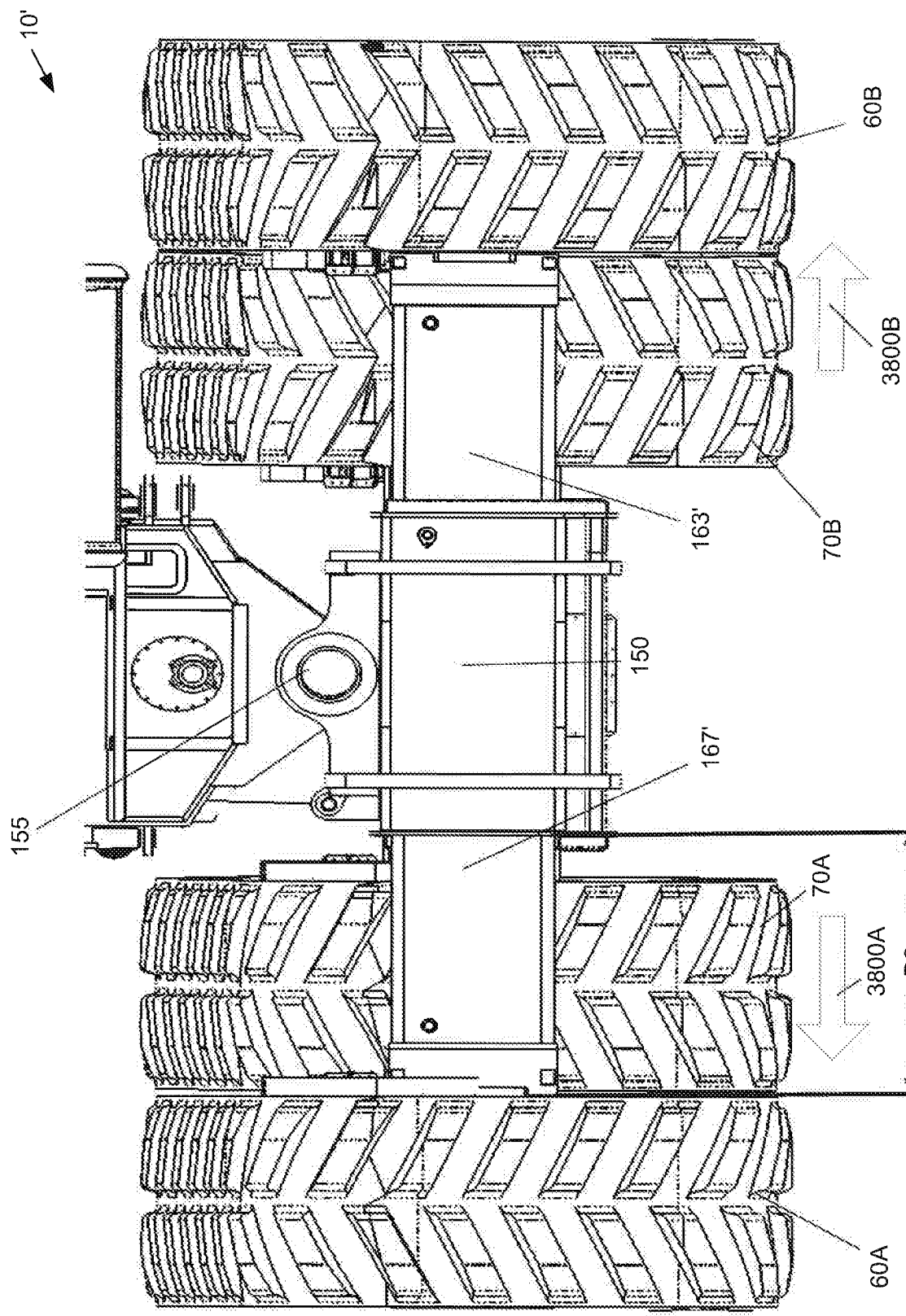
FIG. 38A illustrates an exemplary front view of the all-terrain vehicle shown in FIG. 34 and FIG. 37 but with the front tracks in a fully extended position.

Referring now to FIG. 38A, this figure illustrates an exemplary front view of the all-terrain vehicle 10' shown in FIG. 34 and FIG. 37 but with the front tracks 60A, 60B in a fully extended position. Specifically, in this front view of FIG. 38A, the front telescoping tracks 60A, 60B are shown to be in their fully extended position as indicated by directional arrows 3800A, 3800B. That is, the telescoping axles 163', 167' are fully extended relative to the bracket 150.

In the extended position shown in FIG. 38A, the telescoping axles 163', 167' keep the front tracks 60A, 60B at a second distance $D2_{FT}$ from the front bracket 150 of about, or substantially 30.0 inches. Other magnitudes smaller or greater for this second distance $D2_{FT}$ are possible and are within the scope of this disclosure.

Also illustrated in FIG. 38A are rear tracks 70A, 70B. Rear tracks 70A, 70B are now visible in FIG. 38 because the front tracks 60A, 60B have been extended away from the bracket 150 in their fully extended position. The rear tracks 70A, 70B remain at a fixed distance relative to the longitudinal axis 3615 of the superstructure 50' (the longitudinal axis 3615 is also defined by/corresponds with the hinge pin 155). Usually, the fixed distance for the rear tracks 70A, 70B is equal to the first distance D1FT described above in connection with FIG. 37 for the front tracks 60A, 60B.

Figure 38B:
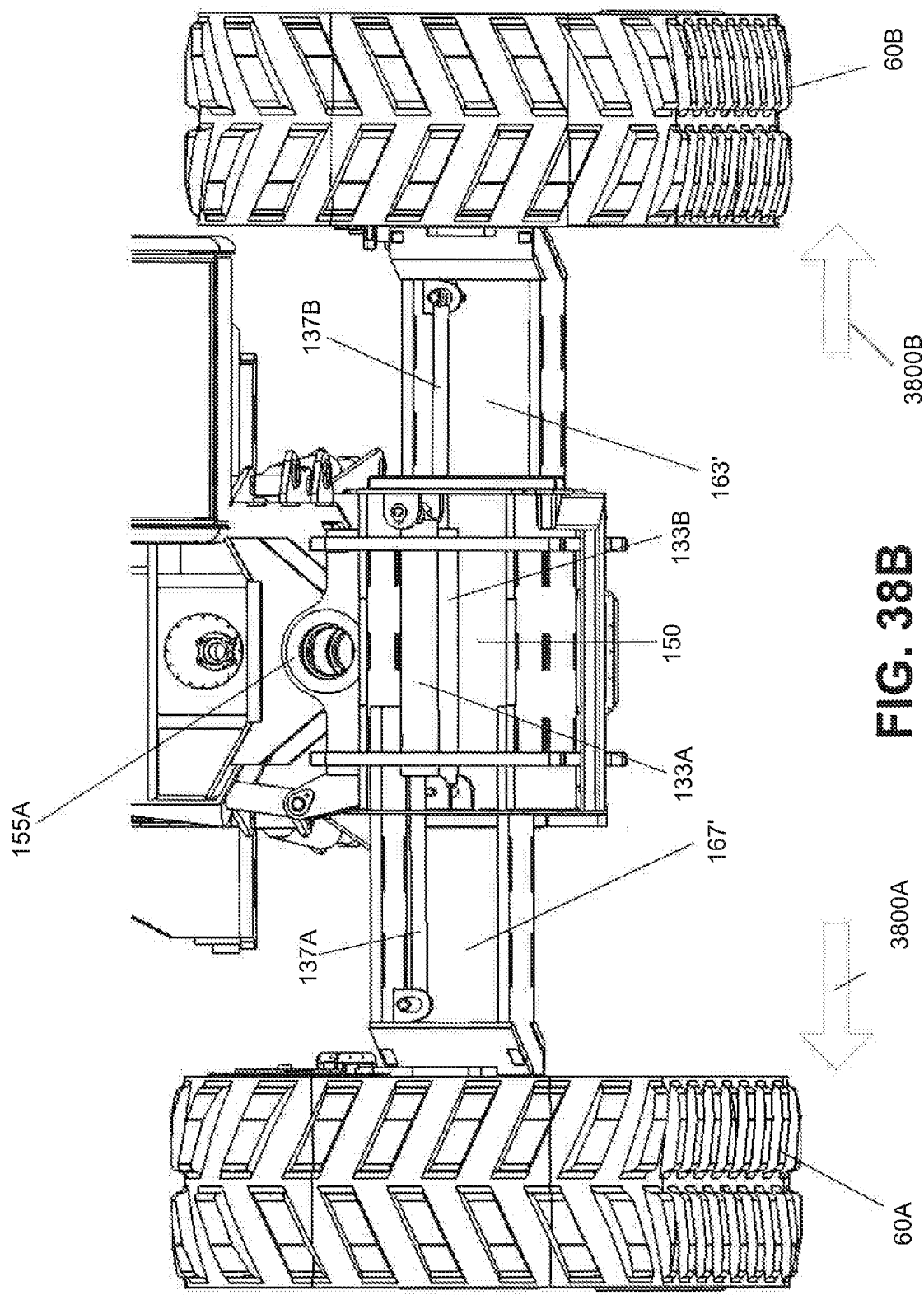
FIG. 38B illustrates an exemplary front view of the all-terrain vehicle shown in 38A but with an additional cut-away view of the bracket which contains hydraulic cylinders.

Referring now to FIG. 38B, this figure illustrates an exemplary front view of the all-terrain vehicle 10' shown in 38A but with an additional cut-away view of the bracket 150 which contains hydraulic cylinders 133A, 133B. The hydraulic cylinders 133A, 133B have pistons 137A, 137B which extend from the cylinders 133A, 133B, which in turn, move the arms 163', 167' to extend and/or contract the front tracks 60A, 60B. Also, in this FIG. 38B, the rear tracks 70A, 70B have been removed to provide a less crowded view of the internal structures shown.

Figure 39:
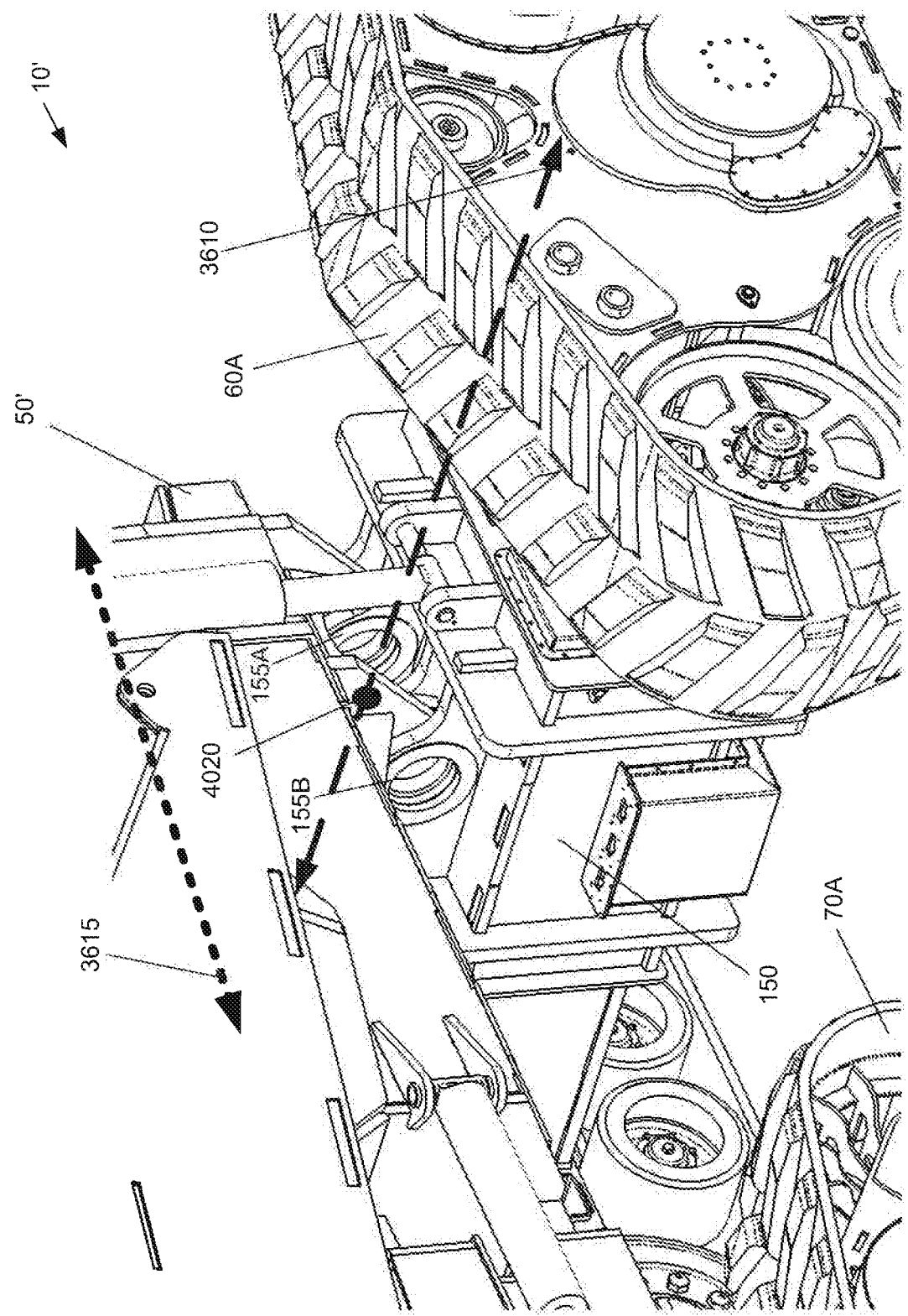
FIG. 39 illustrates an exemplary side perspective view of a front track and front bracket of the all-terrain vehicle shown in FIG. 35.

Referring now to FIG. 39, this figure illustrates an exemplary side perspective view of the front right track 60A and front bracket 150 of the all-terrain vehicle 10' shown in FIG. 35. Also visible in this view are two hinge brackets 155A, 155B that provide pivotable support for the bracket 150 as described previously.

A geometrical longitudinal axis 3615 for the superstructure 50' is also shown in FIG. 39. While this axis 3615 is shown above/within superstructure 50', the axis 3615 may also be defined by the two hinge brackets 155A, 155B as understood by one of ordinary skill in the art. That is, a geometrical center of each hinge bracket 155A, 155B may define a point and the two points of the two hinge brackets 155A, 155B may define the line for the longitudinal axis 3615 when viewing the front superstructure 50' from above.

The geometrical longitudinal drive axis 3610 for the front tracks 60 is also shown in FIG. 39. As noted previously, this axis 3610 is at a ninety-degree angle relative to axis 3615. Also illustrated in FIG. 39 is front axle connection point 4020. This connection point 4020 is referenced in FIG. 40 and is used for calculating a superstructure length (Ls) described below.

Predetermined Ratio for Boom Length to Superstructure Length (Portion)

Figure 40:
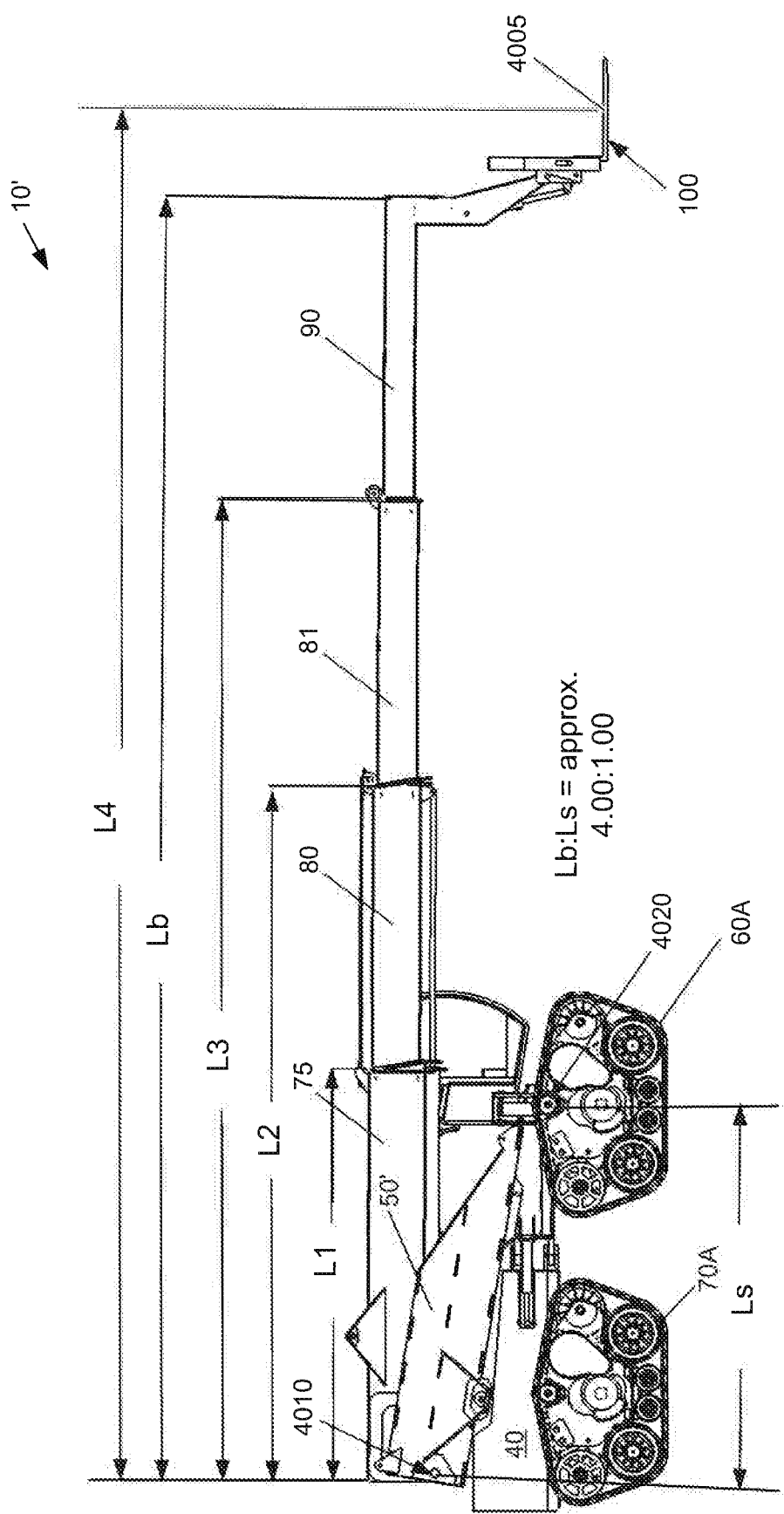
FIG. 40 illustrates a side view of the all-terrain vehicle of FIG. 35 but with its four boom sections in their fully extended position.

Referring now to FIG. 40, this figure illustrates a side view of the all-terrain vehicle 10' shown in FIG. 35 but with its four boom sections 75, 80, 81, and 90 in their fully extended position. The length (Lb) of the entire boom having its four boom sections 75, 80, 81, and 90 may comprise a magnitude of about, or substantially 57.20 feet.

This total boom length (Lb) is measured from the boom hinge pin/point 4010 to an end section of the smallest boom section 90. Other magnitudes, greater or smaller, for this total boom length (Lb) are possible and are within the scope of this disclosure.

Meanwhile, the length (Ls) of the supporting superstructure 50' is measured from a front axle connection point 4020 for the front tracks 60A to the boom hinge point 4010 as illustrated in FIG. 40. The magnitude of the superstructure length (Ls) is about 14.60 feet. Other magnitudes, greater or smaller, for this superstructure length (Ls) are possible and are within the scope of this disclosure.

The inventors have discovered that the all-terrain vehicle 10' has increased stability for carrying heavy loads with its front fork assembly 100 when a predetermined ratio is maintained between the total boom length (Lb) and the length (Ls) of the superstructure 50'. According to one exemplary embodiment, the predetermined ratio between the total boom length (Lb) and the length (Ls) of the superstructure is as follows:

Lb:Ls=about 3.92:1.00

Magnitudes smaller and a larger than this predetermined ratio are possible and are included within the scope of this disclosure. For example, the magnitude for the total boom length (Lb) variable in the above listed ratio may range between about 3.00 as a low end point and 4.50 as a high end point for an exemplary range (i.e. 3.00:1.00 or 4.5:1.00 or 4.00:1.00 as three other possible ratios within this exemplary range).

However, magnitudes smaller and larger than these two end points for the variable Lb are possible and are included within the scope of this disclosure. According to an exemplary embodiment, the ratio may comprise a magnitude that falls between (and includes) the two end points noted above: that is, between about 3.00:1.00 to 4.50:1:00.

Meanwhile, according to the exemplary embodiment illustrated in FIG. 40, the first and largest boom section 75 may have a length L1 of about, or substantially 16.28 feet. When the second boom section 80 is fully extended relative to the first boom section 75, then these two boom sections 75, 80 may have a length L2 of about, or substantially 27.52 feet.

Similarly, when the third boom section 81 is fully extended relative to the second boom section 80 and first boom section 75, then these three boom sections 75, 80, 81 may have a length L3 of about, or substantially 38.88 feet. And when the fourth boom section 90 is fully extended relative to the third boom section 81, the second boom section 80, and the first boom section 75, then these four boom sections 75, 80, 81, 90 and including a mid-point 4005 of the front fork assembly 100 may have a length L4 of about, or substantially 59.20 feet.

However, other lengths for each boom section 75, 80, 81, and 90 are possible and are included within the scope of this disclosure. Each boom section may be adjusted/sized depending upon an application of the vehicle 10' while maintaining the ratio between the total boom length (Lb) and the superstructure length (Ls) described above.

Figure 41:
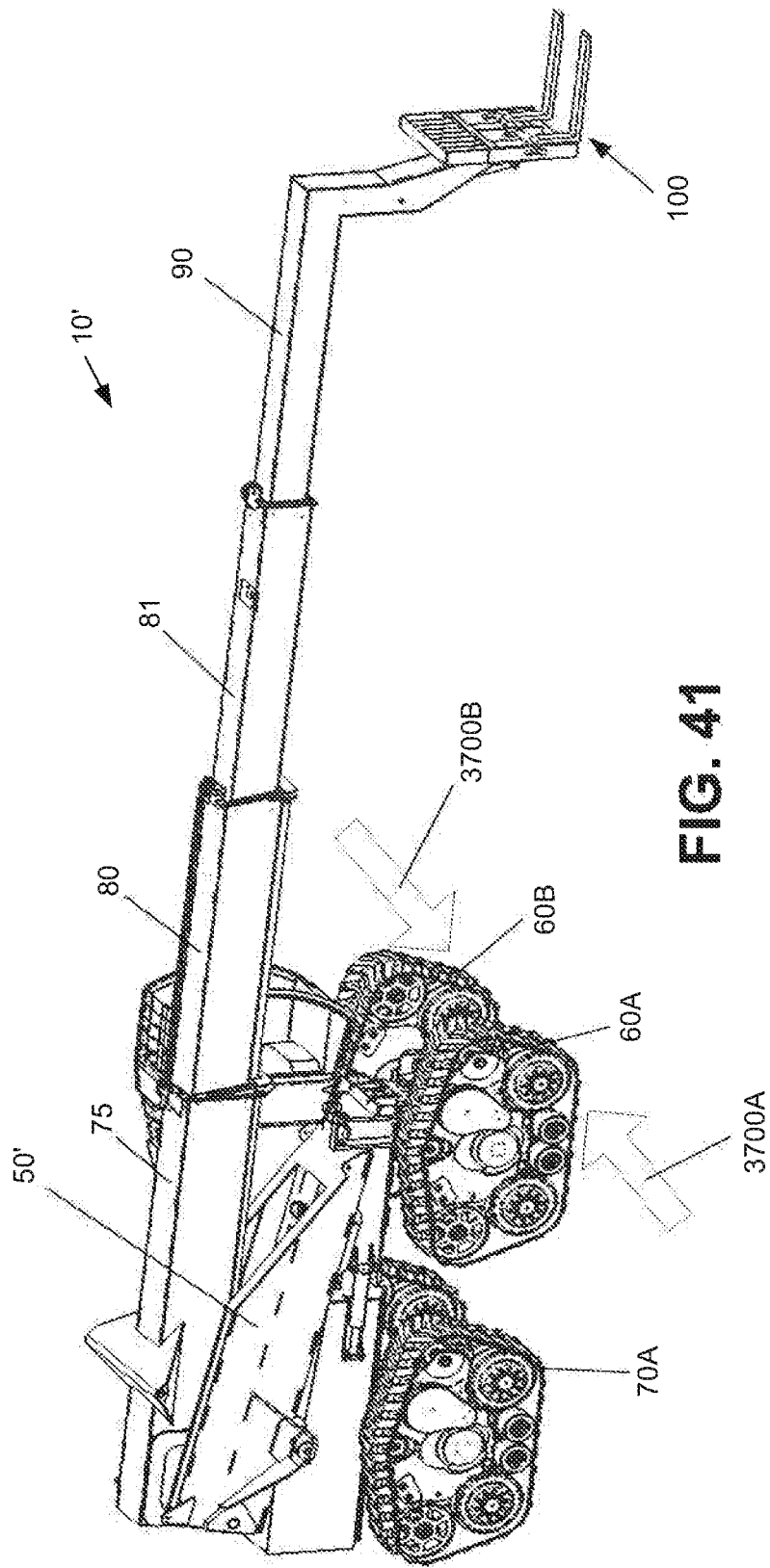
FIG. 41 illustrates a side, perspective view of the all-terrain vehicle of FIG. 40 in which all four boom sections are in a fully extended position while the front telescoping tracks are in a contracted position.

Referring now to FIG. 41, this figure illustrates a side, perspective view of the all-terrain vehicle 10' of FIG. 40 in which all four boom sections 75, 80, 81, and 90 are in a fully extended position while the front telescoping tracks 60A, 60B are in a contracted position. Specifically, in this side, perspective view of FIG. 41, the front telescoping tracks 60A, 60B are shown to be in their fully contracted position as indicated by directional arrows 3700A, 3700B.

That is, the telescoping axles 163', 167' (not visible in FIG. 41, but see FIG. 37) are fully contracted within the bracket 150 (see FIG. 37). As described above, to add further stability to the all-terrain vehicle 10' when the boom sections 75, 80, 81 and 90 are lifting heavy loads, the telescoping front tracks 60A, 60B may be extended outwardly and away from the front superstructure 50' as illustrated in FIG. 42.

Figure 42:
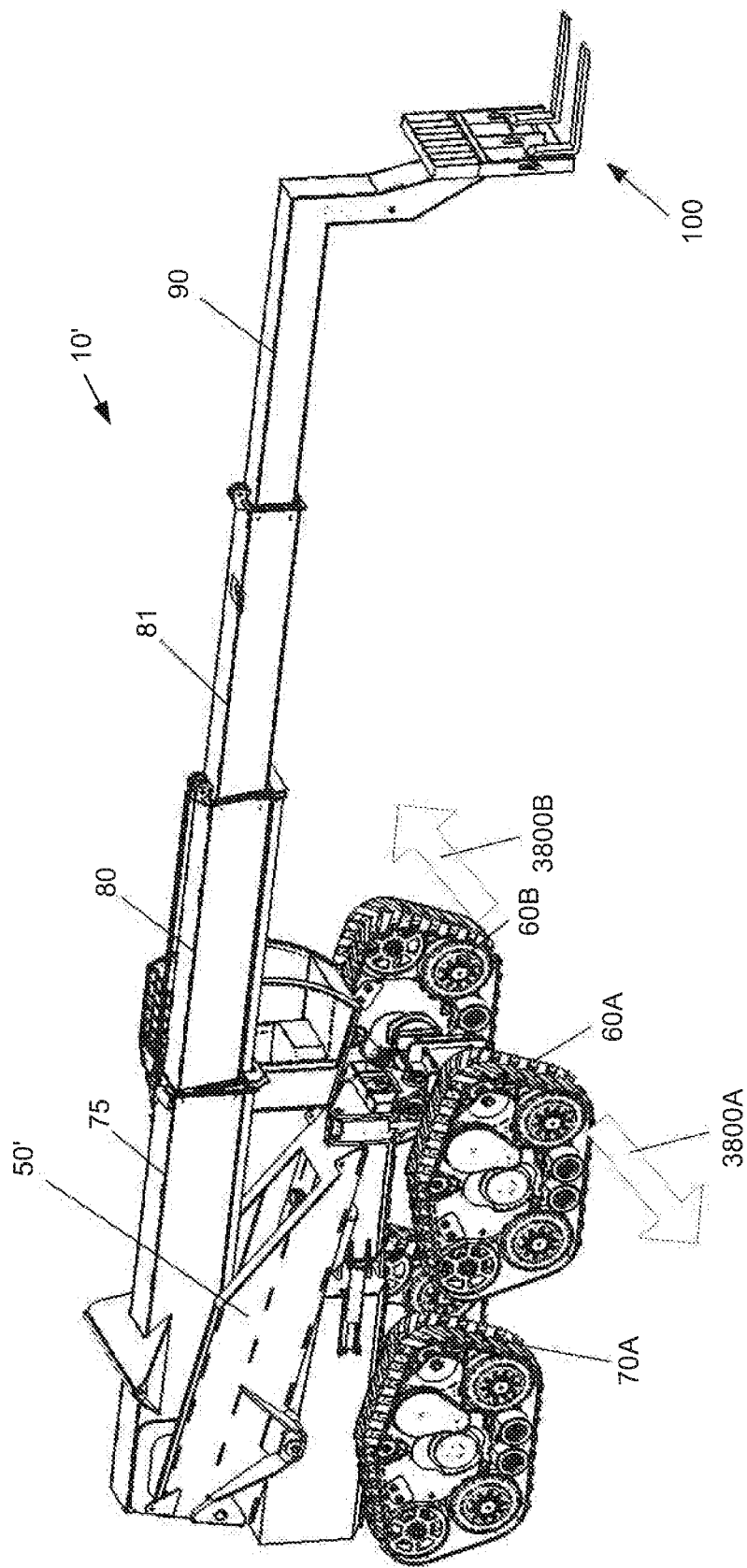
FIG. 42 illustrates a side, perspective view of the all-terrain vehicle of FIG. 40 in which all four boom sections are in a fully extended position while the front telescoping tracks are also in a fully extended position.

Referring now to FIG. 42, this figure illustrates a side, perspective view of the all-terrain vehicle 10' of FIG. 40 in which all four boom sections 75, 80, 81, and 90 are in a fully extended position while the front telescoping tracks 60A, 60B are also in a fully extended position. Specifically, in this side, perspective view of FIG. 42, the front telescoping tracks 60A, 60B are shown to be in their fully extended position as indicated by directional arrows 3800A, 3800B.

That is, the telescoping axles 163', 167' (not visible in FIG. 42, but see FIG. 38) are fully extended relative to the bracket 150 (see FIG. 38). With the front tracks 60A, 60B fully extended relative to the bracket 150 and the superstructure 50', stability is added to the system such that the boom sections 75, 80, 81, and 90 can lift heavy loads with substantially reduced movement of the superstructure 50' as loads are elevated and lowered with the boom sections 75, 80, 81, and 90.

In this side perspective view of FIG. 42, the front fork assembly 100 is shown in a lowered position such that loads may be lifted from the ground/earth as needed. The front fork assembly 100 shown in FIG. 42 is not at its lowest position since there is space between the largest boom section 75 and the support superstructure 50' as understood by one of ordinary skill in the art.

Figure 43:
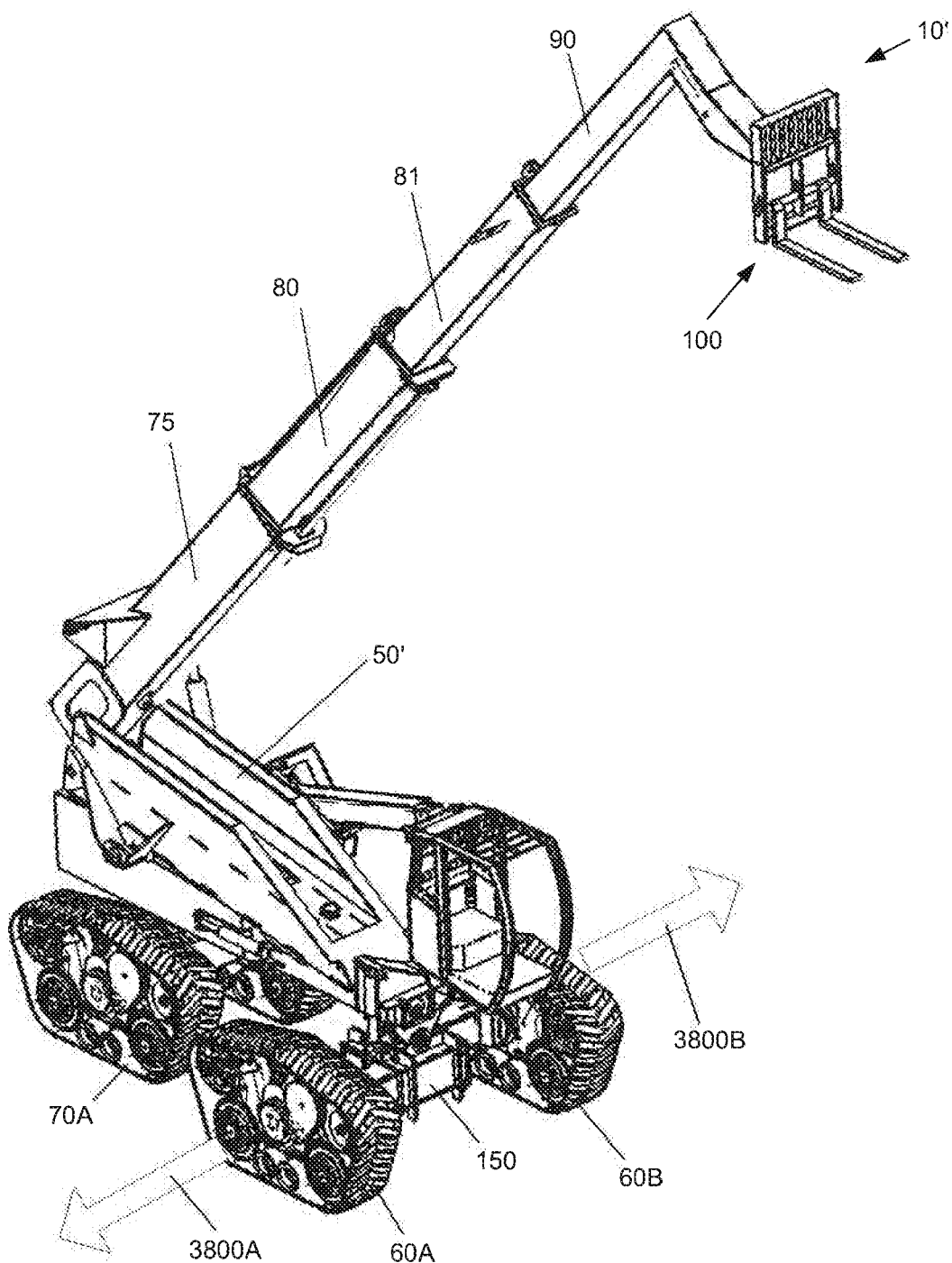
FIG. 43 illustrates a side, perspective view of the all-terrain vehicle of FIG. 40 in which all four boom sections are in a fully extended position while the front telescoping tracks are also in a fully extended position and while the fork assembly is in an elevated position relative to FIG. 42.

Referring now to FIG. 43, this figure illustrates a side, perspective view of the all-terrain vehicle 10' of FIG. 40 in which all four boom sections 75, 80, 81, and 90 are in a fully extended position while the front telescoping tracks 60A, 60B are also in a fully extended position and while the fork assembly 100 is in an elevated position relative to FIG. 42. As noted previously, with the front telescoping tracks 60A, 60B in their fully extended positions as shown by directional arrows 3800A, 3800B the all-terrain vehicle 10' has increased stability when lifting loads with the front fork assembly 100 and elevating the boom sections 75, 80, 81, and 90 well above the superstructure 50'.

Referring now to FIG. 44, this figure illustrates a side perspective view of the superstructure 50' for the all-terrain vehicle 10' illustrated in FIGS. 35-57. Relative to the superstructure 50 illustrated in FIG. 2, the superstructure 50' of FIG. 44 has raised sides 56A', 56B' which extend much higher compared to the raised sides 56 shown in FIG. 2. Specifically, the raised sides 56A', 56B' of the exemplary embodiment of FIG. 44 typically extend to at least one-half the height or greater than one-half the height of the largest boom section 75 (see FIG. 35).

The superstructure 50' further has angled sides 4510A, 4510B which start much earlier along bottom portion and the length of the superstructure 50' compared to the angled sides of the superstructure 50 shown in FIG. 2. The angled sides 4510A, 4510B of the superstructure 50' may extend at angle A2 of at least 20.0 degrees or greater relative to a geometrical longitudinal axis 3615 that extends along the length of the superstructure 50'. This angle A2 is dependent on the height of the raised sides 56A', 56B' and the point along the length of the superstructure 50' at which the angled sides 4510A, 4510B meet the angled sides 56A', 56B. According to an exemplary embodiment, the angle A2 may comprise a magnitude of 34.4 degrees. However, other magnitudes larger or small are possible and are included within the scope of this disclosure.

Also illustrated in FIG. 44 is the front superstructure hinge bracket 190. This hinge bracket 190 of the superstructure 50' engages the hinge bracket 200 of the engine compartment/rear body 40 (see FIGS. 5-6). The hinge brackets 155A, 155B which provide for oscillating movement for the telescoping tracks 60A, 60B (not visible in FIG. 44, but see FIG. 39) are also visible in this FIG. 44.

Referring now to FIG. 45, this figure illustrates a front view of the superstructure 50' shown in FIG. 44. Compared to the superstructure 50 of FIG. 2, the angled sides 4510A, 4510B and raised sides 56A', 56B' have a greater thickness. This increased thickness may add to the stability of the all-terrain vehicle 10' as understood by one of ordinary skill in the art. That is, the increased thickness impacts the moment of inertia of the superstructure 50'.

Referring now to FIG. 46, this figure illustrates a bottom view of the superstructure 50' illustrated in FIG. 44. In this view, bottom portions of the hinge brackets 155A, 155B and 190 are further visible.

Zero-Turn Vehicle with Articulation Point

Figure 47:
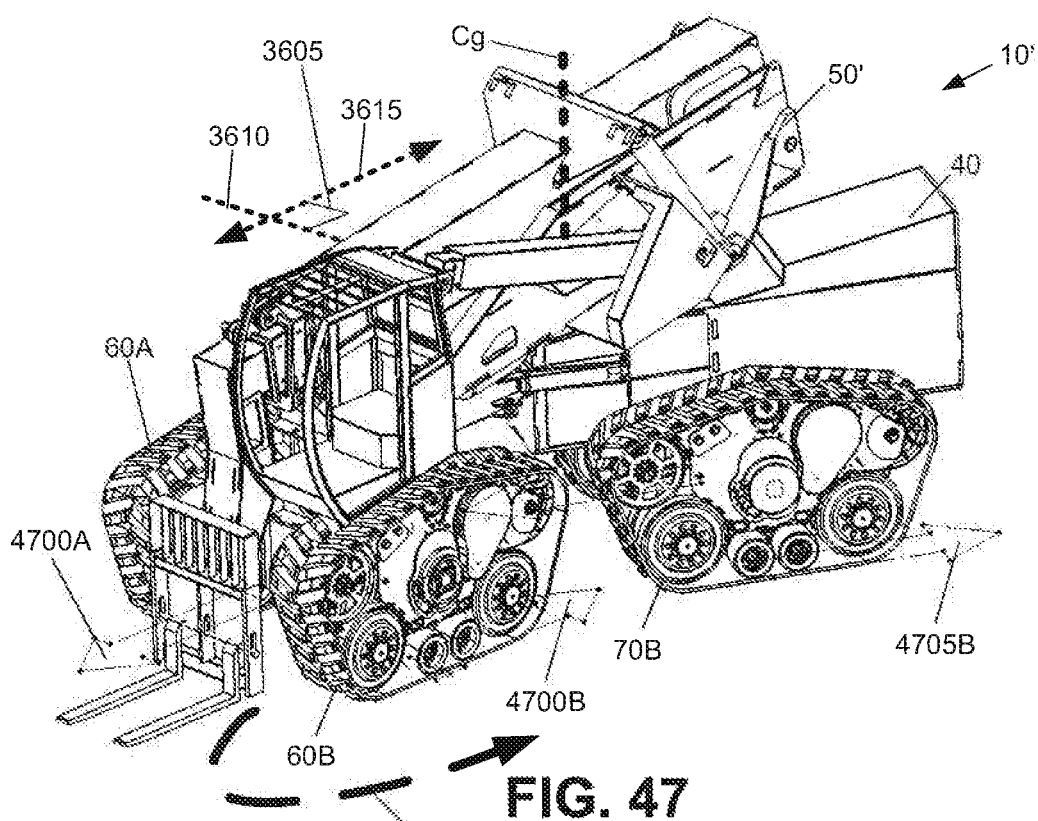
FIG. 47 this figure illustrates the all-terrain vehicle of FIG. 35 moving forward, and fully articulated about its articulation point, and then starting to initiate a zero-turn in a counter-clockwise direction relative to drawing sheet as shown by a counter-clockwise directional arrow.

Referring now to FIG. 47, this figure illustrates the all-terrain vehicle 10' of FIG. 35 moving forward, and fully articulated about its articulation point 210 [see FIG. 36] and then starting to initiate a zero-turn in a counter-clockwise direction relative to drawing sheet as shown by counter-clockwise directional arrow 4702. As understood by one of ordinary skill in the art, the term "zero turn" refers to the turning radius of the vehicle 10' being zero inches, or a "zero-degree turn radius" at the center of gravity for the vehicle 10'.

This means the vehicle 10', using its front and rear tracks 60A, 70A, can turn within its own footprint as understood by one of ordinary skill in the art. This allows the vehicle 10' to pivot around an approximate geometric center (Cg) relative to the tracks 60, 70 that is shown on the vehicle 10' in FIG. 47. It is noted that all four tracks 60A, 60B, 70A, 70B are usually rotating at different speeds relative to each other when completing this zero turn.

Specifically, to start a counter-clockwise turn as shown by directional arrow 4702, an operator directs the left front track 60B (relative to the operator) to start turning/moving in a counter-clockwise rotation (when facing outside of the track 60B) as shown by directional arrow 4700B relative to its driving shaft axis 3610. Similarly, the operator directs the left rear track 70B (relative to the operator) to start turning/moving in a counter-clockwise rotation (when facing outside of the track 70B) as shown by directional arrow 4705B relative to its driving shaft axis.

Simultaneously, the operator directs both the right front track 60A and right rear track 70A (not visible) to start turning/moving in a counter-clockwise rotation (when facing outside of the two tracks 60A, 70A) as shown by directional arrow 4700B for track 60A relative to its driving shaft axis 3610.

As noted previously in FIG. 36 and now again in FIG. 47, the longitudinal drive axis 3610 of the front tracks 60A, 70A is maintained at a ninety degree angle 3605 relative to the longitudinal axis 3615 of the superstructure 50'. This ninety degree angle 3605 remains fixed throughout the zero turn.

Figure 48:
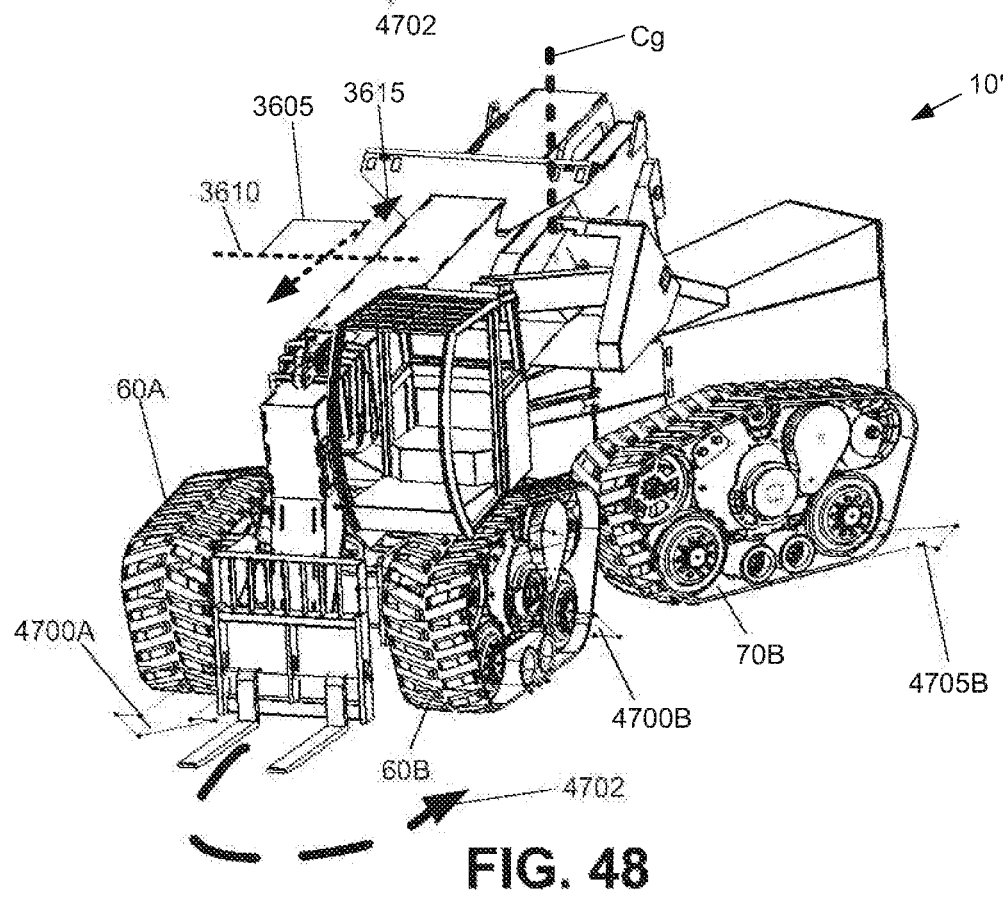
FIG. 48 illustrates the all-terrain vehicle of FIG. 47 continuing the zero-turn in a counter-clockwise direction relative to drawing sheet.

Referring now to FIG. 48, this figure illustrates the all-terrain vehicle of FIG. 47 continuing the zero-turn in a counter-clockwise direction 4702 relative to drawing sheet. The directional arrows 4700A, 4700B, and 4705B indicate that the tracks 60A, 60B, 70B continue to turn in their counter clock-wise manner.

While not visible in FIG. 48, the right rear track 70B also continues to rotate in the counter clock-wise manner. This movement of the tracks 60A, 60B, 70A, 70B allows the vehicle 10' to continue to pivot around a central axis Cg as shown. In this view, the vehicle 10' has pivoted/rotated about 20.0 degrees relative to a central axis Cg.

Figure 49:
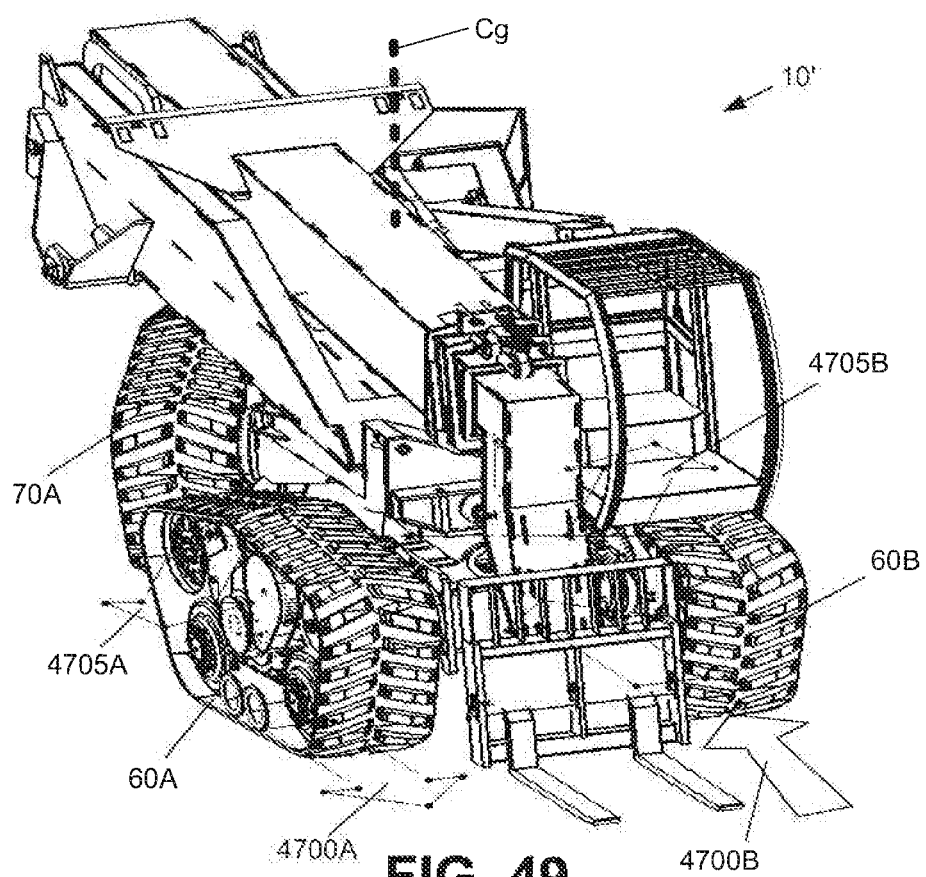
FIG. 49 illustrates the all-terrain vehicle of FIG. 48 continuing the zero-turn in a counter-clockwise direction relative to drawing sheet.

Referring now to FIG. 49, this figure illustrates the all-terrain vehicle of FIG. 48 continuing the zero-turn in a counter-clockwise direction relative to drawing sheet. The directional arrows 4700A, 4705A, and 4705B indicate that the tracks 60A, 60B, 70A continue to turn in their counter clock-wise manner.

While not visible in FIG. 49, the left rear track 70B also continues to rotate in the counter clock-wise manner. As noted previously, this movement of the tracks 60A, 60B, 70A, 70B allows the vehicle 10' to continue to pivot around a central axis Cg as shown. In this view, the vehicle 10' has pivoted/rotated about 90.0 degrees relative to a central axis Cg.

Figure 50:
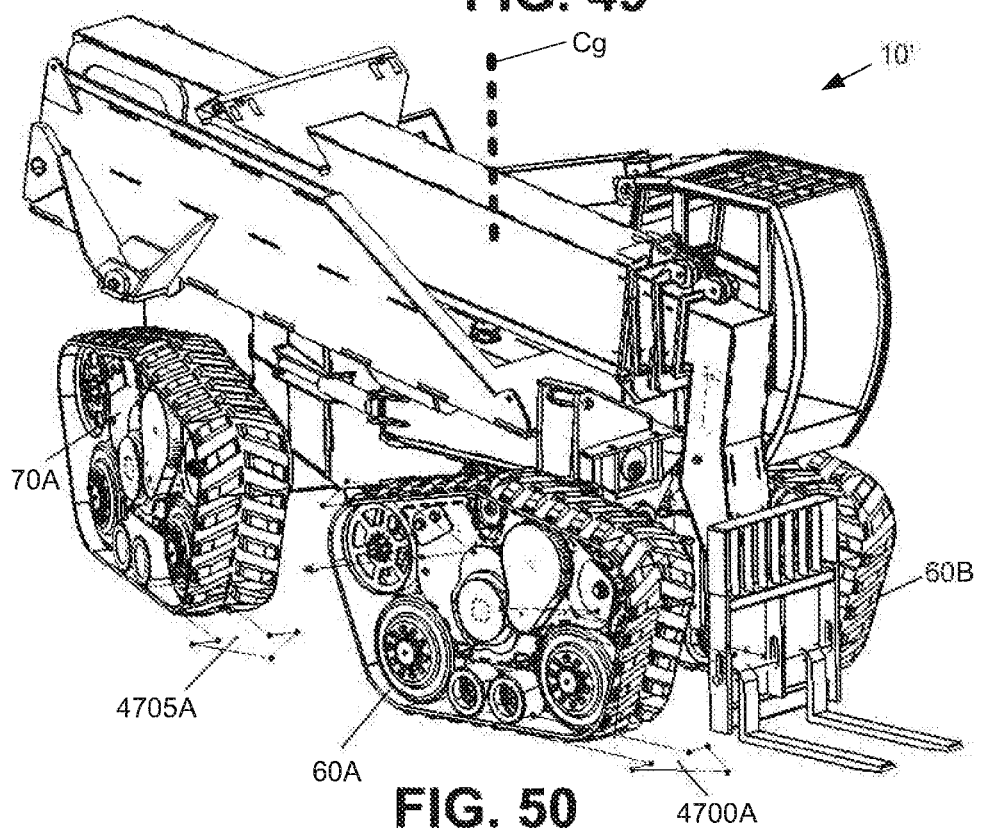
FIG. 50 illustrates the all-terrain vehicle of FIG. 49 continuing the zero-turn in a counter-clockwise direction relative to drawing sheet.

Referring now to FIG. 50, this figure illustrates the all-terrain vehicle of FIG. 49 continuing the zero-turn in a counter-clockwise direction relative to drawing sheet. The directional arrows 4700A and 4705A indicate that the tracks 60A, 70A continue to turn in their counter clock-wise manner.

While not visible in FIG. 50, the left front and left rear tracks 60B, 70B also continue to rotate in the counter clock-wise manner. As noted previously, this movement of the tracks 60A, 60B, 70A, 70B allows the vehicle 10' to continue to pivot around a central axis Cg as shown. In this view, the vehicle 10' has pivoted/rotated about 100.0 degrees relative to a central axis Cg.

Figure 51:
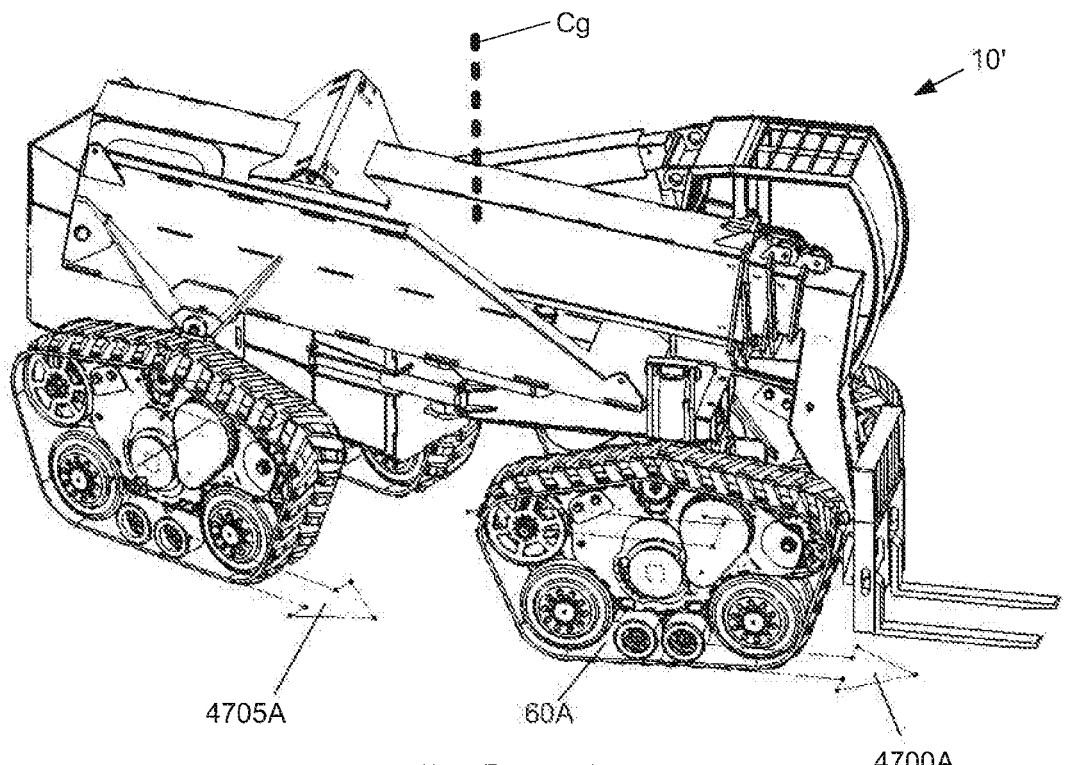
FIG. 51 illustrates the all-terrain vehicle of FIG. 50 continuing the zero-turn in a counter-clockwise direction relative to drawing sheet.

Referring now to FIG. 51, this figure illustrates the all-terrain vehicle of FIG. 50 continuing the zero-turn in a counter-clockwise direction relative to drawing sheet. The directional arrows 4700A and 4705A indicate that the tracks 60A, 70A continue to turn in their counter clock-wise manner.

While not visible in FIG. 51, the left front and left rear tracks 60B, 70B also continue to rotate in the counter clock-wise manner. As noted previously, this movement of the tracks 60A, 60B, 70A, 70B allows the vehicle 10' to continue to pivot around a central axis Cg as shown. In this view, the vehicle 10' has pivoted/rotated about 180.0 degrees relative to its center axis Ca. At the 180.0 degree position, the vehicle 10' has completed its "zero-turn" as understood by one of ordinary skill in the art.

Improved Cab Operator Loading Sequence

Figure 52:
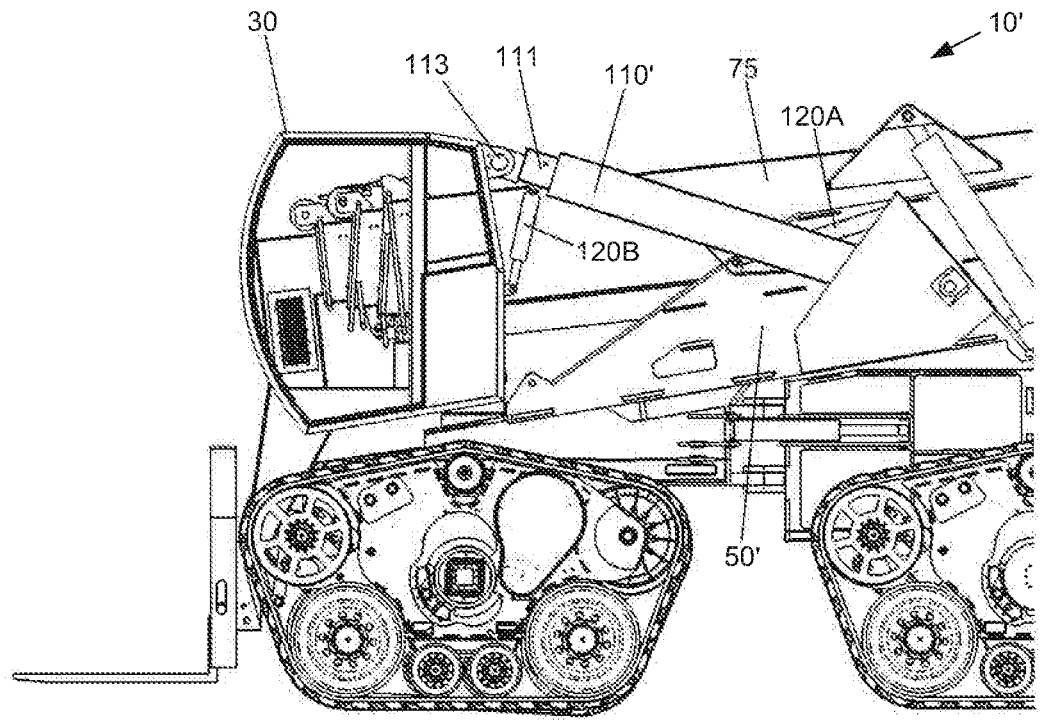
FIG. 52 illustrates a side view of the all-terrain vehicle with its cab initiating an operator loading sequence.

Referring now to FIG. 52, this figure illustrates a side view of the all-terrain vehicle 10' with its cab 30 initiating an operator loading sequence. In this view, a first cab boom section 110' is visible. As noted previously, compared to the embodiment of FIG. 2, the cab linkage 110 has been replaced with the first cab boom section 110'. The first cab boom section 110' houses a second, smaller boom section 111 which may telescope/extend from the first cab boom section 110'.

The second boom section 111 may be coupled to the cab 30 by a hinge pin 113. The second boom section 111 may be coupled to the cab 30 by a second hydraulic cylinder 120B which may pivot the cab 30 about the hinge pin 113. The first hydraulic cylinder 120A is coupled and helps move the first boom section 110'. It is noted that the first boom section 110' may be coupled to and driven by two hydraulic cylinders 120A though only one is visible in FIG. 52.

In FIG. 52, the first boom section 110' has started to move in a downward direction relative to the superstructure 50'. As will be apparent from the later FIGS. 53-58, the cab 30 and its support system comprises an significant advancement over the prior art because cab 30 may be lowered such that it contacts or almost contacts the ground/earth. Such a function/feature is significantly advantageous for operators/workers who may be handicapped, such as an operator who may be a paraplegic, and must be transferred from a wheelchair into the cab 30.

Figure 53:
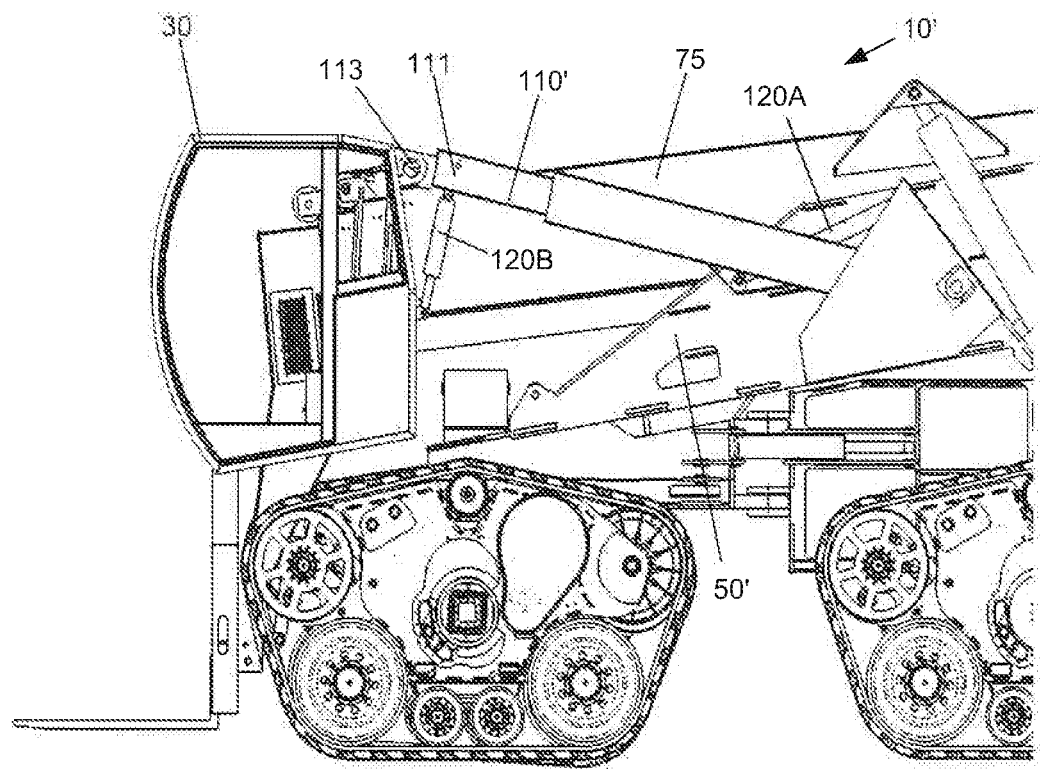
FIG. 53 illustrates a side view of the all-terrain vehicle with its cab continuing with an operator loading sequence relative to FIG. 52.

Referring now to FIG. 53, this figure illustrates a side view of the all-terrain vehicle 10' with its cab 30 continuing with an operator loading sequence relative to FIG. 52. In this FIG. 53, the second cab boom section 111 has been telescoped/extended from the first cab boom section 110'. This movement has moved the cab 30 past the first load boom 75.

Figure 54:
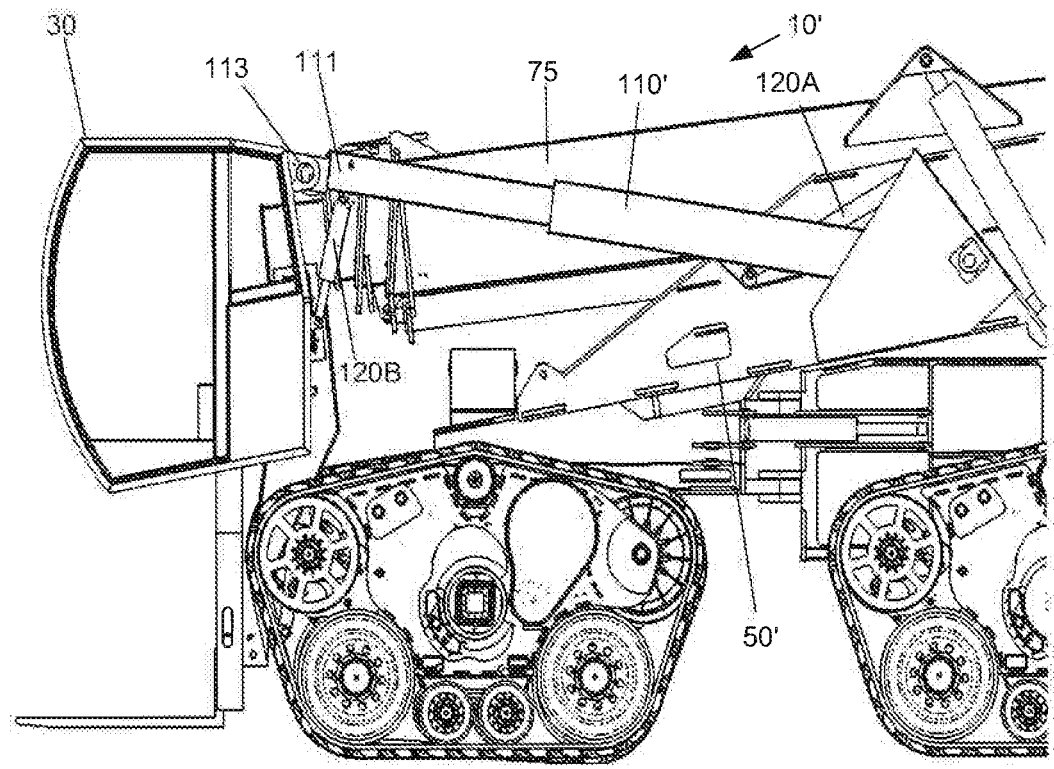
FIG. 54 illustrates a side view of the all-terrain vehicle with its cab continuing with an operator loading sequence relative to FIG. 53.

Referring now to FIG. 54, this figure illustrates a side view of the all-terrain vehicle 10' with its cab 30 continuing with an operator loading sequence relative to FIG. 53. In this FIG. 54, the second cab boom section 111 has been further telescoped/extended from the first cab boom section 110', while the first hydraulic cylinder 120A has lowered the first cab boom section 110'. This movement has moved the cab 30 further past the first load boom 75.

Figure 55:
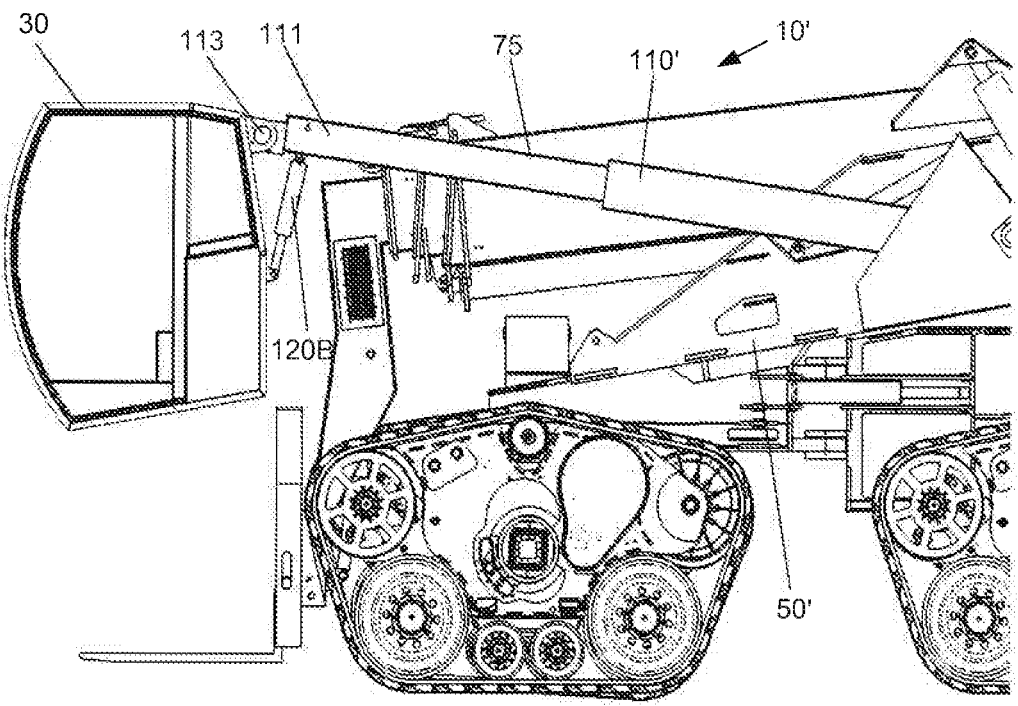
FIG. 55 illustrates a side view of the all-terrain vehicle with its cab continuing with an operator loading sequence relative to FIG. 54.

Referring now to FIG. 55, this figure illustrates a side view of the all-terrain vehicle 10' with its cab 30 continuing with an operator loading sequence relative to FIG. 54. In this FIG. 55, the second cab boom section 111 has been further telescoped/extended from the first cab boom section 110', while the first hydraulic cylinder 120A has continued to lower the first cab boom section 110'. This movement has moved the cab 30 further past the first load boom 75.

Figure 56:
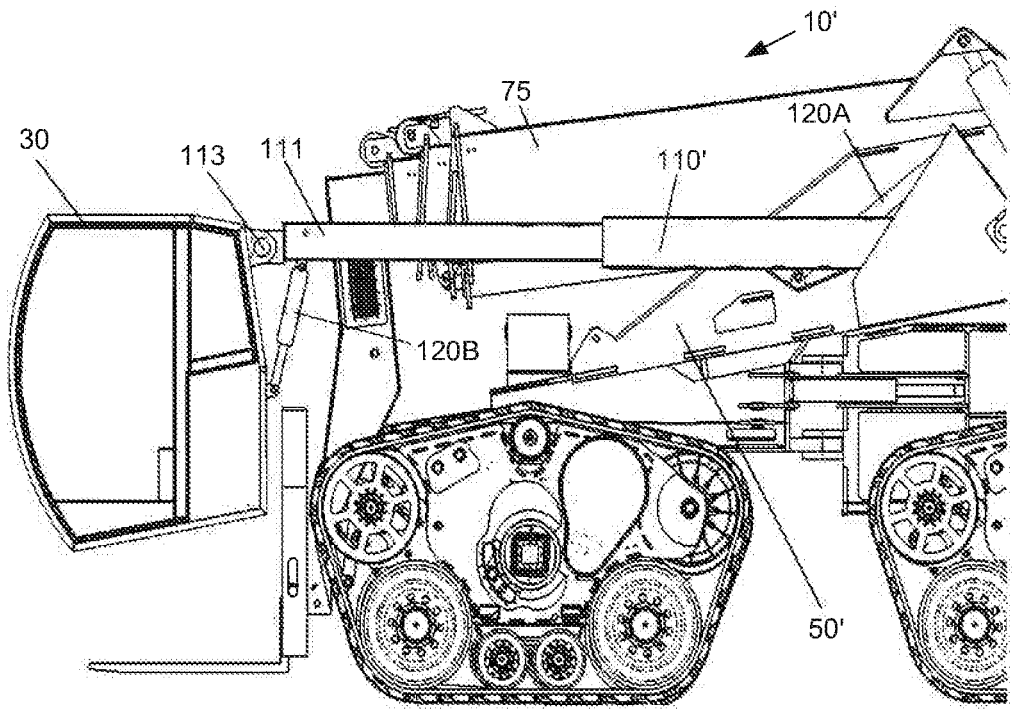
FIG. 56 illustrates a side view of the all-terrain vehicle with its cab continuing with an operator loading sequence relative to FIG. 55.

Referring now to FIG. 56, this figure illustrates a side view of the all-terrain vehicle 10' with its cab 30 continuing with an operator loading sequence relative to FIG. 55. In this FIG. 56, the first hydraulic cylinder 120A has continued to lower the first cab boom section 110' relative to the superstructure 50'. During this downward movement, the second hydraulic cylinder 120B may pivot the cab 30 around pivot pin 113 such that the cab 30 stays relatively level. This movement has moved the cab 30 below the first load boom 75.

Figure 57:
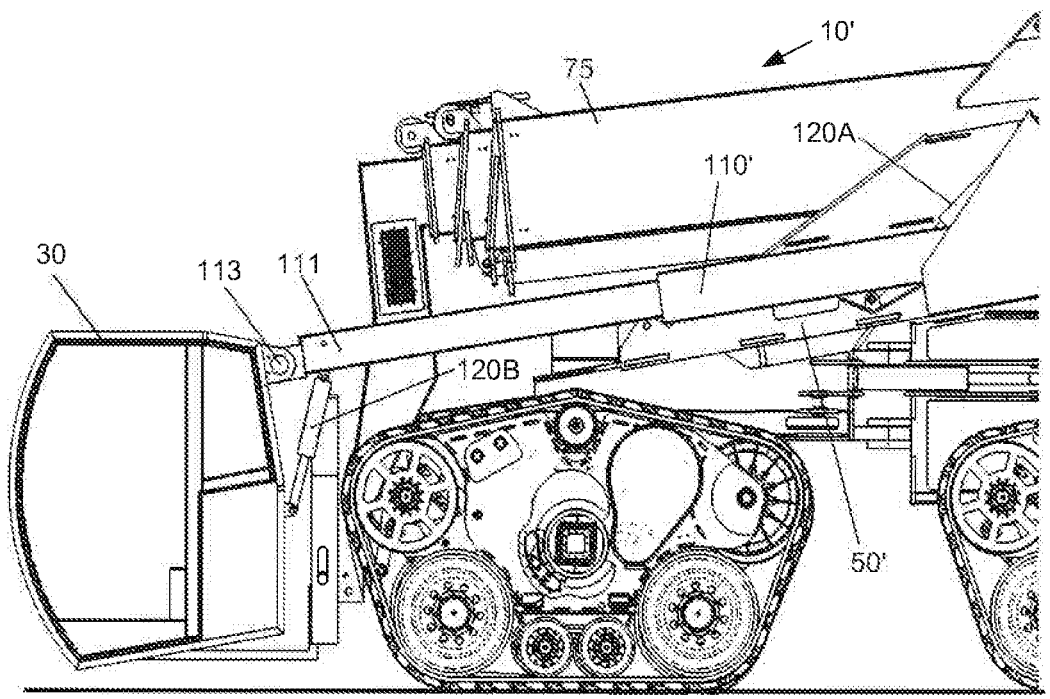
FIG. 57 illustrates a side view of the all-terrain vehicle with its cab continuing with an operator loading sequence relative to FIG. 56.

Referring now to FIG. 57, this figure illustrates a side view of the all-terrain vehicle 10' with its cab 30 continuing with an operator loading sequence relative to FIG. 56. In this FIG. 57, the first hydraulic cylinder 120A has lowered the first cab boom section 110' to its maximum extent relative to the superstructure 50'. Prior to this maximum downward position, the second hydraulic cylinder 120B may continue to pivot the cab 30 around pivot pin 113 such that the cab 30 stays relatively level. This movement has moved the cab 30 below the first load boom 75 and almost contacting the ground/earth.

Figure 58:
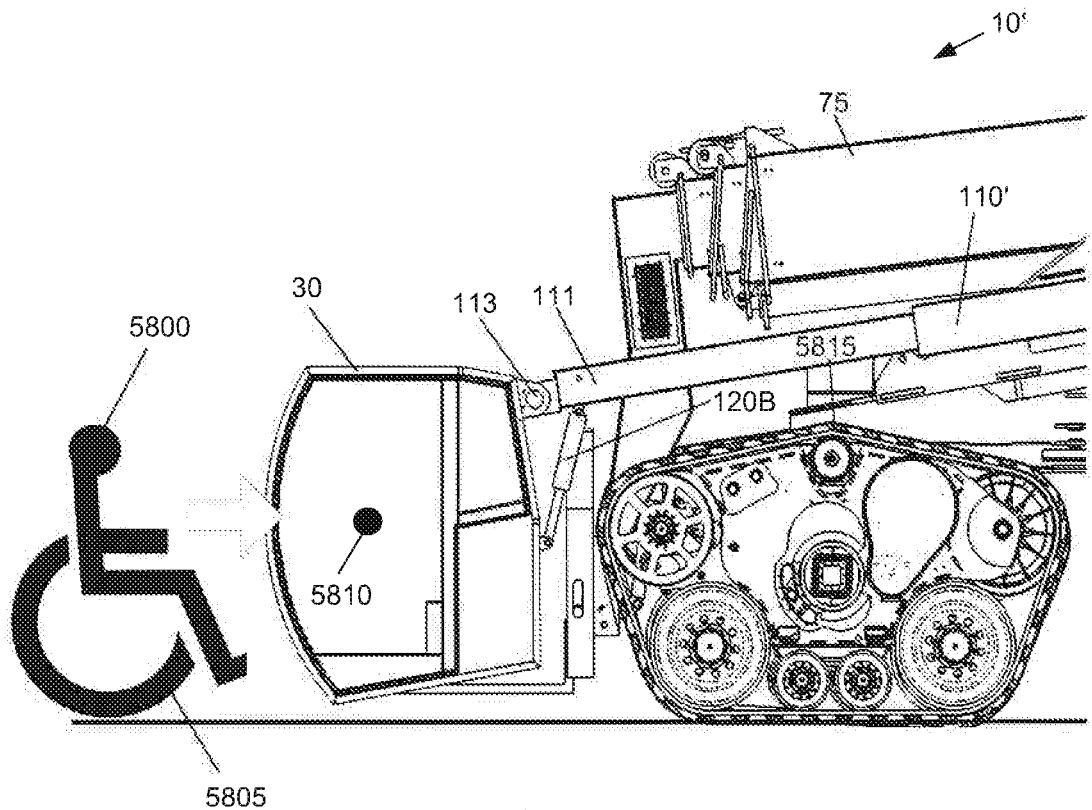
FIG. 58 illustrates a side view of the all-terrain vehicle with its cab continuing with an operator loading sequence relative to FIG. 57.

Referring now to FIG. 58, this figure illustrates a side view of the all-terrain vehicle 10' with its cab 30 continuing with an operator loading sequence relative to FIG. 57. In this figure, an operator 5800 who may be a paraplegic and has a wheel-chair 5805, may get access to the cab 30 so that the operator may easily transfer him/her-self from the chair 5805 to the cab 30 as understood by one of ordinary skill in the art.

The cab 30 may be adjustable between a first position and a second position. The first position may include a location where a geometrical mid-point 5810 of the cab is below a top section 5815 of one of the front tracks 60B. The first position may further include a location which is in front of one of the front tracks 60B.

Figure 59:
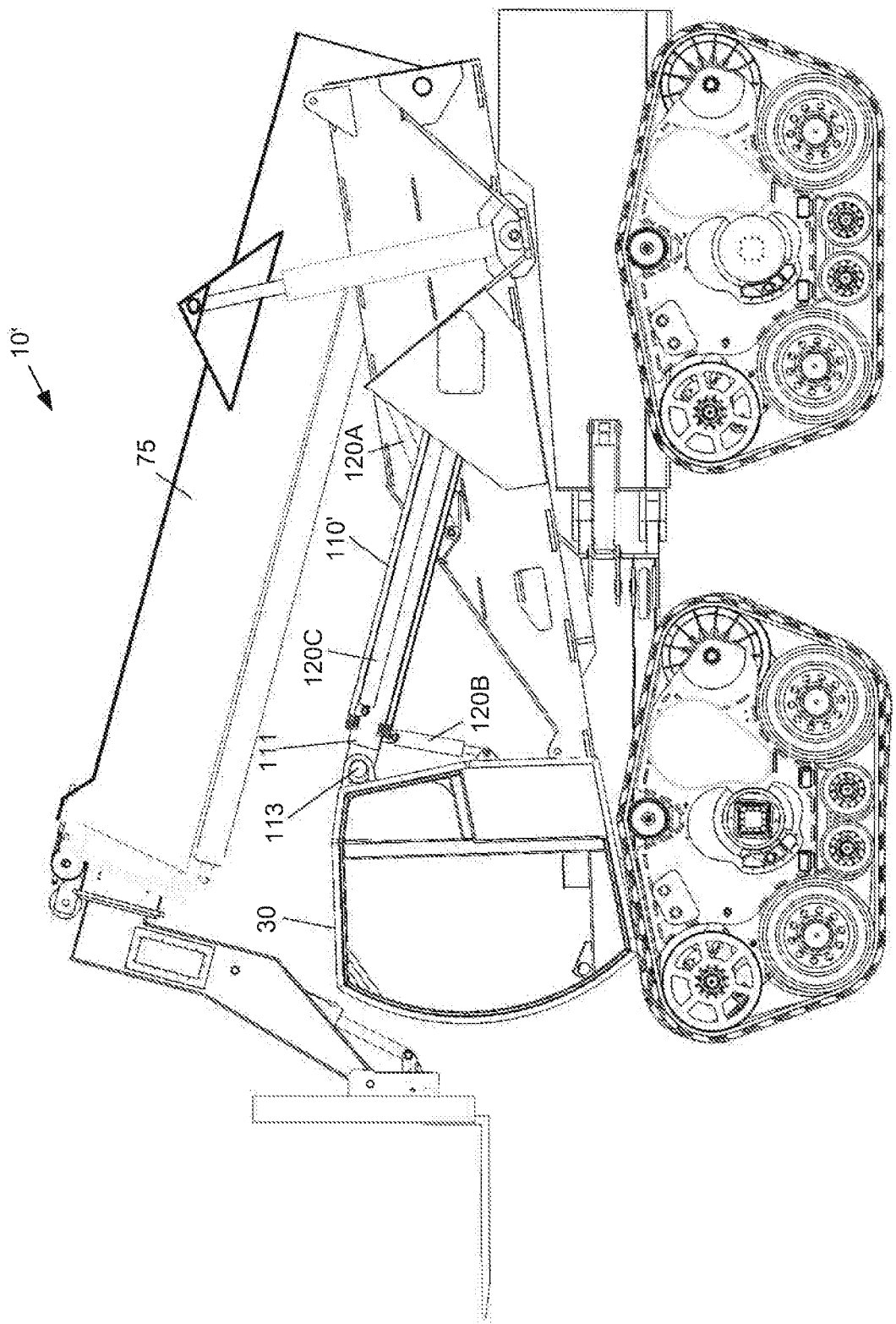
FIG. 59 illustrates a side view of the all-terrain vehicle with its cab in an elevated position and while the cab boom is in a contracted position.

Referring now to FIG. 59, this figure illustrates a side view of the all-terrain vehicle 10' with its cab 30 in an elevated position and while the cab boom 110' is in a contracted position relative to the boom 110'. In this view of FIG. 59, a third hydraulic cylinder 120C is now visible. This third hydraulic cylinder 120C may provide the force needed to extend the boom section 111 away from the cab boom 110'. In FIG. 59, the third hydraulic cylinder 120C is shown in a fully contracted position.

Figure 60:
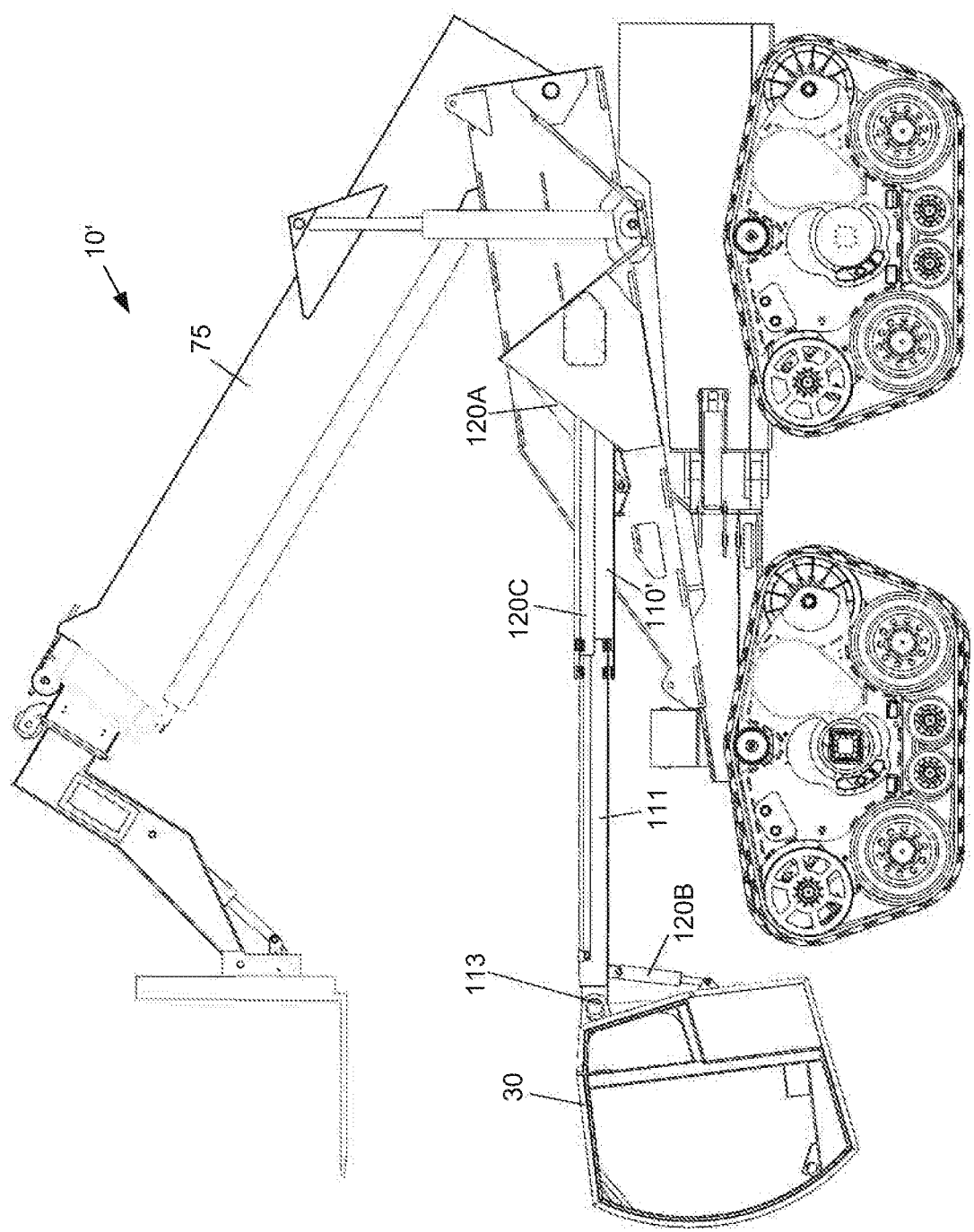
FIG. 60 illustrates a side view of the all-terrain vehicle with its cab in an elevated position and while the cab boom is in an extended position.

Referring now to FIG. 60, this figure illustrates a side view of the all-terrain vehicle 10' with its cab 30 in an elevated position and while the cab boom 110' is in an extended position. In this view of FIG. 60, the third hydraulic cylinder 120C is also visible. This third hydraulic cylinder 120C may provide the force needed to extend the boom section 111 away from the cab boom 110'. In FIG. 60, the third hydraulic cylinder 120C is shown in a fully extended position.

Certain steps in the processes described in this specification naturally precede others for the invention to function as described. However, the invention is not limited to the order of the steps described if such order or sequence does not alter the functionality of the invention. That is, it is recognized that some steps may be performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Although a few embodiments have been described in detail above, those skilled in the art will readily appreciate that many modifications are possible in the embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, sixth paragraph for any limitations of any of the claims herein, except for those in which the claim expressly uses the words 'means for' together with an associated function.

Therefore, although selected aspects have been illustrated and described in detail, it will be understood that various substitutions and alterations may be made therein without departing from the spirit and scope of the present invention, as defined by the following claims.

What is claimed is:

1. An all-terrain telehandler comprising:
   a pair of front tracks, each front track being coupled to a front bracket by an arm that telescopes relative to the front bracket, wherein the front bracket is coupled to an under surface of a front body;
   a front body superstructure coupled to an upper surface of the front body, the front body superstructure supporting a telescoping boom, the front body superstructure defining a first axis while the front bracket defines a second axis, the first axis being maintained at a fixed, predetermined angle relative to the second axis such that the telescoping boom is operable to extend to a ground level when nested in the front body superstructure; and
   a pair of rear tracks coupled to a rear body, the rear body coupled to the front body superstructure by an articulation point, the articulation point facilitating steering of the all-terrain telehandler;
   wherein the rear body is operable to articulate relative to the articulation point without affecting a position of the front body superstructure relative to the front body.

2. The all-terrain telehandler of claim 1, wherein the predetermined angle comprises a magnitude of about ninety degrees.

3. The all-terrain telehandler of claim 1, wherein a first length is defined by a maximum extension position for the telescoping boom; and a second length being defined by a front axle connection point to a hinge point on the superstructure for the telescoping boom, wherein a ratio of the first length to the second length is less than or equal to approximately 4.00:1.00, whereby the all-terrain telehandler is substantially stable when moving loads supported by the telescoping boom.

4. The all-terrain telehandler of claim 1, wherein a first length is defined by a maximum extension position for the telescoping boom; and a second length being defined by a front axle connection point to a hinge point on the superstructure for the telescoping boom, wherein a ratio of the first length to the second length is less than or equal to approximately 4.50:1.00, whereby the all-terrain telehandler is substantially stable when moving loads supported by the telescoping boom.

5. The all-terrain telehandler of claim 1, wherein the telescoping boom comprises at least two sections.

6. The all-terrain telehandler of claim 5, wherein the telescoping boom comprises at least three sections.

7. The all-terrain telehandler of claim 1, wherein the front tracks and rear tracks when moving in predetermined directions allow the all-terrain telehandler to complete a zero-turn.

8. The all-terrain telehandler of claim 1, wherein the telescoping boom is a first telescoping boom, and wherein the all-terrain telehandler further comprises a second telescoping boom, and a cab coupled to the second telescoping boom.

9. The all-terrain telehandler of claim 8, wherein the cab is adjustable between a first position and a second position, the first position comprising a location where a geometrical mid-point of the cab is below a top section of one of the front tracks.

10. The all-terrain telehandler of claim 9, wherein the first position further comprises a location which is in front of one of the front tracks.

11. An all-terrain telehandler comprising:
- a pair of front tracks, each front track being coupled to a front bracket by means for telescoping each front track relative to the front bracket, wherein the front bracket is coupled to an under surface of a front body;
- a front body superstructure coupled to an upper surface of the front body, the front body superstructure supporting a telescoping boom, the front body superstructure defining a first axis while the front bracket defines a second axis, the first axis being maintained at a fixed, predetermined angle relative to the second axis such that the telescoping boom is operable to extend to a ground level when nested in the front body superstructure; and
- a pair of rear tracks coupled to a rear body, the rear body coupled to the front body superstructure by an articulation point, the articulation point facilitating steering of the all-terrain telehandler;
- wherein the rear body is operable to articulate relative to the articulation point without affecting a position of the front body superstructure relative to the front body.

12. The all-terrain vehicle of claim 11, wherein the means for telescoping each front track relative to the front bracket comprises a device for extending and retracting each front track relative to the front bracket.

13. The all-terrain telehandler of claim 11, wherein the predetermined angle comprises a magnitude of about ninety degrees.

14. The all-terrain telehandler of claim 11, wherein a first length is defined by a maximum extension position for the telescoping boom; and a second length being defined by a front axle connection point to a hinge point on the superstructure for the telescoping boom, wherein a ratio of the first length to the second length is less than or equal to approximately 4.00:1.00, whereby the all-terrain telehandler is substantially stable when moving loads supported by the telescoping boom.

15. The all-terrain telehandler of claim 11, wherein the predetermined angle comprises a magnitude of about ninety degrees.

16. The all-terrain telehandler of claim 11, wherein the telescoping boom is a first telescoping boom, and wherein the all-terrain telehandler further comprises a second telescoping boom, and a cab coupled to the second telescoping boom.

\* \* \* \* \*